US009600499B2

(12) United States Patent
Kutaragi et al.

(10) Patent No.: US 9,600,499 B2
(45) Date of Patent: Mar. 21, 2017

(54) SYSTEM FOR COLLECTING INTEREST GRAPH BY RELEVANCE SEARCH INCORPORATING IMAGE RECOGNITION SYSTEM

(75) Inventors: Ken Kutaragi, Tokyo (JP); Takashi Usuki, Tokyo (JP); Yasuhiko Yokote, Tokyo (JP)

(73) Assignee: CYBER AI ENTERTAINMENT INC., Tokyo (JP)

( * ) Notice: Subject to any disclaimer, the term of this patent is extended or adjusted under 35 U.S.C. 154(b) by 303 days.

(21) Appl. No.: 14/129,005

(22) PCT Filed: Jun. 23, 2011

(86) PCT No.: PCT/JP2011/064463
§ 371 (c)(1),
(2), (4) Date: Dec. 23, 2013

(87) PCT Pub. No.: WO2012/176317
PCT Pub. Date: Dec. 27, 2012

(65) Prior Publication Data
US 2014/0149376 A1    May 29, 2014

(51) Int. Cl.
*G06K 9/46* (2006.01)
*G06K 9/66* (2006.01)
(Continued)

(52) U.S. Cl.
CPC .. *G06F 17/30277* (2013.01); *G06F 17/30259* (2013.01); *G06F 17/30864* (2013.01);
(Continued)

(58) Field of Classification Search
CPC ........... G06F 17/30867; G06F 17/3053; G06F 17/30277; G06Q 30/0269; G06Q 50/01; G06Q 30/0241
See application file for complete search history.

(56) References Cited

U.S. PATENT DOCUMENTS 6,038,333 A * 3/2000 Wang ................. G06K 9/00221
382/118
6,691,126 B1 * 2/2004 Syeda-Mahmood
......................... G06F 17/30247
382/104
(Continued)

FOREIGN PATENT DOCUMENTS

CA        2771094 A1 *   2/2011    ....... G06F 17/30256
JP     2001-222586 A     8/2001
(Continued)

OTHER PUBLICATIONS

Yamakawa et al., "Product Recommendation System Using Similar Image Search Technology," *Image Lab* 19(8):11-15, Aug. 10, 2008. Submitted with Partial English Language Translation.
(Continued)

*Primary Examiner* — Augustine K Obisesan
(74) *Attorney, Agent, or Firm* — Seed IP Law Group LLP

(57) ABSTRACT

A system for comprehensively and effectively acquiring, as an interest graph, targets and regions of interest unique to a user is provided. A system according to the invention is a search system using as input means image information containing various objects and subjects, in which by querying an image recognition engine on the server side via a network about a selected image, the image recognition engine extracts and recognizes in real time various generic objects and the like contained in the specified image, and notifies a relevance search engine on the server side of recognized image components contained in the input image, and the relevance search engine extracts related elements for the individual image components, and visually presents a relevance graph with the extracted related elements as nodes together with the depths of relationships between the nodes.

15 Claims, 43 Drawing Sheets

(51) Int. Cl.
*G06F 17/30* (2006.01)
*G06K 9/62* (2006.01)
*G06T 11/20* (2006.01)

(52) U.S. Cl.
CPC ......... *G06K 9/4676* (2013.01); *G06K 9/6224* (2013.01); *G06K 9/6263* (2013.01); *G06T 11/206* (2013.01)

(56) References Cited

U.S. PATENT DOCUMENTS

| | | | | |
|---|---|---|---|---|
| 7,512,612 | B1* | 3/2009 | Akella | G06F 17/30958 |
| 7,769,248 | B2* | 8/2010 | Bober | G06F 17/30259 |
| | | | | 348/169 |
| 7,788,260 | B2 | 8/2010 | Lunt et al. | |
| 8,781,231 | B1* | 7/2014 | Kumar | G06K 9/6224 |
| | | | | 382/159 |
| 2002/0069218 | A1 | 6/2002 | Sull | G06F 17/30796 |
| | | | | 715/202 |
| 2002/0136468 | A1* | 9/2002 | Sun | G06F 17/30277 |
| | | | | 382/305 |
| 2003/0035595 | A1* | 2/2003 | Liu | G06K 9/6253 |
| | | | | 382/305 |
| 2003/0120681 | A1* | 6/2003 | Baclawski | G06F 17/3066 |
| 2004/0133555 | A1* | 7/2004 | Toong | G06F 17/30014 |
| 2004/0199531 | A1* | 10/2004 | Kim | G06F 17/30259 |
| 2006/0004892 | A1 | 1/2006 | Lunt et al. | |
| 2007/0183670 | A1* | 8/2007 | Owechko | G06K 9/00369 |
| | | | | 382/224 |
| 2008/0065614 | A1* | 3/2008 | Bober | G06F 17/30259 |
| 2008/0130960 | A1* | 6/2008 | Yagnik | G06K 9/00288 |
| | | | | 382/118 |
| 2008/0201643 | A1* | 8/2008 | Nagaitis | G06F 17/30867 |
| | | | | 715/738 |
| 2008/0260257 | A1* | 10/2008 | Rose | B82Y 10/00 |
| | | | | 382/195 |
| 2009/0169080 | A1* | 7/2009 | Noordhoek | G06T 5/003 |
| | | | | 382/131 |
| 2009/0281923 | A1* | 11/2009 | Selinger | G06Q 30/02 |
| | | | | 705/26.1 |
| 2009/0281988 | A1* | 11/2009 | Yoo | G06F 17/30867 |
| 2010/0005105 | A1* | 1/2010 | Zhang | G06Q 30/02 |
| | | | | 707/E17.021 |
| 2010/0017289 | A1* | 1/2010 | Sah | G06Q 30/02 |
| | | | | 705/14.49 |
| 2010/0030780 | A1* | 2/2010 | Eshghi | G06F 17/30271 |
| | | | | 707/758 |
| 2010/0135527 | A1* | 6/2010 | Wu | G06K 9/00664 |
| | | | | 382/103 |
| 2010/0245567 | A1 | 9/2010 | Krahnstoever et al. | |
| 2010/0309226 | A1* | 12/2010 | Quack | G06F 17/30244 |
| | | | | 345/634 |
| 2011/0138416 | A1* | 6/2011 | Kang | G06F 3/0482 |
| | | | | 725/39 |
| 2011/0145275 | A1 | 6/2011 | Stewart | |
| 2011/0188713 | A1* | 8/2011 | Chin | G06F 17/30247 |
| | | | | 382/118 |
| 2012/0294495 | A1* | 11/2012 | Wren | G06F 21/6263 |
| | | | | 382/118 |

FOREIGN PATENT DOCUMENTS

| | | |
|---|---|---|
| JP | 2007-264718 A | 10/2007 |
| JP | 2009-205289 A | 9/2009 |
| JP | 2010-250529 A | 11/2010 |
| WO | WO 2011017653 A1 * | 2/2011 ....... G06F 17/30256 |

OTHER PUBLICATIONS

Yamazaki, N., "Possibility of Next Generation Search by Life Log & Recommendation (1) New Relationships Woven by Social Graph," *Web Site Expert* No. 18, pp. 52-55, Jun. 25, 2008. Submitted with Partial English Language Translation.

International Search Report, mailed Sep. 27, 2011, for PCT/JP2011/064463, 2 pages.

Japanese Office Action, mailed Jun. 15, 2015, for corresponding JP Application No. 2013-521387, 3 pages.

* cited by examiner

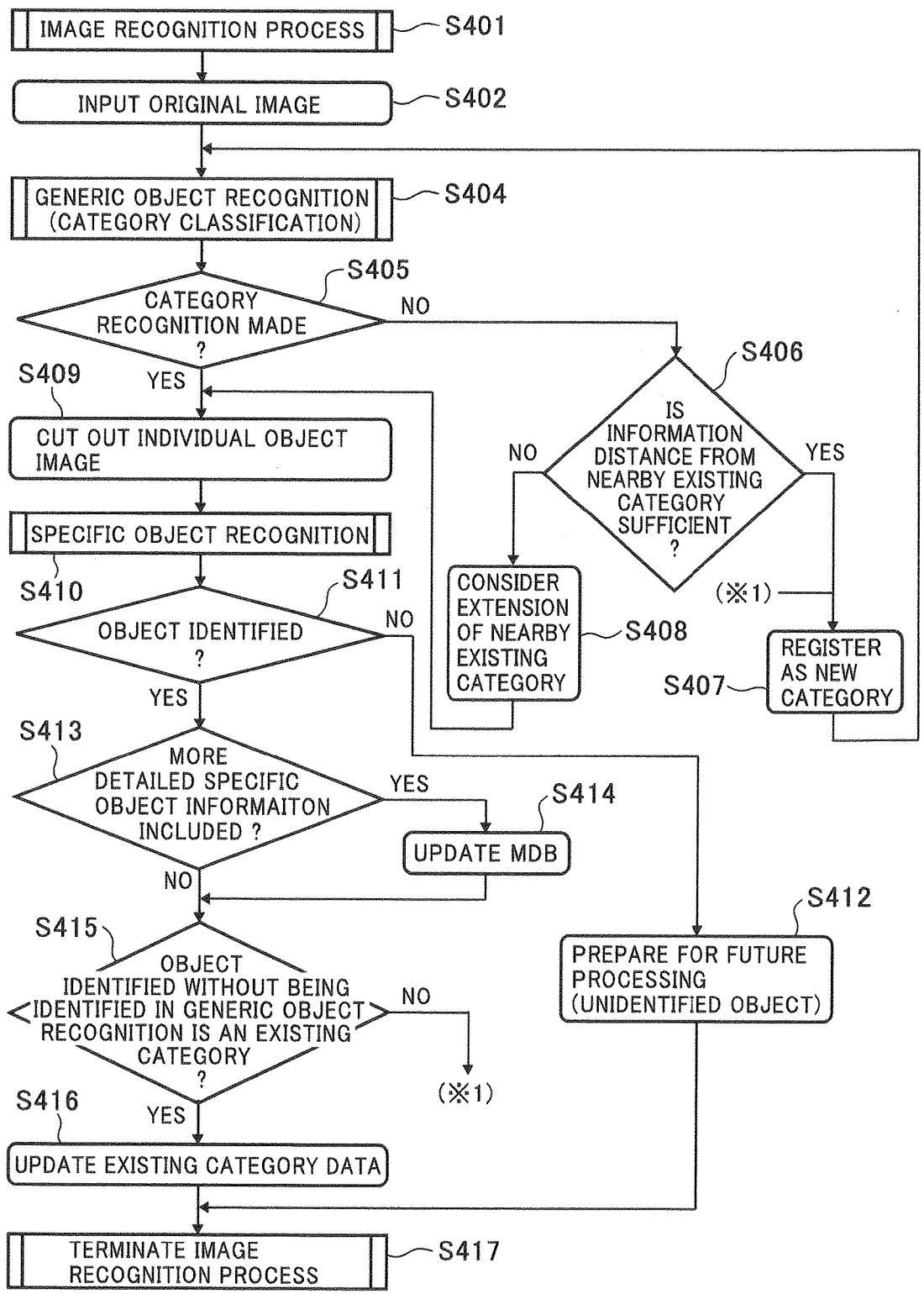

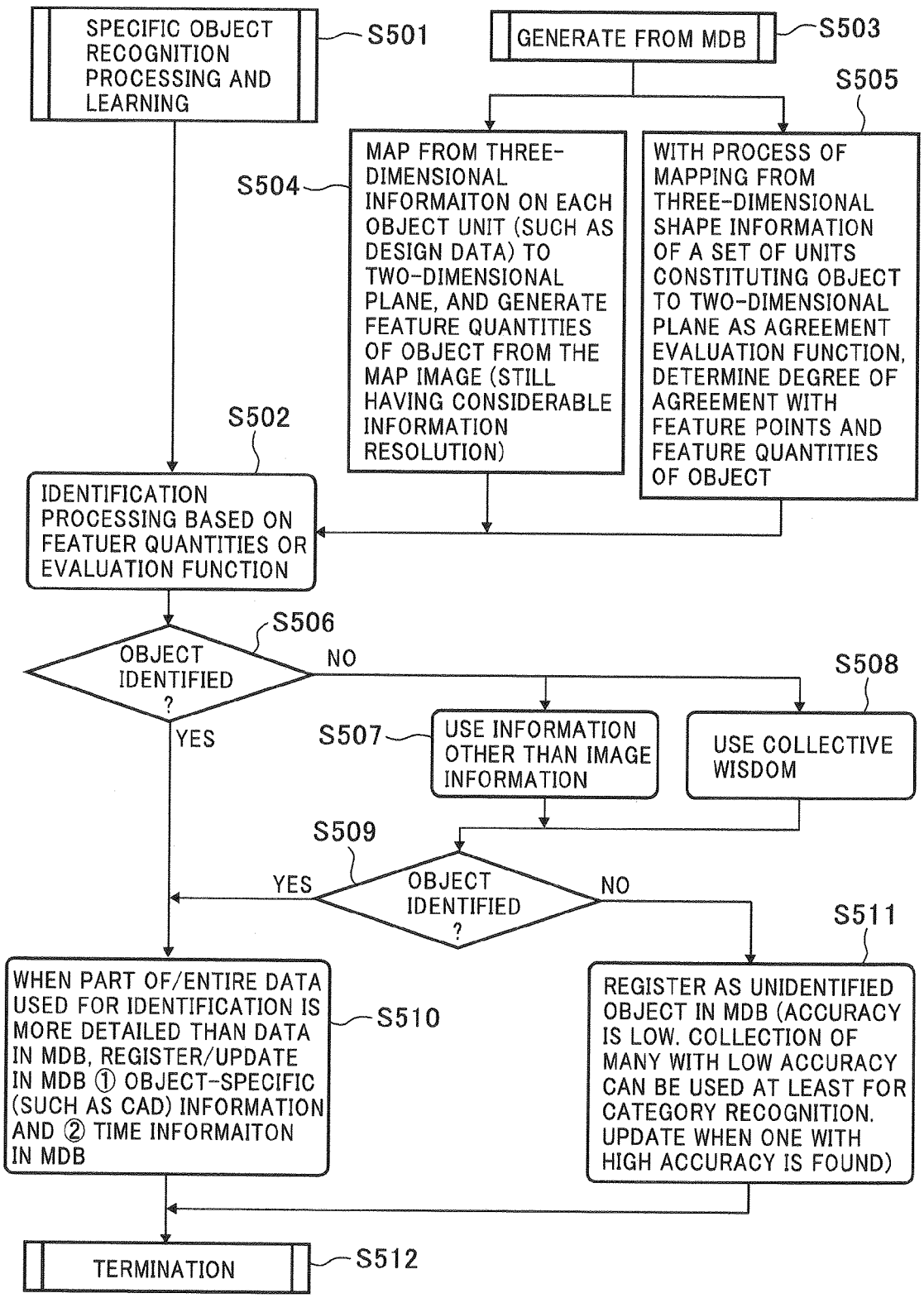

GENERIC OBJECT RECOGNITION UNIT (Bag-of-Feature)

FIG.7
(A)
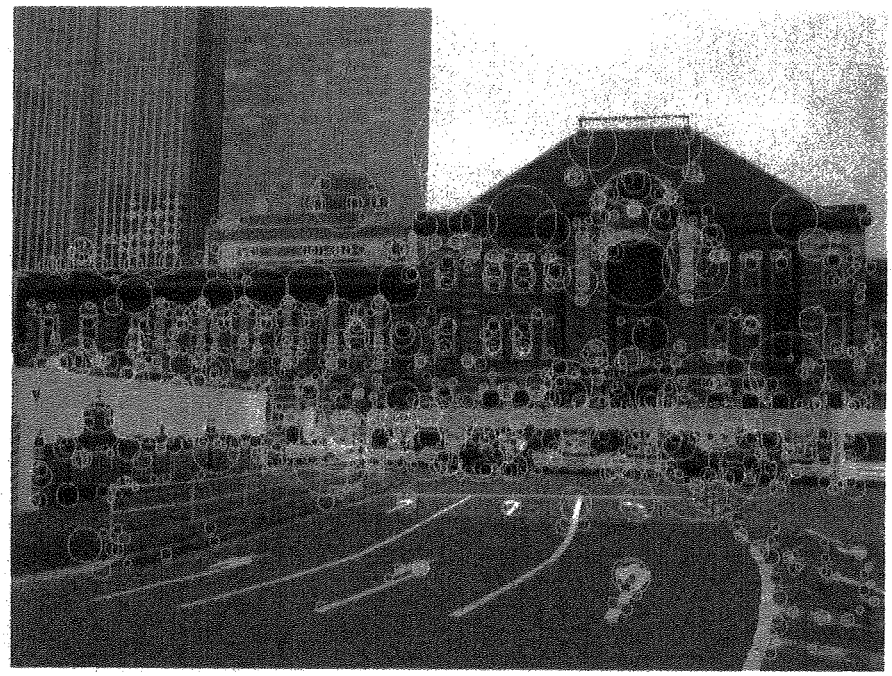
FEATURE POINT/FEATURE QUANTITY EXTRACTION USING SIFT
(B)
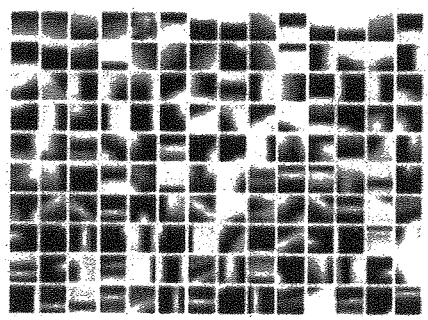
Codebook
(C)
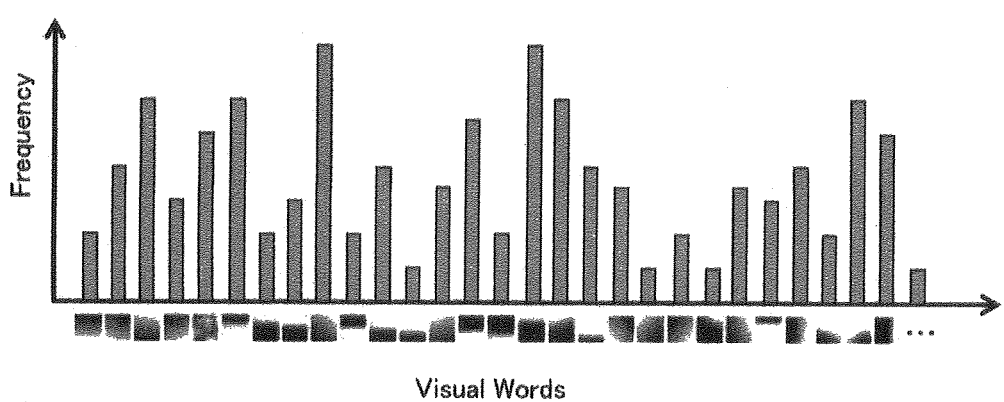
Visual Words

GENERIC OBJECT RECOGNITION SYSTEM

FIG.10
(A)
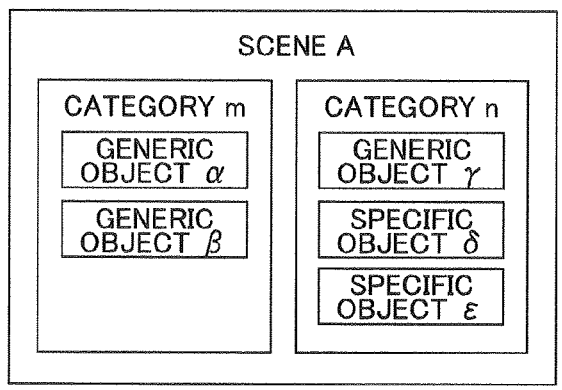
(B)

FIG.12A
(A)
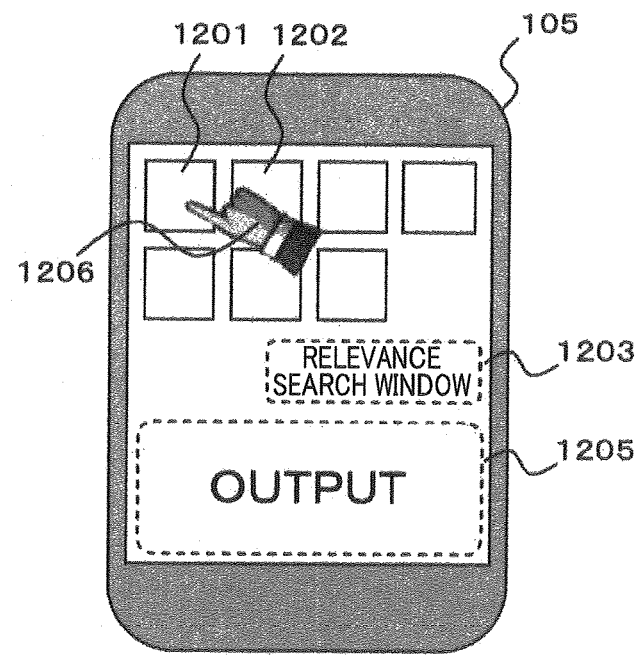
(B)
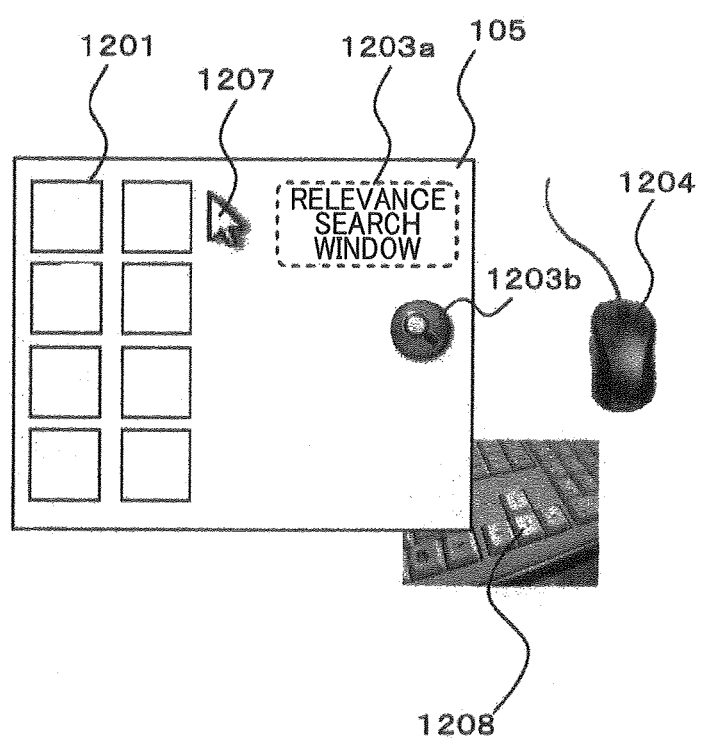

FIG.12B
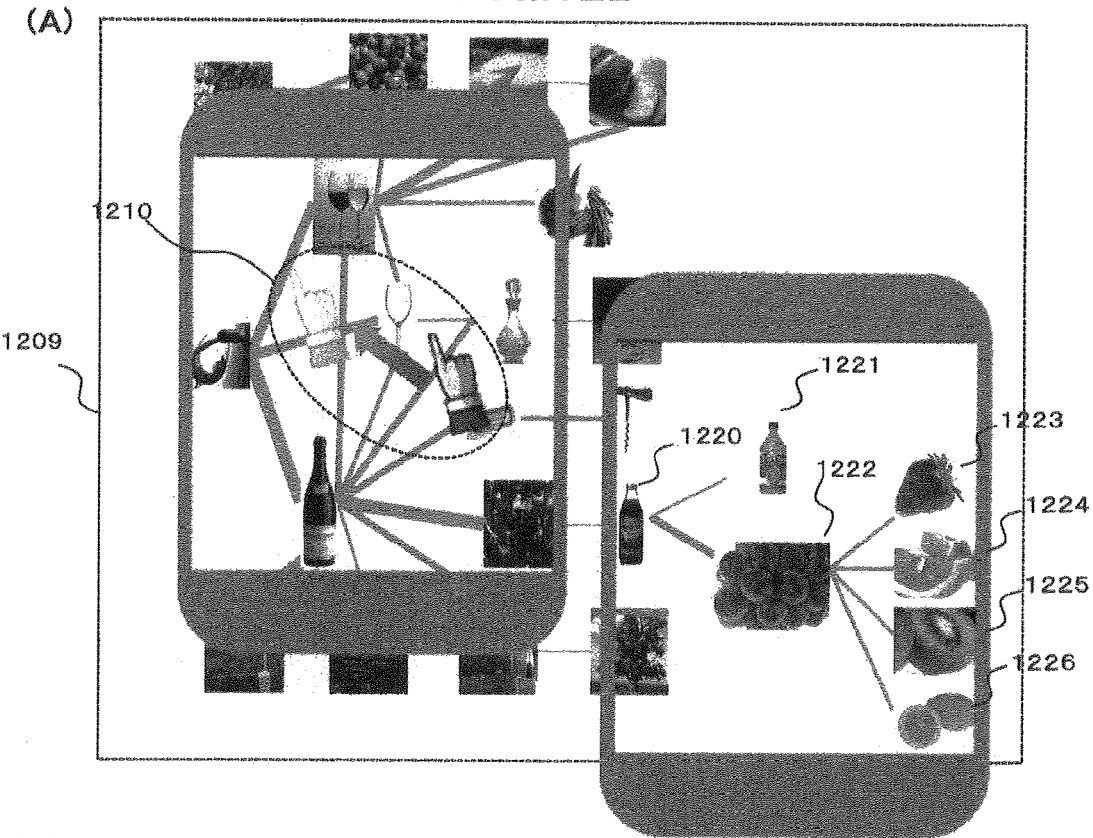
(A)
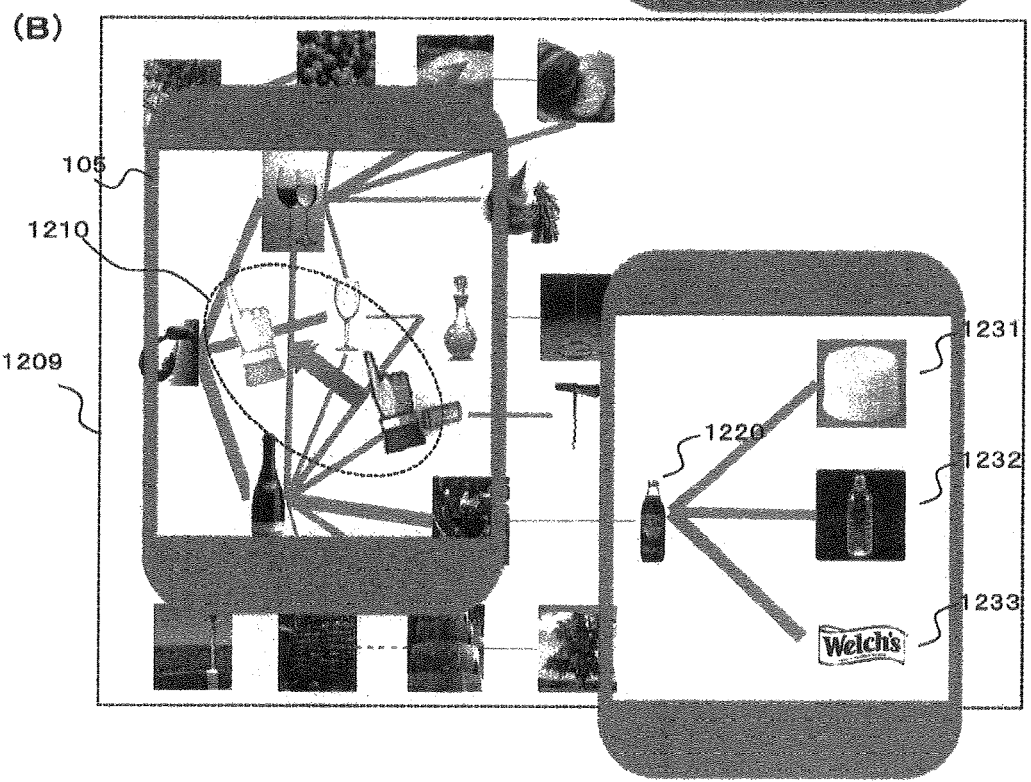
(B)

FIG.14A (A) 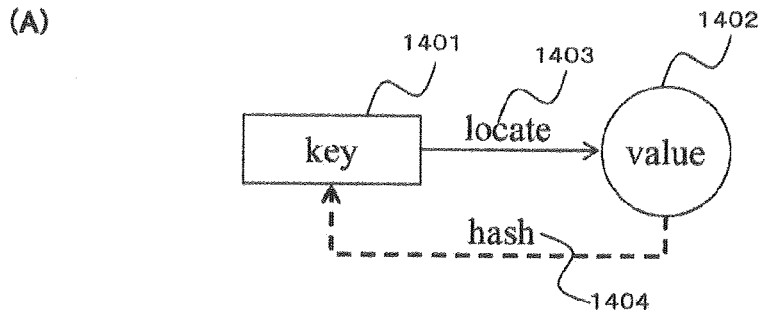

(B) (key, {value})

(C) 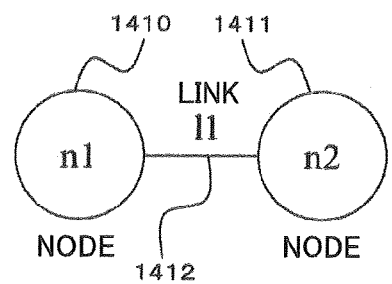

(D)

| SECTION | CONTENT |
|---|---|
| TYPE | NODE TYPE (USER\|OBJECT)(META\|SUBJECT\|URI\|EXT) |
| GENERATION TIME | TIME AT WHICH NODE IS GENERATED |
| ACCESS TIME | TIME AT WHICH NODE IS ACCESSED |
| DATA (value) | DATA HELD BY NODE |

(E)

| | | |
|---|---|---|
| TYPE | LINK TYPE (UNDIRECTED\|DIRECTED\|NONE) | |
| GENERATION TIME | TIME AT WHICH LINK IS GENERATED | |
| ACCESS TIME | TIME AT WHICH LINK IS ACCESSED | |
| DATA (value) | LEFT NODE (key) | |
| | RIGHT NODE (key) | |
| | WEIGHT (w) | |
| | FUNCTION (f) | |

| GDB OP. NAME | OPERATION |
|---|---|
| CREATE | GENERATE NODE OF SPECIFIED TYPE |
| CONNECT | GENERATE LINK OF SPECIFIED TYPE BETWEEN SPECIFIED NODES |
| NODE | ACQUIRE NODE DATA CORRESPONDING TO key |
| LINK | ACQUIRE LINK DATA CORRESPONDING TO key |
| SUBGRAPH | ACQUIRE SUBGRAPH OF SPECIFIED NODE |

(A)

(B)

(n1, {node n1})    (l1, {n1, n2})
    (n2, {node n2})    (l2, {n2, n3})
    (n3, {node n3})    (l3, {n3, n4})
    (n4, {node n4})    (l4, {n2, n4})

(C)

(n1, {f(n1, n2)})
    (n2, {f(n2, n3)})
    (n3, {f(n3, n4)})
    (n4, {f(n2, n4)})

FIG.16
(A) IMAGE COMPONENTS
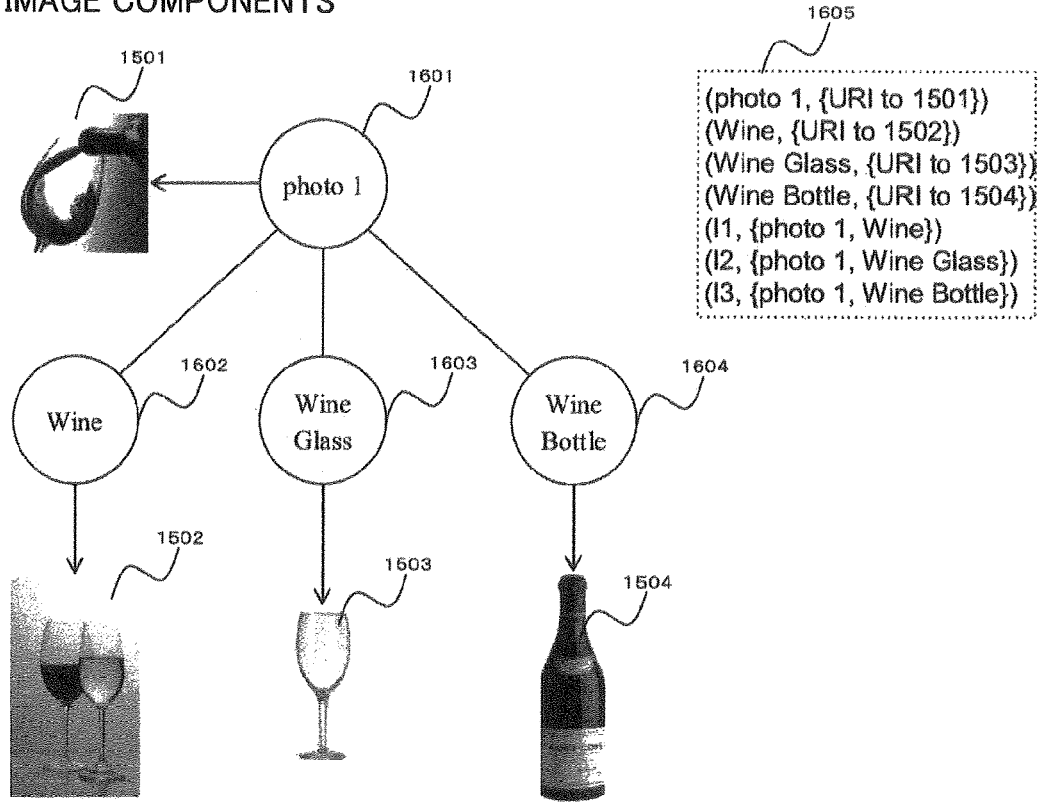
(B) METADATA
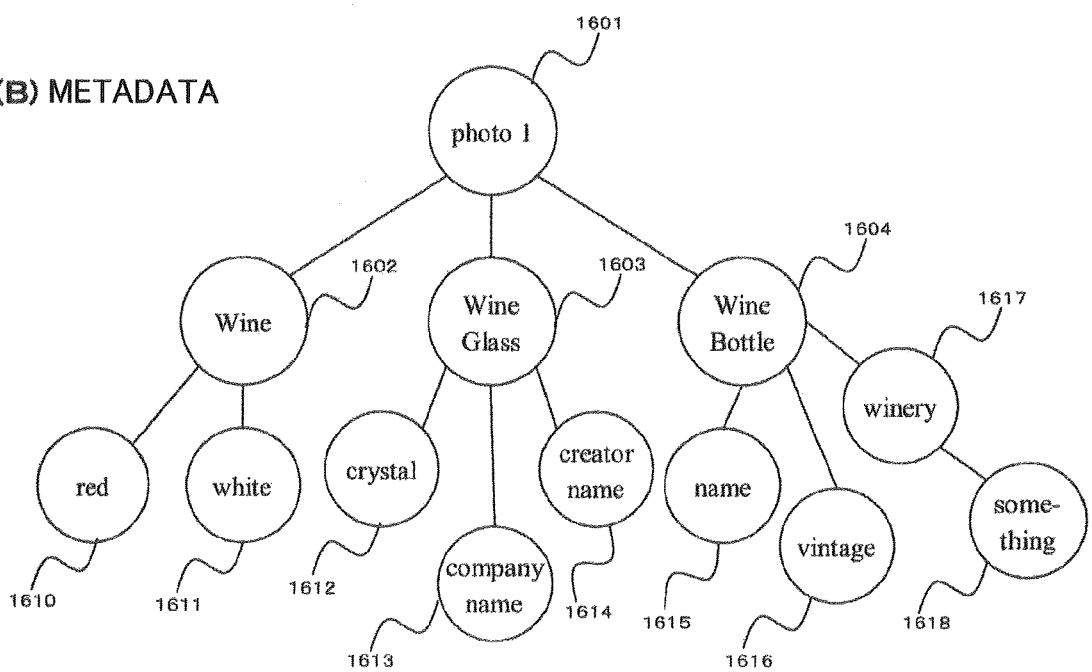

FIG.17
(A) RELATED ELEMENTS
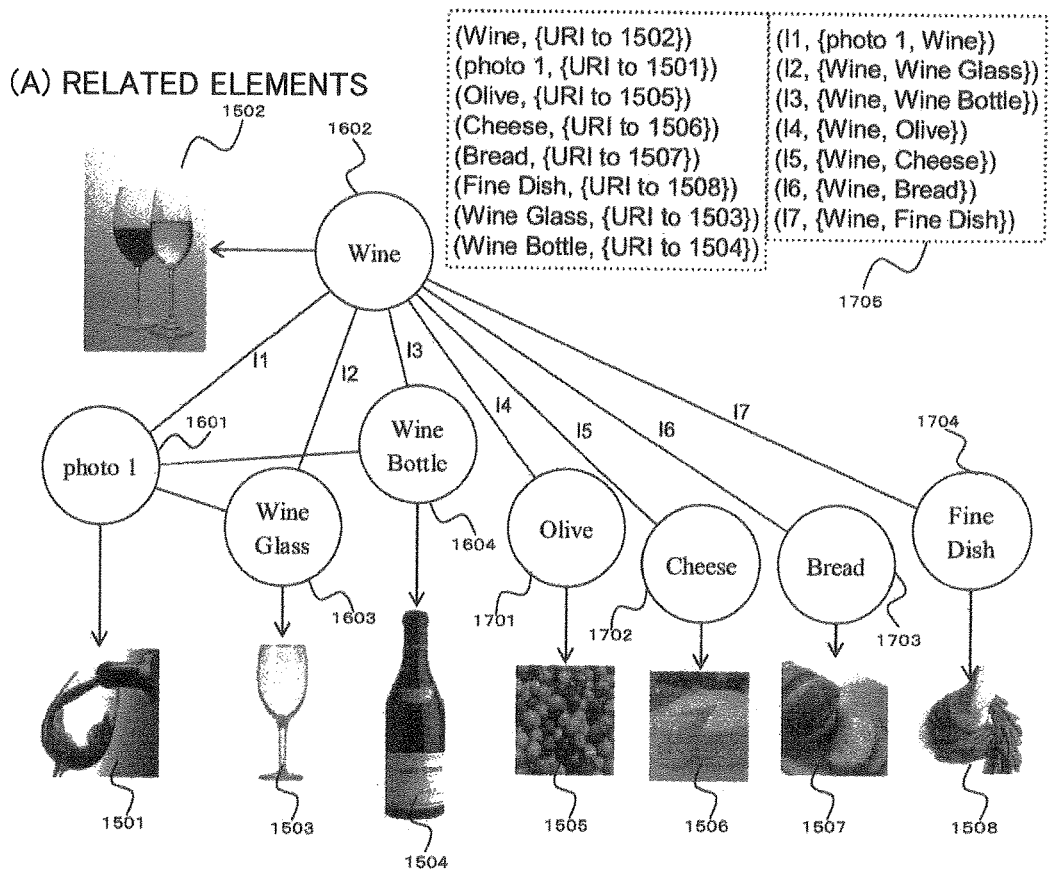
(B) GRAPH STRUCTURE FOR RELATED ELEMETNS
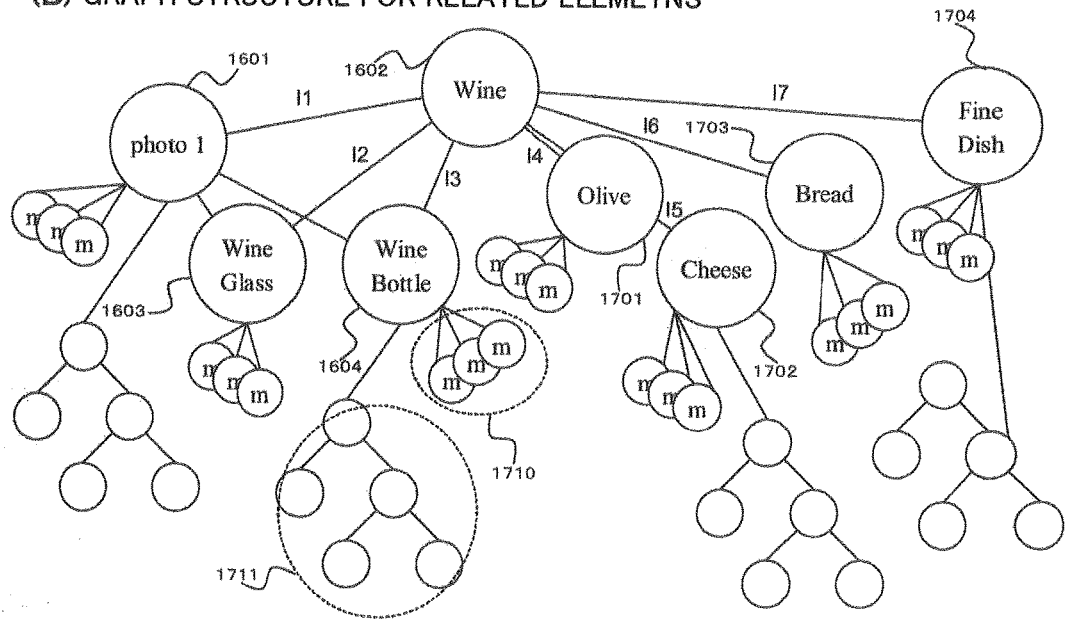

FIG.18
(A)
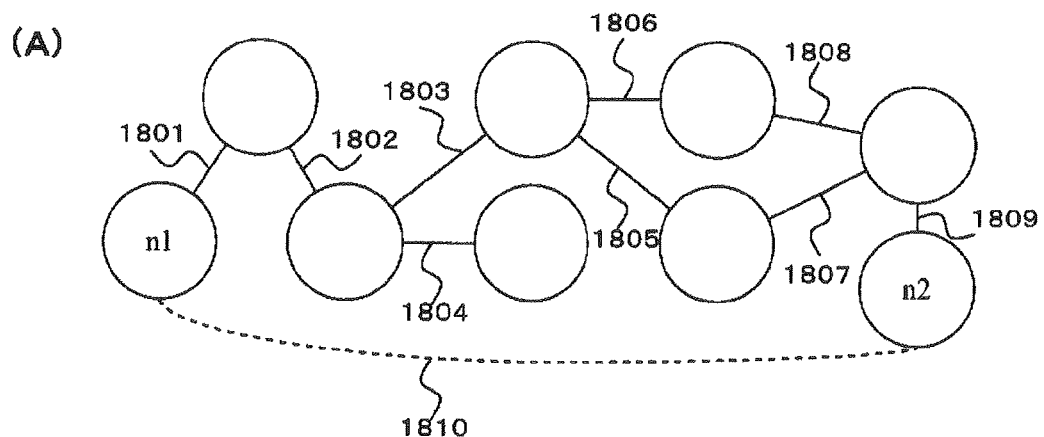
(B) $$v1 = \begin{Bmatrix} f_{1801} \\ f_{1802} \\ f_{1803} \\ f_{1804} \\ f_{1805} \\ f_{1806} \\ f_{1807} \\ f_{1808} \\ f_{1809} \end{Bmatrix}$$
(C) 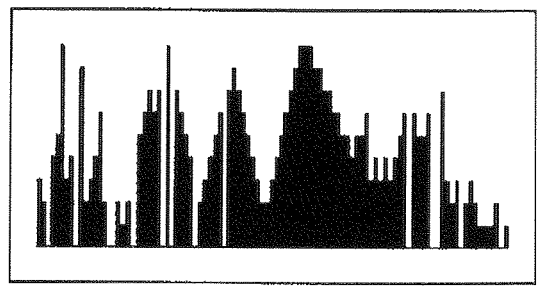

FIG.19
(A)
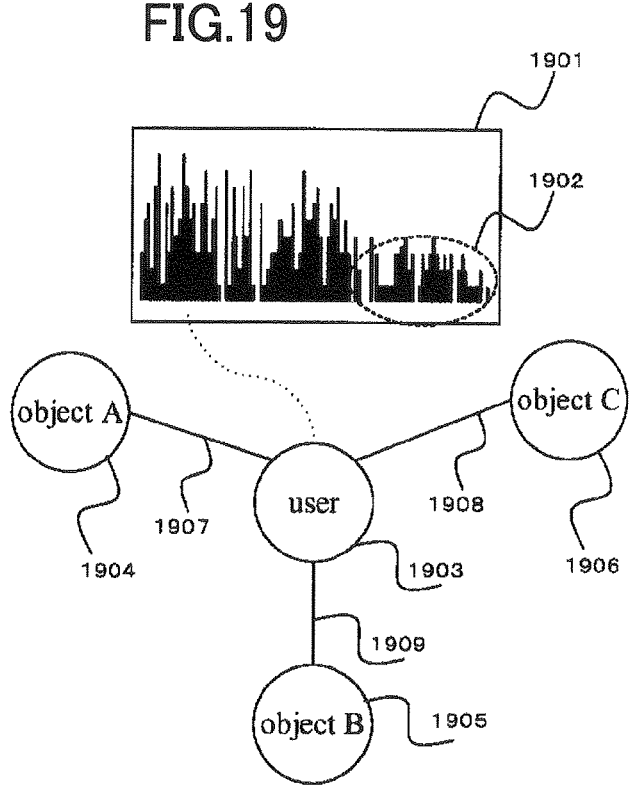
(B)
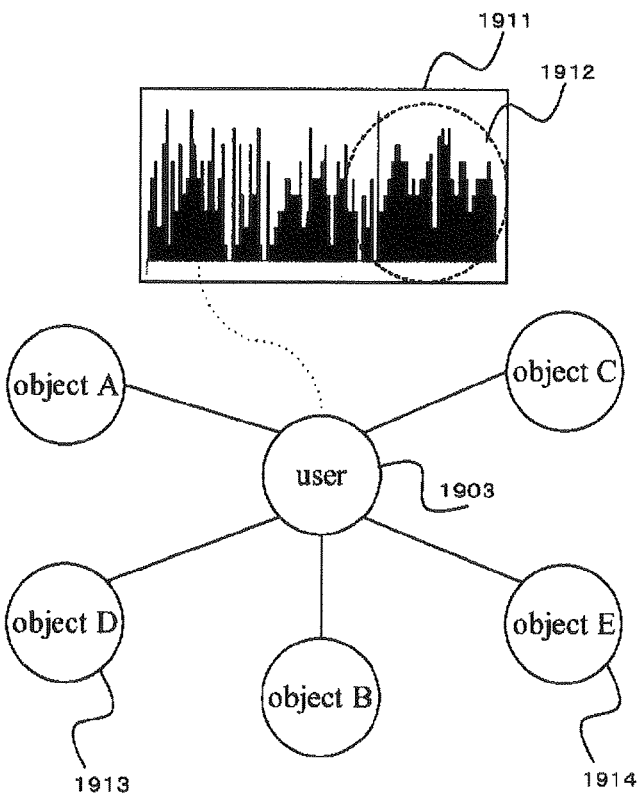

FIG.20B
(A) TIME AXIS
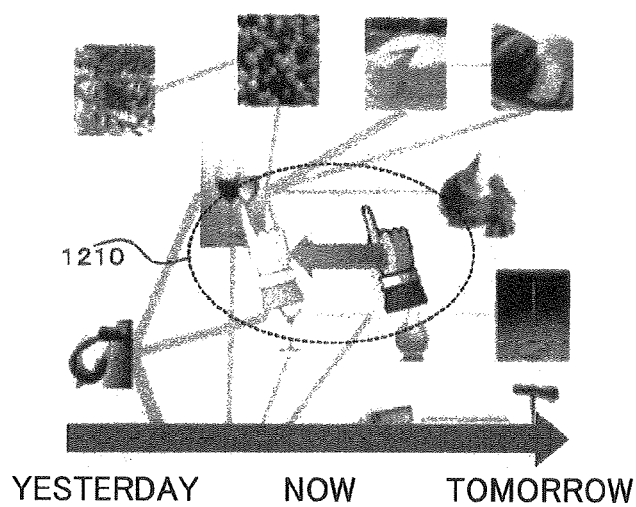
YESTERDAY　　NOW　　TOMORROW
(B) CORRESPONDING TIME DISPLAY
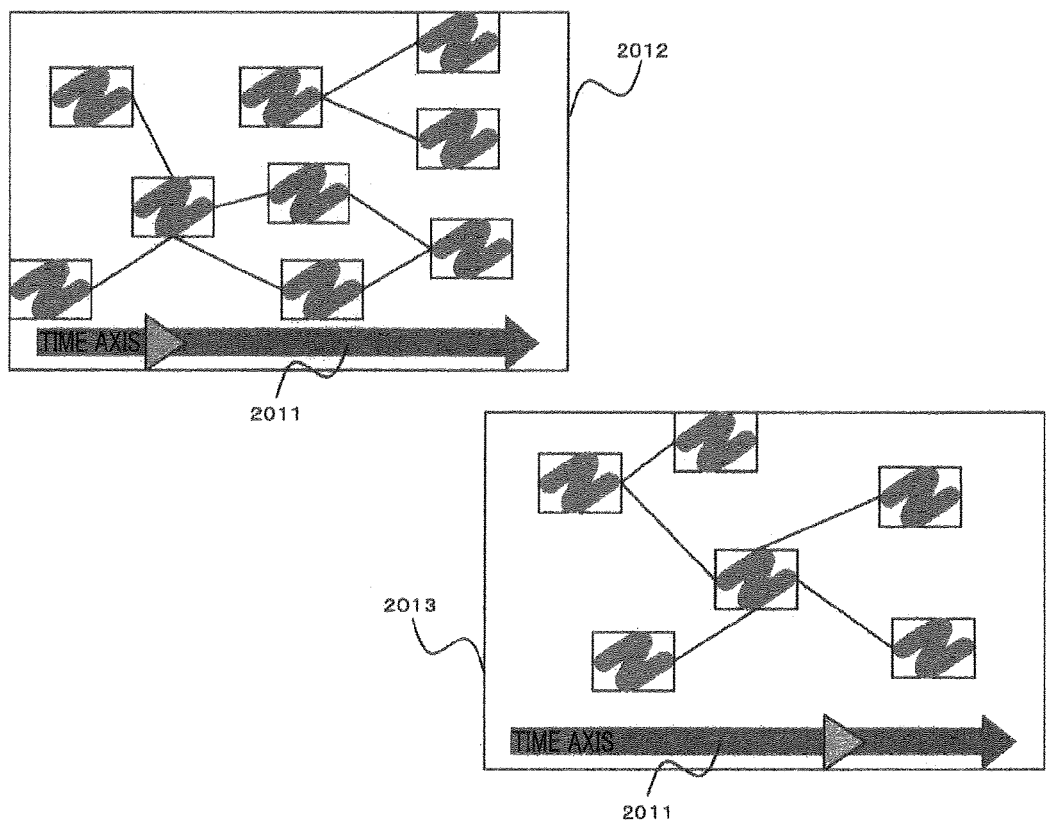

FIG.20C
(A)
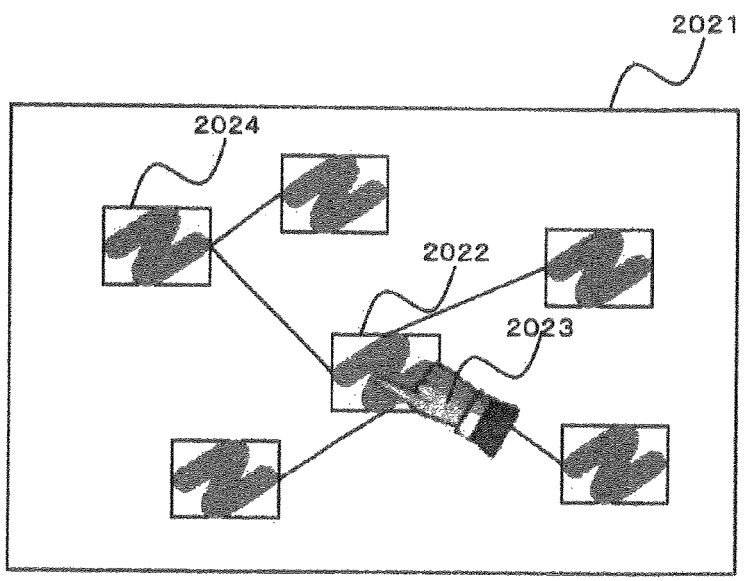
(B)
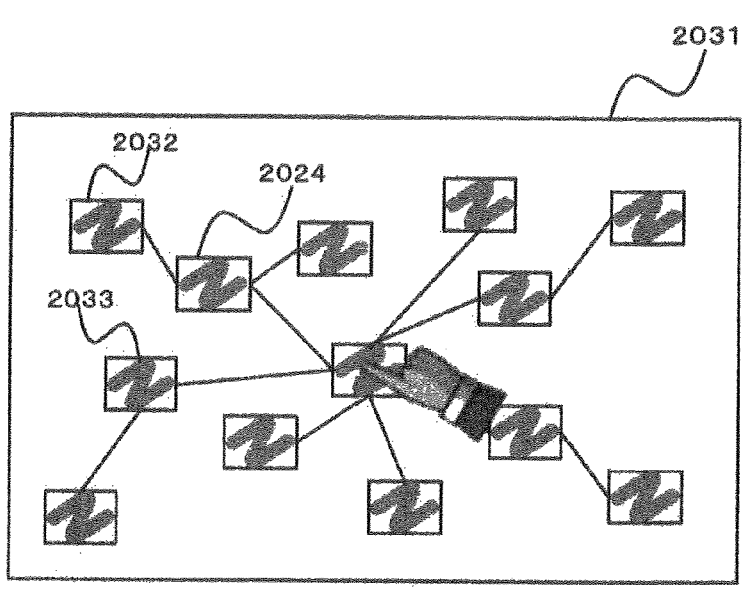

FIG.21
(A)
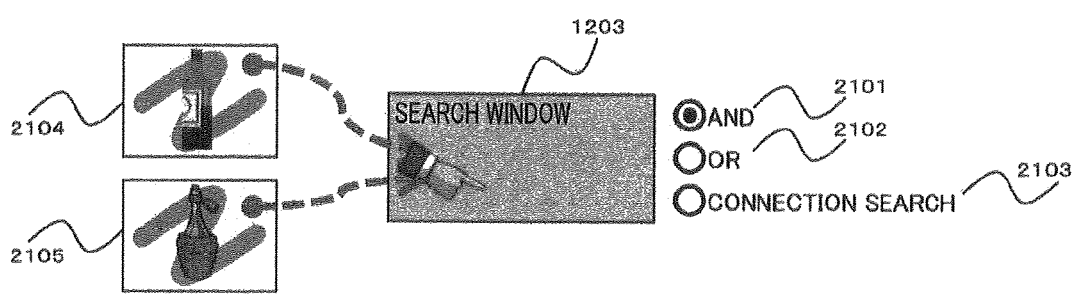
(B)
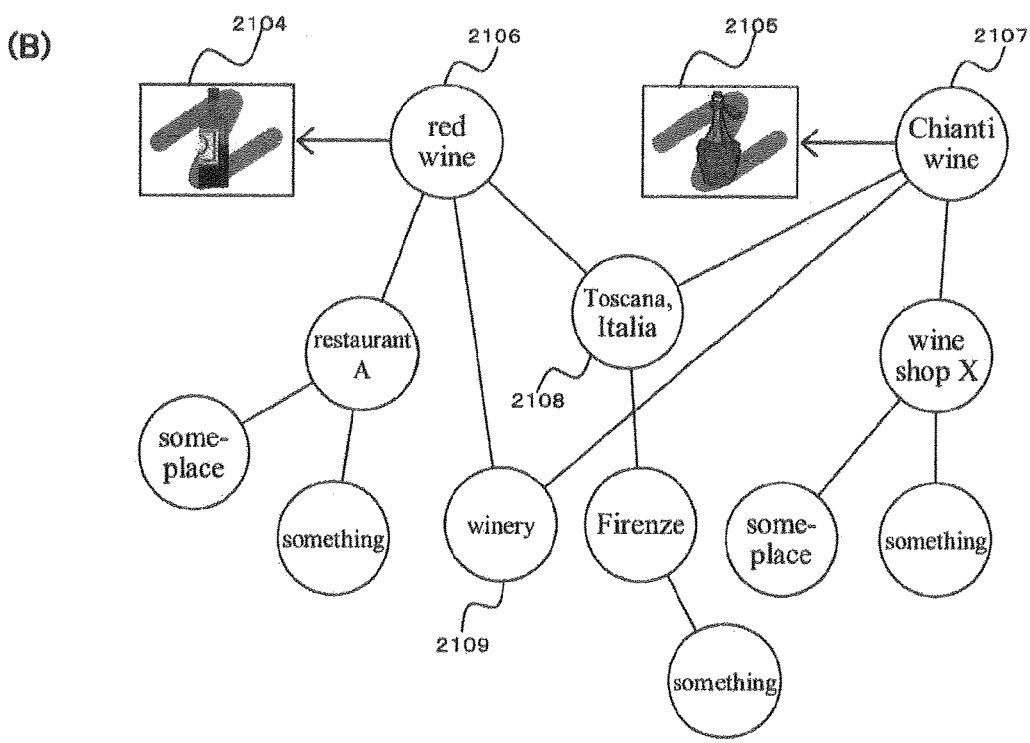

FIG.22
(A)
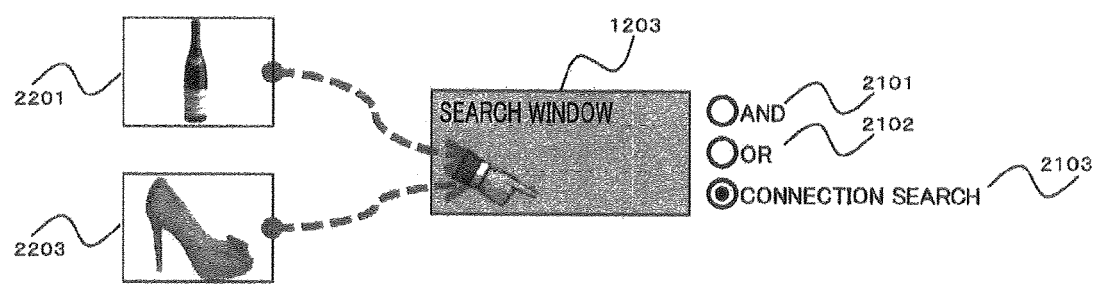
(B)
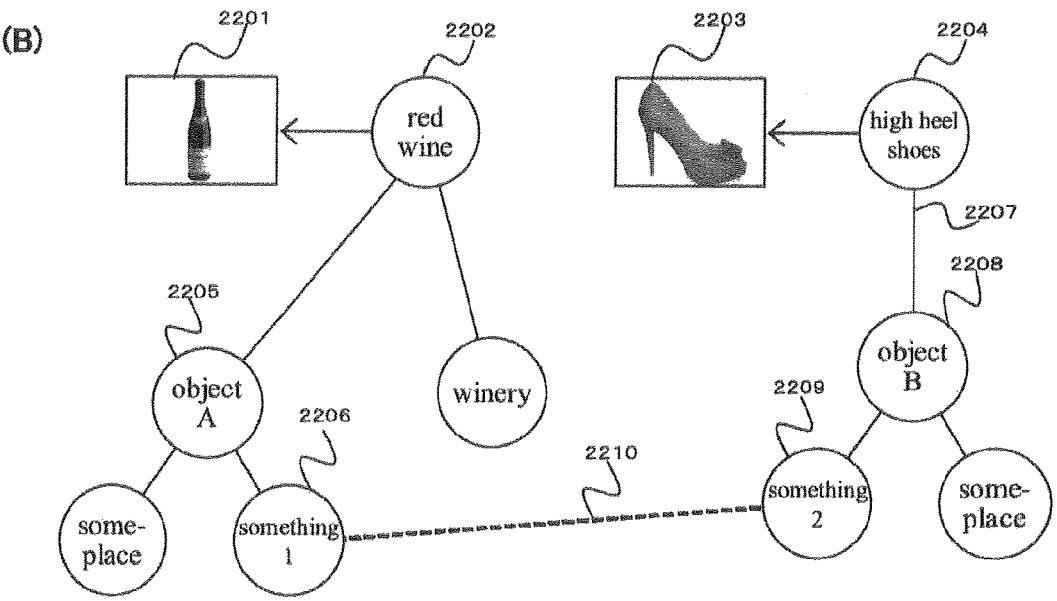

FIG.24A
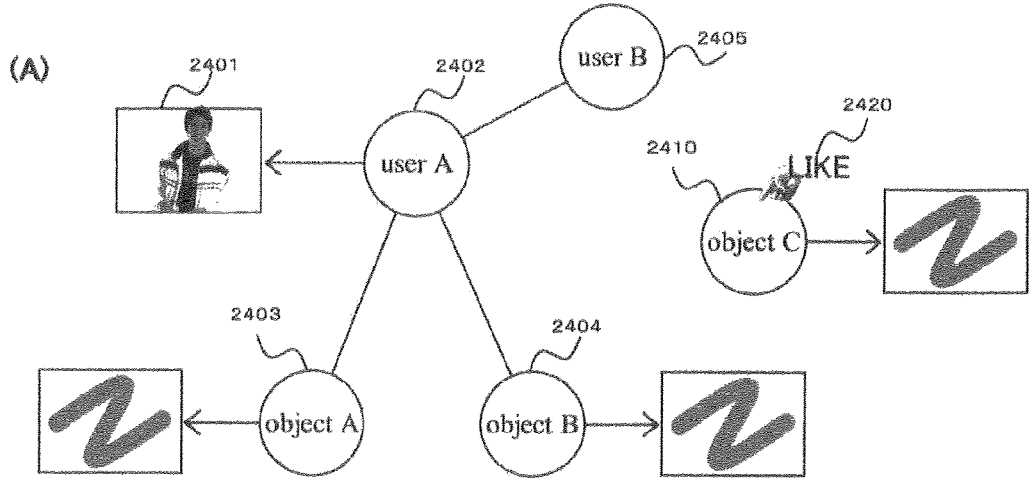
(A)
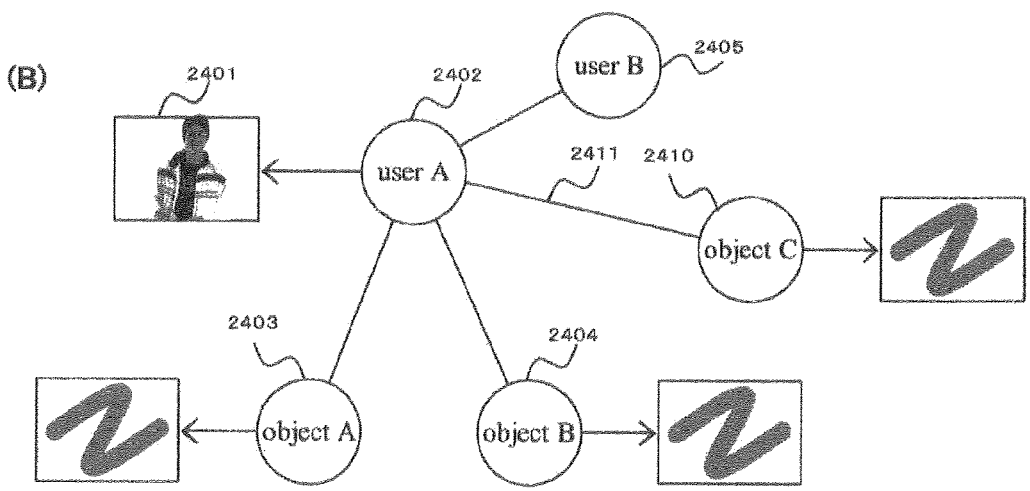
(B)
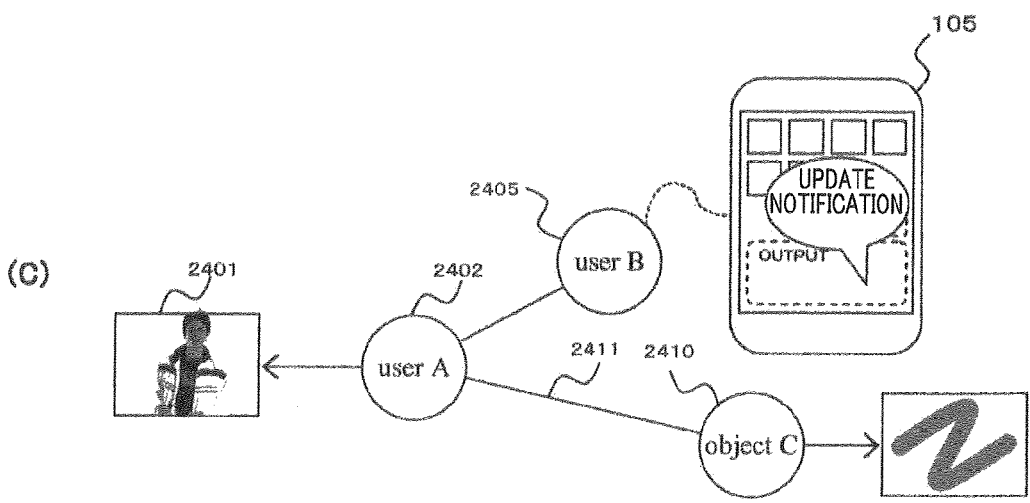
(C)

FIG.28
SPECIFIC USER FILTERING PROCESSING UNIT 210
(A)
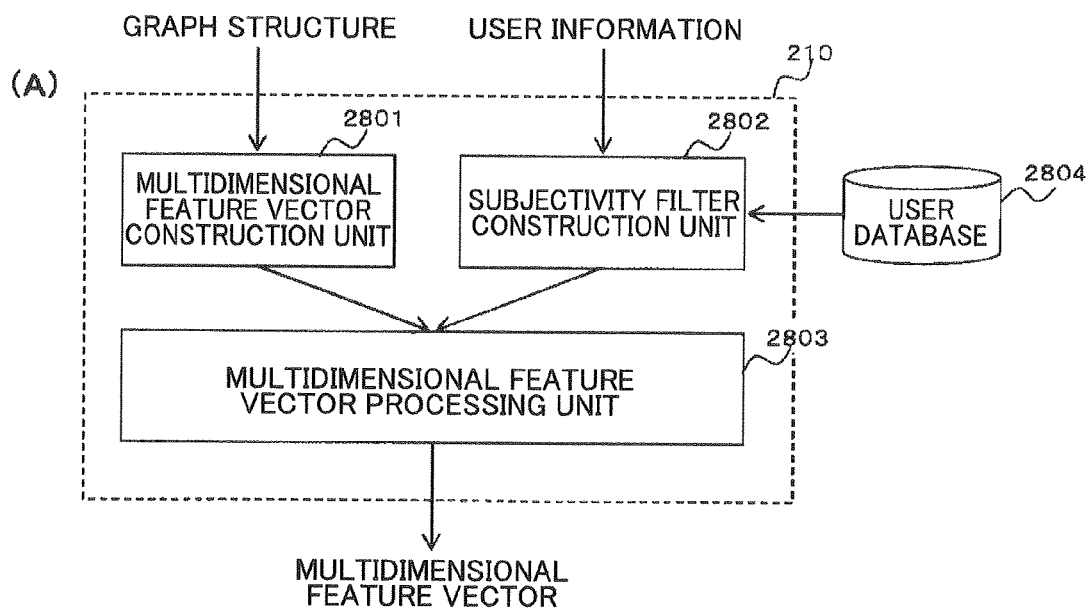
(B) USER'S SUBJECTIVE EVALUATION FILTER
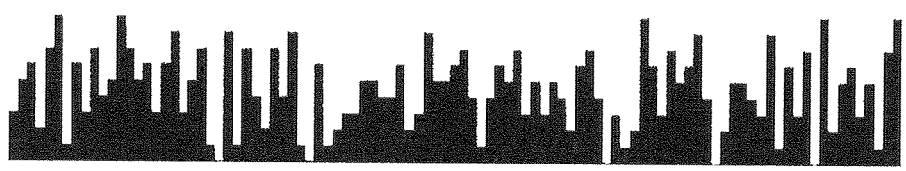
(C) DEPTH OF CONNECTION BETWEEN NODES REFLECTING USER'S SUBJECTIVE EVALUATION
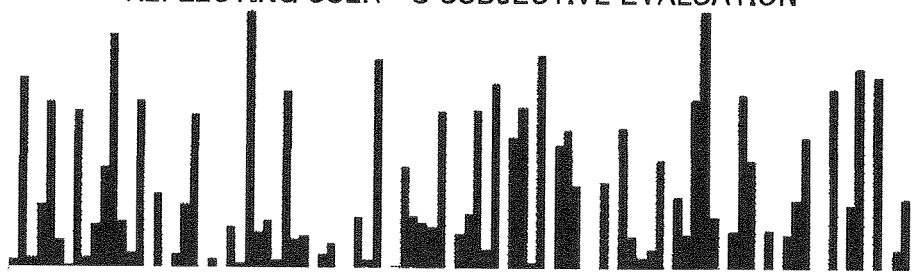

FIG.29
(A)
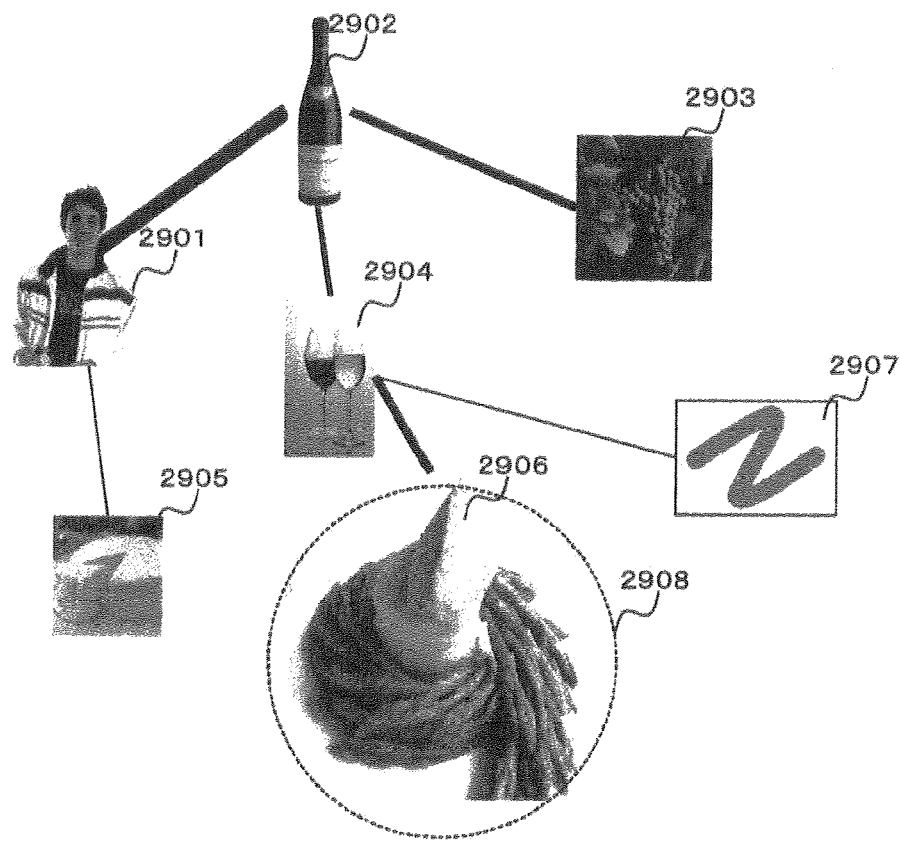
(B)
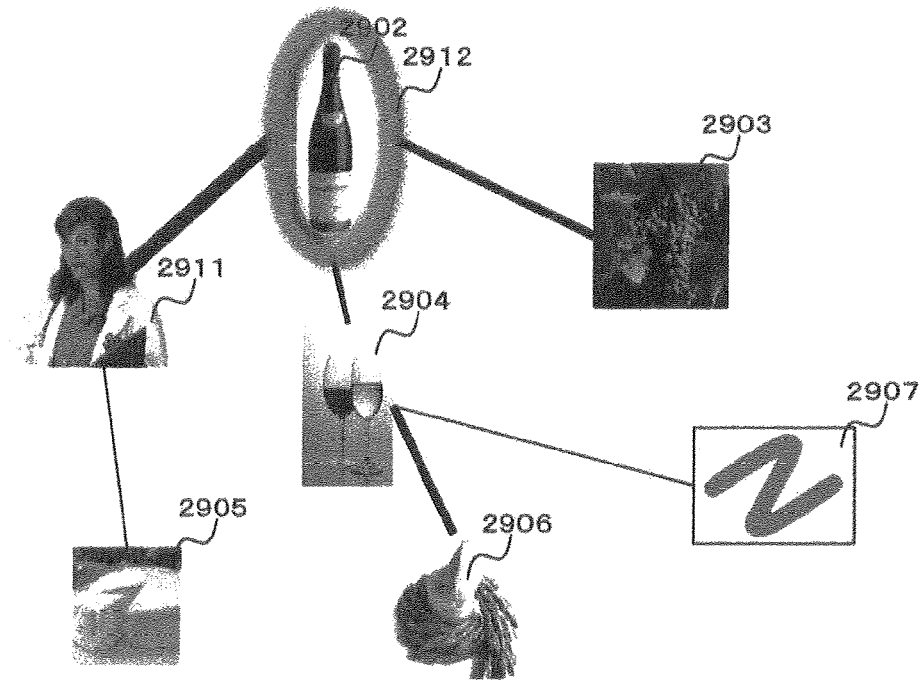

FIG.30
(A)
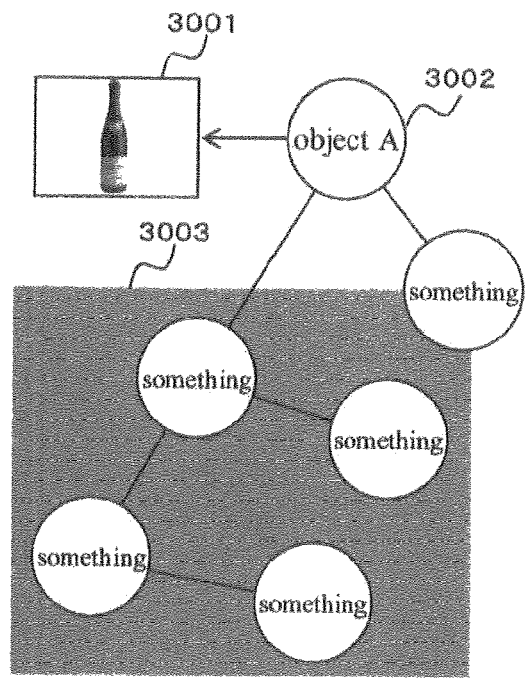
(B)
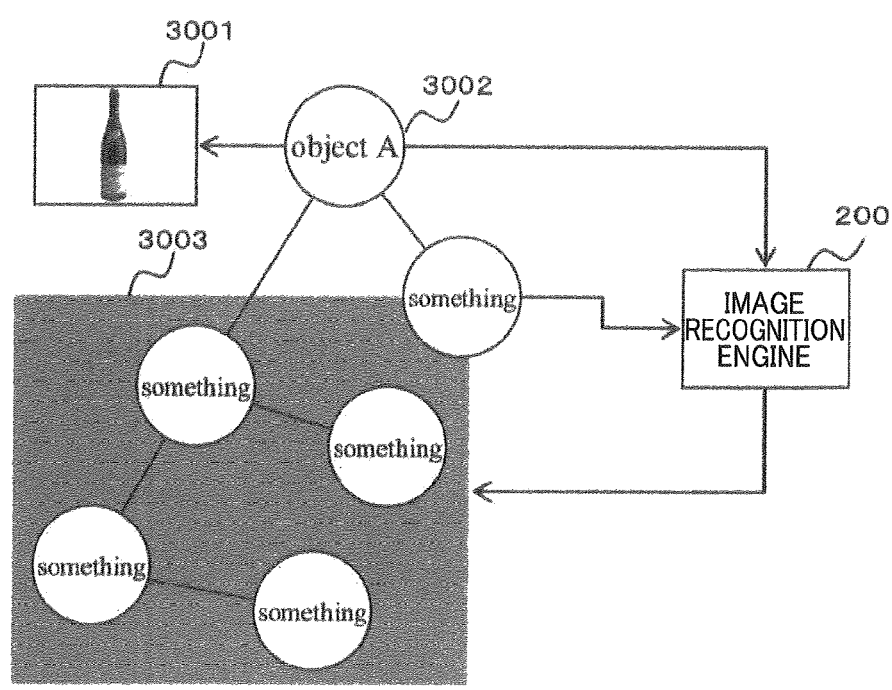

INTEREST GRAPH COLLECTION PROCESS DIAGRAM

FIG.35
IMAGE OF MULTIDIMENSIONAL FEATURE VECTOR
CORRESPONDING TO INTEREST GRAPH FOR EACH USER
(A)   MULTIDIMENSIONAL FEATURE VECTOR FOR A
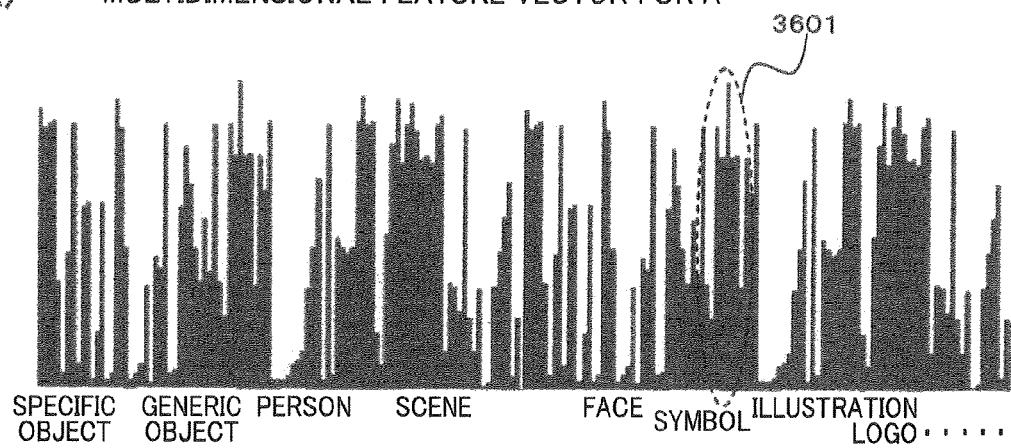
(B)   MULTIDIMENSIONAL FEATURE VECTOR FOR B
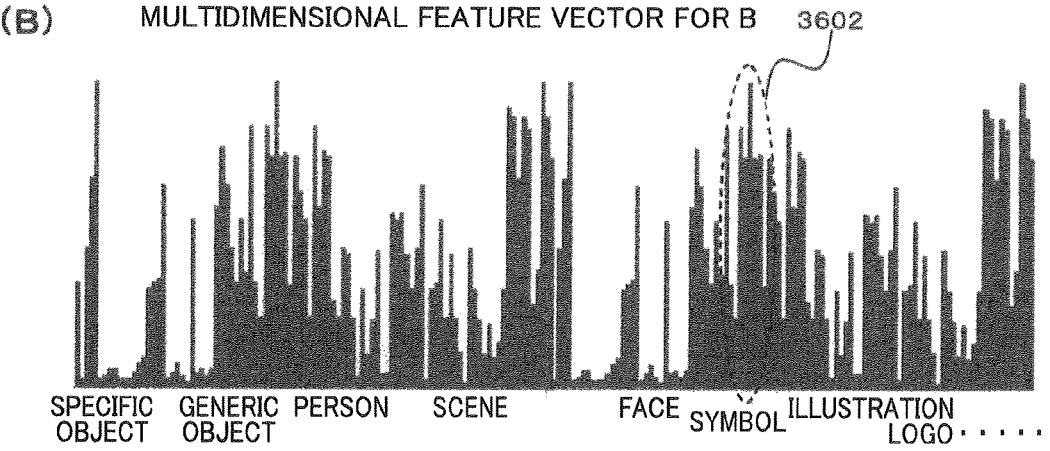

SYSTEM FOR COLLECTING INTEREST GRAPH BY RELEVANCE SEARCH INCORPORATING IMAGE RECOGNITION SYSTEM

BACKGROUND

Technical Field

The present invention provides a system that uses a relevance search system provided with an image recognition engine constructed on the server side via a network to visualize and present on a network terminal of a user links between image components that can be recognized by the image recognition engine and other elements associated with the image components by the relevance search system, and the depths of the links, and to allow a user to visually search for and detect target objects, and also relates to a system for analyzing interest of a user and transition of the interest through the process on the server side and collecting them as an interest graph for an individual user, or for a specific group of users, or for all users on the server side.

Description of the Related Art

As a typical conventional means for grasping interests of users, a method of sending questionnaires to users in writing or in an alternative way, asking about categories of special interests to users from among several selectable candidates, and further the degree of recognition or the like on specific products or services with a measure for staged evaluation, and collecting responses to utilize them for marketing activity has been used frequently. In recent years, various services utilizing the Internet have appeared which ask, as part of user registration at the start of contracts, users to enter categories or the like of special interests to the users, for example, thus being able to provide related products or services reflecting likes of individual users.

Further, some sites conducting sales of goods utilizing the Internet can provide products or services with higher matching accuracy for more diversifying users by, for example, additionally presenting recommended products or related services from the buying histories or the site browsing histories of users, or presenting similar product recommendations on terminals of users yet to buy, based on history information on what else other users buying the same product bought (Patent Literature 1).

Moreover, with expansion of social network services in recent years, users themselves enter their regions of interests, likes, and so on in their respective user profiles, or click the "Like" button to writing, photographs, moving images, or the like posted by other uses, so that positive feedback from the users is reflected on the site, and also a new attempt based on the like information has already been started (Patent Literature 2). Furthermore, a service for transmitting a short message within 140 characters on the Internet has presented an idea of effectively determining interests of users by utilizing the characteristics that a large number of interested users follow a specific sender or a specific topic, and classifying and analyzing the content of the main topic or theme.

As an example of determining interests of users, there is a device implementing an algorithm for estimating changing interests of users in real time from words spread between files browsed by the users. (Patent Literature 3).

Specifically, the device disclosed in Patent Literature 3 includes means for inputting words included in a plurality of files from the browsing history of a user as text for each file, means for dividing the text into word units, means for extracting a "spreading word" referred to by the user between the plurality of files browsed by the user, means for storing one or a plurality of "spreading words," means for determining a given "degree of influence" from the frequency of appearance of the "spreading word(s)" in all the files, and a given iDF value representing the degree of appearance of the "spreading word(s)" in a specific file, and means for extracting a collection of words of interest to the user as user profile information in accordance with a "influence degree iDF value" as a function of the "degree of influence" and the iDF value.

Further, a device or the like that represents a content system by a graph system including the relationships between users and items, and allows users to easily and accurately search for content of interest depending on semantic information is disclosed (Patent Literature 4).

Specifically, the device or the like disclosed in Patent Literature 4 includes approximation degree measurement means for measuring the degree of approximation in interests between users by receiving the supply of interest ontology data representing interest ontology in which individual persons' interests are hierarchically class-structured and measuring the degree of approximation between the interest ontology supplied, user graph formation means for forming data of a user graph that allows recognition of a user community in which the degree of approximation between the interest ontology is within a predetermined range based on the results of measurement by the approximation degree measurement means, and user graph reconstruction means for reconstructing the relationships between users on a graph base by managing data on user graphs formed by the user graph formation means and imparting semantic information by taxonomy to edges connecting a plurality of users constituting nodes in a graph based on the data of the user graph.

CITATION LIST

Patent Literature

Patent Literature 1: JP-A-2001-222586
Patent Literature 2: U.S. Pat. No. 7,788,260
Patent Literature 3: JP-A-2007-264718
Patent Literature 4: JP-A-2009-205289

BRIEF SUMMARY

Technical Problem

However, in terms of obtaining regions of interests of users, in conventional methods by questionnaires and profile entry at user registration, individual users are limited to stating their likes and interests to crude regions. Also, it can be said that with the "Like" button frequently used in a social network service in recent years, users do not show their regions of interests but only indirectly follow regions of interests of friends. In the first place, a friend list itself does not necessarily comprehensively indicate all friends of the user. A service that allows users to follow various messages on the network within 140 characters has been expected to allow the acquisition of fresher regions of interests of users compared to conventional network services in terms of frequencies of messages, real-time properties, and novelty of topics. However, as for whether regions of interests of users themselves can be comprehensively and accurately obtained by their casual messages and by following messages of others, the target regions themselves are extremely limited.

In the technologies disclosed in Patent Literature 3 and Patent Literature 4 also, processing premised on documents and words is performed. To begin with, ideographical expressions by characters clearly reflect differences in culture and custom as the background, and cannot be said at all to be intuitive and common communications means for people all over the world. From ancient times, as the proverb "A picture is worth a thousand words" says, only a single image shows a situation more accurately than many words in many cases. An image contains various objects together with depiction of the subject and the situation therein, and is generally recognizable by people from any country. Animals other than human beings acquire a considerable part of information from sight, and instantaneously grasp the environment and decide on the next action. Hence, by a conventional character-based method, ambiguities in expression due to multilingualism are left, and at the same time, it is difficult to attempt to acquire effectively and in real time or acquire interactively ever-changing interests of users, destinations of interests, and the like.

Further, it has been extremely difficult heretofore in time and methodology to effectively and comprehensively acquire, for an enormous number of people, regions of interest or regions that may be of interest of the individual people, and acquisition has been limited to interests within a fixed range. A method for effectively searching for and acquiring interests of users in a wider range has been awaited.

Therefore, the invention has an objective of acquiring comprehensively and effectively targets and regions of interest unique to users on the server side as an interest graph for an individual user, or for a specific group of users, or for all users commonly more effectively than before, by utilizing image information containing various objects together with the subject and environment without characters, and in order to effectively acquire ever-changing interests of users in the process of searching for images of interest by users, detecting in real time individual image components contained in those images with the assistance of an image recognition engine, visualizing the recognized individual image components and also other related elements with high relevance together with the assistance of a relevance search system, and allowing the users to search for targets of interest visually and interactively.

Solution to Problem

An interest graph collection system according to an aspect of the present invention is a search system using image information containing various objects and subjects as input means, instead of using input means using ideographical characters such as a keyword, metadata, or writing. The interest graph collection system includes: a network terminal on which a user selects, from among a large number of images existing on the Internet or on a dedicated network or images uploaded on the Internet by the user via the network terminal, an entire image or a specific region of an image in which the user has an interest; an image recognition engine on the server side, when queried by the user about the selected image via the network, extracting and recognizing in real time various objects such as a generic object, a specific object, a person, a face, a scene, characters, a sign, an illustration, a logo, and a favicon contained in the selected entire image or the specified image region; and a relevance search engine on the server side, when notified of image components contained in the recognized input image via the image recognition engine, determining other related elements directly or indirectly related to the individual image components to a certain degree or more, extracting the related elements based on multidimensional feature vectors describing direct relationships between elements held on a relevance knowledge database in the relevance search engine in a learnable manner, and visually representing the image components recognized by the image recognition engine and the related elements extracted by the relevance search engine as nodes in a relevance graph together with the depths of relationships between the nodes on the network terminal of the user as a two-dimensional image, or a three-dimensional image with depth, or a four-dimensional spatiotemporal image to which a time axis variable as observation time of the relevance graph is added.

In the interest graph collection system according to another aspect of the present invention, in the relevance search operation, by the user tapping or touching on a touch screen an arbitrary node on the relevance graph displayed on the network terminal for selection, or moving a cursor of a pointer onto an arbitrary node for selection, or by the user flicking on the touch screen toward an arbitrary region on the relevance graph, or moving a cursor of a pointer to an arbitrary region on the relevance graph and dragging and scrolling an entire image, or using a cursor key or the like for a similar operation, or using an input operation having a similar effect using a gesture, a line of sight, voice, or a brain wave, the relevance search engine additionally transmits a new relevance graph centered on the selected node or the region after the move, including a course thereto, so that the user can visually recognize broad relationships between a plurality of nodes on the relevance graph, seamlessly tracing a node or a region of interest to the user.

In the interest graph collection system according to another aspect of the present invention, in the relevance search operation, a more detailed relevance graph centered on a specific image component selected by the user from among a plurality of image components presented by the image recognition engine, or a specific node on the relevance graph displayed on the network terminal selected by the user double tapping or pinching out the node on the touchscreen, or operating a pointer or the like, enlarging a region centered on the node, or by the user using an input operation having a similar effect using a gesture, a line of sight, voice, or a brainwave, can be visually represented on the network terminal of the user; the series of operations being considered to show a certain degree of interest of the user to the node, a feature vector value representing the depth of interest of the user in the node is adaptively increased on a multidimensional feature vector describing direct relationships between elements with the user as the center node to allow an interest graph corresponding to an individual user with the user as the center node to be acquired; and the interest graph can be expanded to a wide range of users for acquisition to be collected as a statistical broad interest graph over a specific user cluster or all users.

In the interest graph collection system according to another aspect of the present invention, in the relevance search operation, by the user, not tracing a selected node of interest on the relevance graph, querying again the image recognition engine on the server side about the images of the node via the network, new image components related to the node are acquired with the assistance of the image recognition engine, and new related elements starting from the image components are transmitted from the relevance search engine to the network terminal, so that the user can visually recognize new relationships to the node together with the depths of the mutual relationships on a relevance graph; and the relevance search engine presumes that the user recognizes and uses the existence of relationships between a series of nodes leading to the node from the image component as the starting point to the node in the last similar operation, and adaptively increases feature vector values representing the depths of direct relationships between nodes constituting the series of relationships on the multidimensional feature vector describing direct relationships between elements to allow the relevance knowledge database in the relevance search engine to learn additionally.

In the interest graph collection system according to another aspect of the present invention, in the relevance search operation, for the image components that can be recognized by the image recognition engine and the related elements associated with the image components, reduced image thumbnails generated from a photograph, an illustration, characters, a sign, a logo, a favicon, and the like representing the image components and the related elements are transmitted to the network terminal in place of the original image by the relevance search engine, so that nodes on a relevance graph can be displayed and selected in units of image thumbnails.

In the interest graph collection system according to another aspect of the present invention, in the relevance search operation, it is made possible to query the image recognition engine on the server side about a plurality of nodes; and as input condition selection functions included in an image recognition process, logical operators (AND and OR) are introduced, so that when AND is selected, a node commonly and directly related to the nodes, and when OR is selected, a node directly related to at least one of the nodes can be visually represented on the network terminal together with the depth of the mutual relationship.

In the interest graph collection system according to another aspect of the present invention, in the relevance search operation, it is made possible to query the image recognition engine on the server side about a plurality of nodes; as an input condition selection function included in an image recognition process, a connection search operator (Connection Search) is introduced, so that a connection between the plurality of nodes that seems to have no connection at all is searched for as a series of connections via other nodes directly and indirectly related to their respective input nodes, to detect an indirect relationship between the node across different layers (classes); and the nodes can be displayed on the network terminal in a relevance graph including the shortest path between the nodes, and at the same time, in the connection search process, the detected indirect relationship between the plurality of nodes is learned and acquired in the relevance knowledge database in the relevance search engine to be prepared for the same or a similar connection search request afterward.

In the interest graph collection system according to another aspect of the present invention, in the relevance search operation, a connection operator (LIKE) for connecting a node indirectly related to the user or a node regarded as having no relevance to the user and the user as a direct relationship, and a disconnection operator (DISLIKE) for cutting the direct relationship between the node already connected and the user are introduced, so that a value representing the depth of interest of the user in the node is increased, reduced, or erased on a multidimensional feature vector describing the direct relationships between the elements with the user as the center node to update the interest graph corresponding to the individual user with the user as the center node.

In the interest graph collection system according to another aspect of the present invention, in the relevance search operation, for the possibility of existence and non-existence of a new direct relationship for a node other than the user, a reference operator (REFERENCE) for presenting that the nodes should be directly connected, and an unreference operator (UNREFERENECE) for presenting non-existence of a direct relationship as the existence of the direct relationship of the node already directly connected is doubtful are introduced to allow the relevance search engine to draw attention of the user to the possibility of existence or non-existence of the new direct relationship between the nodes; and the relevance search engine can update the value of a feature vector on a relationship between nodes judged to be related or unrelated by a supervisor having specific authority or more than a fixed number of users; and the update can be reflected as an updated relevance graph for the nodes on the network terminal, and all users can be notified of update information on the existence or non-existence of the new direct relationship.

Advantageous Effect of Invention

A system according to the invention enables information search processing with an images itself as input means without using characters, instead of information search means through search by characters that requires multilingual support, so that a language-free search system for users in a wider range of countries and regions can be provided. Further, both search input and search result are replaced conventional characters with image information, so that more intuitive search and detection of information for human beings is allowed. In addition, even on network terminals with a relatively small-sized display screen, shifting an input and output operation from characters to an image-based user interface (UI) such as image thumbnails and icons enables an advanced search operation with a fingertip or a simple pointing operation by the users. Thus more comfortable search environment can be provided than before. This can arouse more frequent retrievals and searches than before, which are statistically processed on the server side, thus having the effect of enabling acquisition of a fresher and more dynamic interest graph.

BRIEF DESCRIPTION OF THE DRAWINGS

FIG. 4 is an explanatory diagram illustrating an image recognition flow in the system according to the embodiment of the invention.

FIG. 5 is an explanatory diagram illustrating another image recognition flow in the system according to the embodiment of the invention.

FIGS. 7(A) to 7(C) are explanatory diagrams illustrating functions of a local feature quantity extraction unit in the system according to another embodiment of the invention.

FIGS. 10(A) and 10(B) are explanatory diagrams illustrating an example of scene classification in the system according to another embodiment of the invention.

FIGS. 12A(A) and 12A(B) are explanatory diagrams illustrating a user interface in the system according to the embodiment of the invention.

FIGS. 12B(A) and 12B(B) are explanatory diagrams illustrating a user interface in the system according to another embodiment of the invention.

FIGS. 14A(A) to 14A(E) are explanatory diagrams illustrating a basic data structure for representing a graph in the system according to the embodiment of the invention.

FIGS. 16(A) and 16(B) are explanatory diagrams illustrating graph structures and others according to a scenario in the system according to the embodiment of the invention.

FIGS. 17(A) and 17(B) are explanatory diagrams illustrating graph structures and others according to a scenario in the system according to the embodiment of the invention.

FIGS. 18(A) to 18(C) are explanatory diagrams illustrating an example of relevance derivation operation in the system according to the embodiment of the invention.

FIGS. 19(A) and 19(B) are explanatory diagrams illustrating an operation of interest graph acquisition in the system according to the embodiment of the invention.

FIGS. 20B(A) and 20B(B) are explanatory diagrams illustrating an example of display of a graph structure in the system according to another embodiment of the invention.

FIGS. 20C(A) and 20C(B) are explanatory diagrams illustrating an example of display of a graph structure in the system according to another embodiment of the invention.

FIGS. 21(A) and 21(B) are explanatory diagrams illustrating an example of operation in the system according to another embodiment of the invention.

FIGS. 22(A) and 22(B) are explanatory diagrams illustrating an example of operation in the system according to another embodiment of the invention.

FIGS. 24A(A) to 24A(C) are explanatory diagrams illustrating an example of operation in the system according to another embodiment of the invention.

FIGS. 28(A) to 28(C) are explanatory diagrams illustrating functional blocks of a specific user filtering processing unit in the system according to the embodiment of the invention.

FIGS. 29(A) and 29(B) are explanatory diagrams illustrating an example of representation in the system according to the embodiment of the invention.

FIGS. 30(A) and 30(B) are explanatory diagrams illustrating an example of operation in the system according to another embodiment of the invention.

FIGS. 35(A) and 35(B) are explanatory diagrams illustrating multidimensional feature vectors corresponding to interest graphs for users in the system according to another embodiment of the invention.

DETAILED DESCRIPTION

Hereinafter, an embodiment for implementing a system according to the invention will be described in detail with reference to the drawings.

Figure 1:
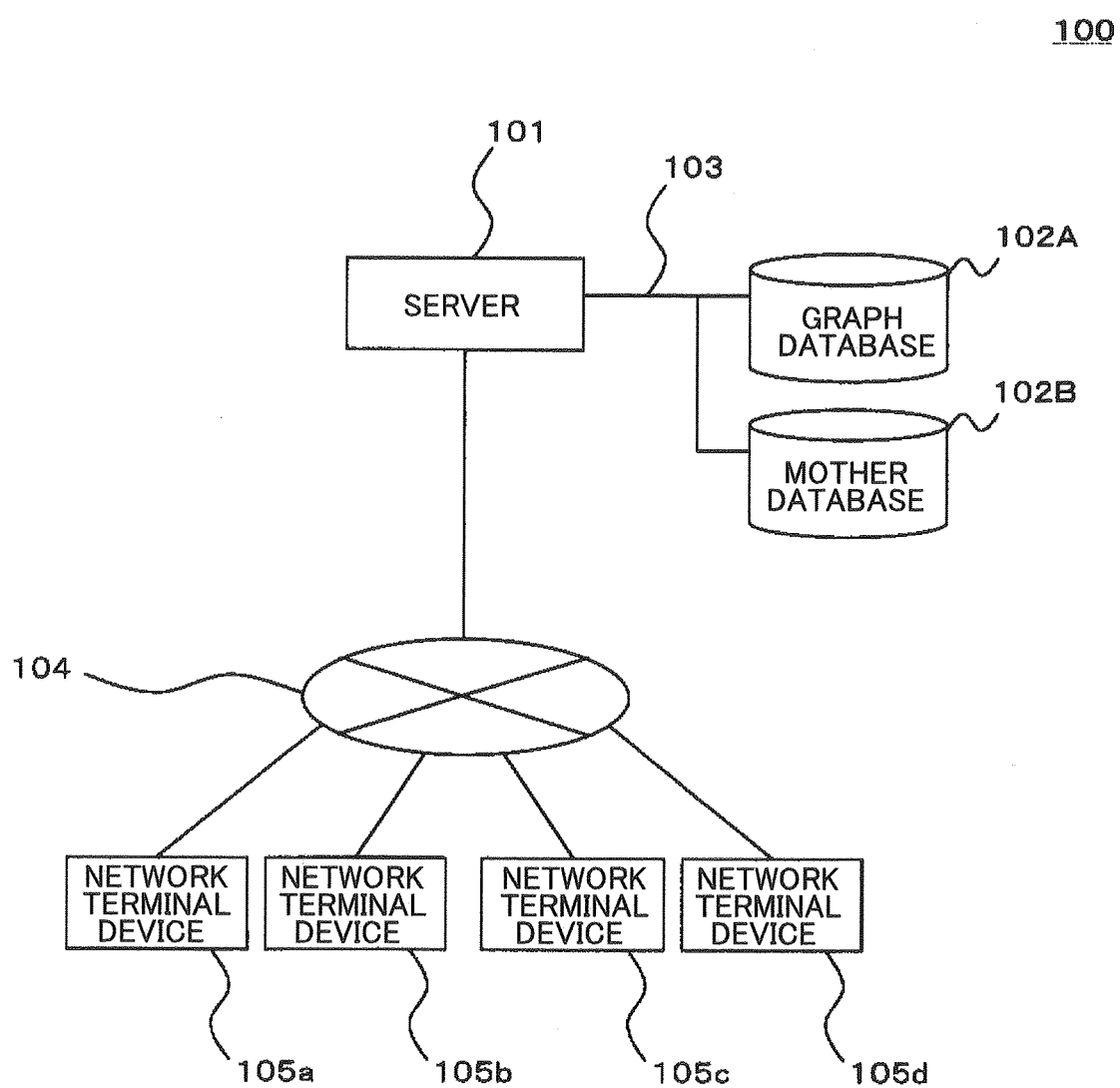
FIG. 1 is an explanatory diagram illustrating a system configuration of a system according to an embodiment of the invention.

FIG. 1 shows a system according to an embodiment of the invention. A system 100 includes a server 101, a graph database (hereinafter, also referred to as "GDB") 102A, a mother database (hereinafter, also referred to as "MDB") 102B, and a plurality of network terminal devices 105a to 105d for use by users. The server 101, the GDB 102A, and the MDB 102B are connected by a connection 103. The server 101 and the network devices 105a to 105d are connected to a network or the Internet 104.

Here, the server is one or a plurality of computer programs for processing data in response to requests from clients, and providing the results as a service, which can be implemented on a computer system, or can be distributed over and implemented on systems of a plurality of computers. Moreover, the server can be implemented on one or a plurality of computer systems in parallel with other server functions. Furthermore, the server can be configured to have a plurality of independent processing functions. In the following description, the meaning of the server is defined as described above.

The computer system as hardware is an electronic computer including, as the most basic components, an arithmetic and logic unit, a control unit, a storage unit, and an input-output unit which are connected via an instruction bus and a data bus. Arithmetic operations, logic operations, comparison operations, shift operations, and the like are performed in the arithmetic and logic unit, based on information (bit data) entered from the input-output unit through an input-output interface. Processed data is stored in the storage unit as necessary, and output from the input-output unit. The process is controlled by a software program stored in the storage unit. Each server machine used in the embodiment of the invention is hardware including the above-described basic functions as a computer at a minimum, and is controlled by programs such as an operating system, a device driver, middleware, and application software.

Figure 2:
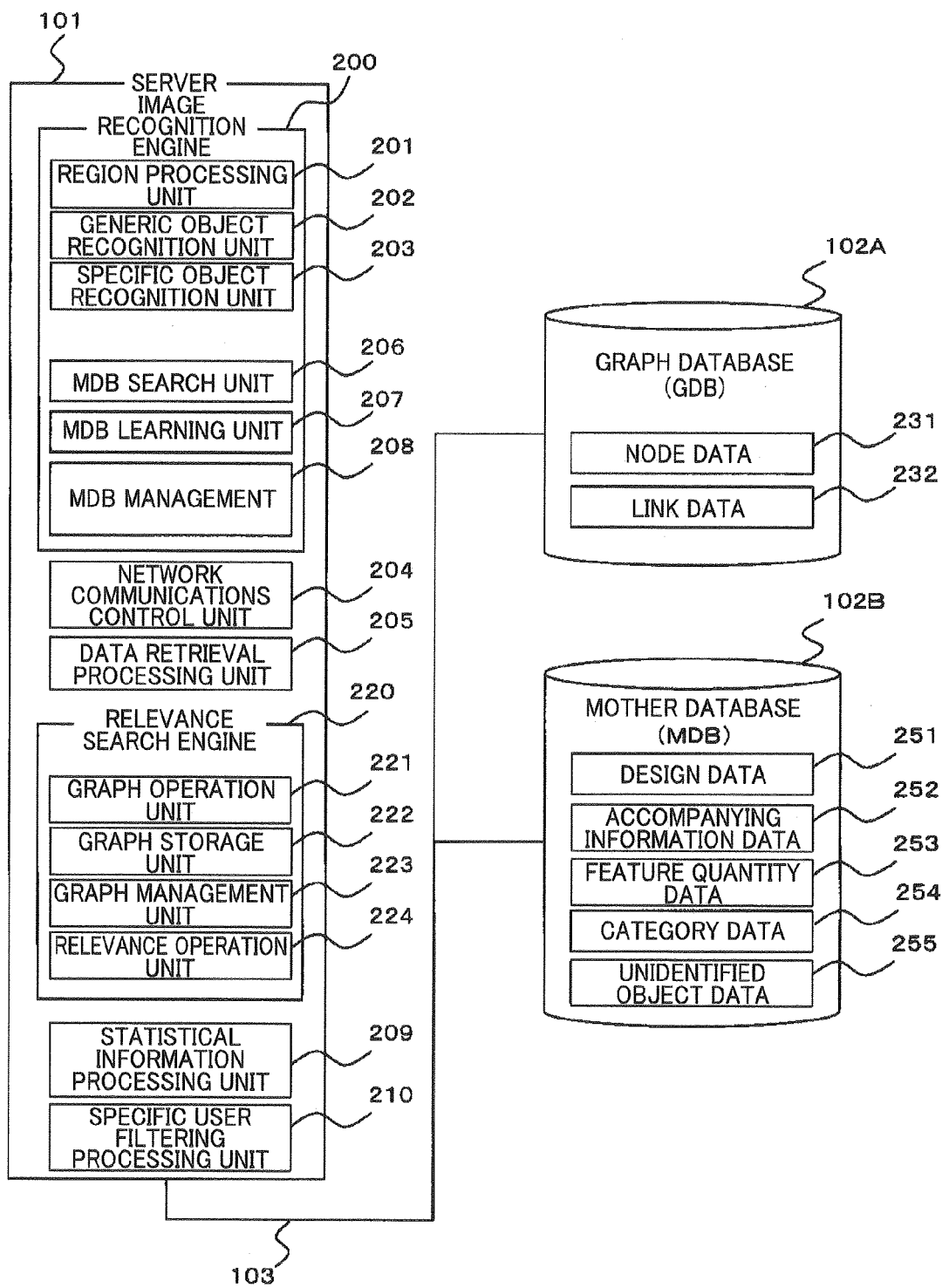
FIG. 2 is an explanatory diagram illustrating functional blocks of a server and an MDB in the system according to the embodiment of the invention.

FIG. 2 shows functional blocks of the server 101, and the GDB 102A and the MDB 102B in the system according to the embodiment of the invention. The server 101 includes, as software functional blocks, a region processing unit 201, a generic object recognition unit 202, a specific object recognition unit 203, an MDB search unit 206, an MDB learning unit 207, an MDB management unit 208, a network communication control unit 204, a data retrieval processing unit 205, a graph operation unit 221, a graph storage unit 222, a graph management unit 223, a relevance operation unit 224, a statistical information processing unit 209, and a specific user filtering processing unit 210.

The region processing unit 201, the generic object recognition unit 202, the specific object recognition unit 203, the MDB search unit 206, the MDB learning unit 207, and the MDB management unit 208 constitute an image recognition engine 200. The image recognition engine 200 may be replaced with an image recognition system shown in FIG. 6A described below. The graph operation unit 221, the graph storage unit 222, the graph management unit 223, and the relevance operation unit 224 constitute a relevance search engine 220.

Although the functional blocks of the server 101 are not necessarily limited to them, these typical functions will be briefly described.

The region processing unit 201 performs region division in an image, cutout of a partial image, and the like. The generic object recognition unit 202 recognizes an object included in an image by a generic name (category). The specific object recognition unit 203 compares an object with information registered in the MDB for identification.

The network communication control unit 204 performs image input and output processing, control of information communications with network terminals, and the like. The data retrieval processing unit 205 collects information from link destinations, and performs querying, collection, and retrieval of collective wisdom, and the like.

The MDB search unit 206 retrieves tag data and the like such as the names of objects. The MDB learning unit 207 performs addition of new design data and addition of detailed information, registration of time information, registration, update, and addition of accompanying information, and the like. The MDB management unit 208 performs extraction of feature points and feature quantities from design data, extraction of category information from accompanying information and registration to category data, extension, division, update, integration, and correction of category classifications in category data, registration of a new category, and the like.

The relevance search engine 220 includes, as described above, at least the graph operation unit 221, the graph storage unit 222, the graph management unit 223, and the relevance operation unit 224. The graph operation unit 221 processes various graph operations executed on the server. The graph storage unit 222 expands a graph structure in a memory using node data and link data stored in the graph database, and arranges the data format so as to facilitate a process in a subsequent stage. The graph management unit 223 manages and arbitrates a large number of graph operations executed by the graph operation unit 221. Further, the relevance operation unit 224 calculates the relationship between nodes using a graph mining method.

The statistical information processing unit 209 performs statistical information processing using graph data stored in the GDB 102A. The specific user filtering processing unit 210 performs filtering of search results based on the subjectivity of users. For example, a subgraph is extracted based on type information attached to each node and subjected to graph mining processing to process the user's interests based on co-occurrence probabilities.

The GDB 102A includes node data 231 and link data 232. Although the GDB 102A is not necessarily limited to them, these typical functions will be briefly described.

The node data 231 stores data on nodes. An example of a data structure will be described below referring to FIG. 14A(D).

The link data 232 stores data on links. An example of a link structure will be described below referring to FIG. 14A(E).

The MDB 102B includes design data 251, accompanying information data 252, feature quantity data 253, category data 254, and unidentified object data 255. Although the MDB 102B is not necessarily limited to them, these typical functions will be briefly described.

The design data 251 holds basic information necessary for constructing and manufacturing an object generated from database for manufacturing the object, such as the structure and shape and the dimensions of the object, information on connections of parts, the arrangement plan, movable portions, movable ranges, the weight, the rigidity, and so on.

The accompanying information data 252 holds all sorts of information on an object such as the name of the object, the manufacture, the part number, the date and time, the material, the composition, process information, and so on.

The feature quantity data 253 holds feature points and feature quantity information on an individual object generated based on design information.

The category data 254 holds information to be used when category classification of an object is performed in the generic object recognition unit.

The unidentified object data 255 holds information on an object on which specific object recognition is impossible at the time. If an object having similar features is detected frequently after that, the unidentified object is newly registered as a new specific object.

Figure 3:
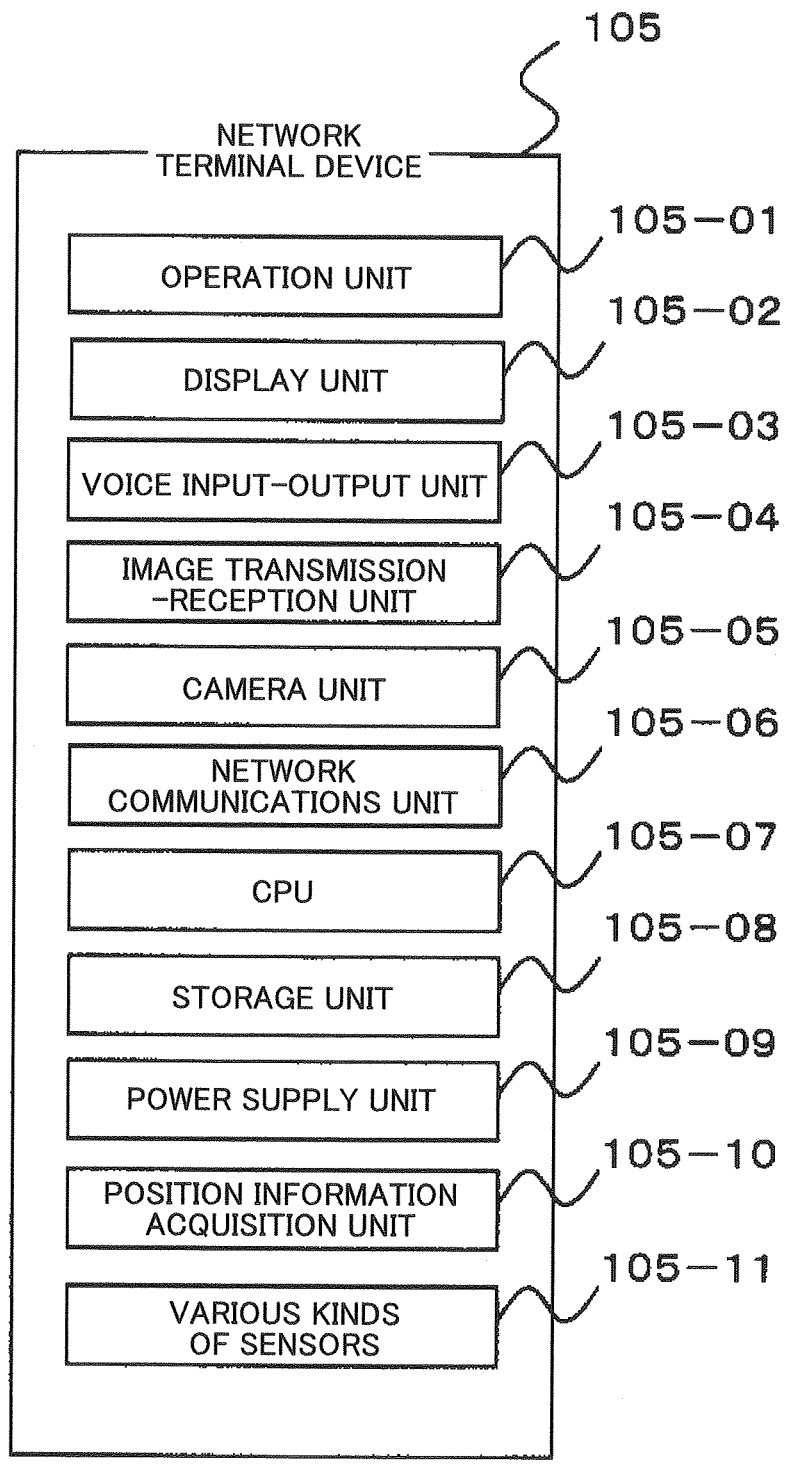
FIG. 3 is an explanatory diagram illustrating functional blocks of a network terminal device in the system according to the embodiment of the invention.

FIG. 3 shows a network terminal device in the system according to the embodiment of the invention. The network terminal devices 105a to 105d are client terminal devices widely used by users, such as computers, portable information terminals (PDAs or pads), or cellular phones. That is, the network terminal devices 105*a* to 105*d* show that a number of various types of electronic information devices are connected to a network such as the Internet. Hereinafter, the network terminal device 105 mentioned refers to any one of the network terminal devices 105*a* to 105*d* connected to the network. The network terminal devices 105*a* to 105*d* do not need to be of the same model, and may be any terminal devices having equivalent functions (or minimum functions to enable the implementation). Here typical functional blocks of the network terminal device 105 will be described.

Examples of the network terminal 105 in FIG. 3 include the case where a moving image input function and a display function are in one body, and the case where these functions are in separate bodies. In the former, as in a cellular phone and the latest smartphone, the network terminal 105 is equipped in one body with an operation unit 105-01, a display unit 105-02, a voice input-output unit 105-03, an image transmission-reception unit 105-04, a camera unit 105-05, a network communication unit 105-06, a CPU 105-07, a storage unit 105-08, a power supply unit 105-09, a position information acquisition unit 105-10, and various kinds of sensors 105-11. In the latter, input and output functions are in different bodies, like a moving image taking camera and a TV.

In the invention, description will be made with a network terminal in which the input and output units are in one body as an example. The operation unit 105-01 includes an input device such as a touchpad (such as one incorporated in a display), a key input unit, a pointing device, or a jog dial, for example. The display unit 105-02 is a display provided with a resolution and a video memory appropriate for each output device. The voice input-output unit 105-03 includes input-output devices such as a microphone for voice recognition and a speaker. The image transmission-reception unit 105-04 includes a codec unit, a memory unit, and the like necessary for transmitting moving image data taken by the network terminal 105 to the server, or receiving moving image data delivered from the server. The moving image data includes still images. The camera unit 105-05 is a moving image taking means including imaging devices such as CCD and MOS sensors. The network communication unit 105-06 is an interface for connection to a network such as the Internet, and may be either wired or wireless. The CPU 105-07 is a central processing unit. The storage unit 105-08 is a temporary storage such as a flash memory. The power supply unit 105-09 refers to a battery or the like for supplying power to the entire network terminal. The position data detection unit 105-10 is a position information detection device such as a GPS. The various kinds of sensors 105-11 include an acceleration sensor, a tilt sensor, a magnetic sensor, and so on.

A. Image Recognition Process

Next, referring to FIG. 4, the overall flow of an image recognition system in the system according to the embodiment of the invention will be described.

The start of an image recognition process (S401) starts with the input of an original image by being uploaded from the network terminal device 105 or being collected by crawling from the server (S402), for example. As the original image, an image originally existing on the server may be used. The original image may be a two-dimensional image or a three-dimensional image. At the input of the original image, an instruction on a region of interest of an object may be made through a device (not shown) such as a pointing device, or without an instruction on a point of interest, the entire original image may be entered as a target to be processed. Next, in S404, generic object recognition processing is performed. For the generic object recognition processing, a Bag-of-Features (BoF) method can be adopted, for example. In the generic object recognition processing, recognition up to the category of the detected object (the generic name of the object) is performed. However, when an instruction on a point of interest is made, the process branches to the case where the category recognition has been able to be made and to the case where the category recognition has not been able to be made. The determination is made in S405. When the category recognition has not been able to be made, the process proceeds to S406, and the handling of existing categories is determined (S407 or S408). When the category recognition of the object has been able to be made irrespective of the presence or absence of an instruction on a point of interest, the process proceeds to S409 to move to specific object recognition processing.

When the process proceeds to the specific object recognition processing based on the determination in S405, first, in step S409, cutout processing on an individual object image is performed. Then, on the cutout individual object image, the specific object recognition processing is performed (S410). In the specific object recognition processing, identification of the object is attempted by an evaluation function for computing the degree of match based on the feature quantity data 253 extracted from the design data 251 registered in the MDB 102B.

On the other hand, when the generic object recognition has not been able to be made in the determination in S405, the process proceeds to S406, and determination is made on whether to register a new category including the object of interest (S407) or to consider the extension of an existing category close to the object of interest (S408), based on the information distance between the feature quantities of the object of interest and the feature quantities of objects belonging to existing categories held by the MDB 102B. When the new category is registered (S407), the process returns to S404, and when the existing category is extended (S408), the process proceeds to S409.

In S411, it is determined whether a specific object has been able to be identified or not. When a specific object has been able to be identified, the process proceeds to S413, in which it is determined whether the individual object image cut out in S409 includes more detailed information than detailed data on the object registered in the MDB 102B. When it is determined Yes in S413, the process proceeds to S414, in which the detailed data on the object in MDB 102B is updated by the MDB learning unit 207 to have more detailed information. On the other hand, when it is determined No in S413, the process proceeds to S415, and the following determination is made.

The determination in S415 is made when it is determined that generic object recognition has not been able to be made in S405, and the process proceeds to S408, S409, and S410, and the recognition of a specific object has been able to be made (Yes in S411). In S415, when a specified object is an existing category, the category data 254 is updated (S416) by extending the definition of the existing category registered in MDB 102B, or dividing the data when information distances between objects in the category are dispersed by the extension, or integrating the data when information distance from an adjacent category is equivalent to or smaller than information distance between the objects in the category, or making a correction when a discrepancy in information of existing objects is found by the registration of the specified object. On the other hand, when the specified object is not an existing category in S415, the process jumps to S407 to register it as a new category.

When recognition of a specific object has not been able to be made in S411, the object is temporarily registered as an "unidentified object" in the MDB 102B, and the recognition process is terminated (S417) for future processing. Also, when the existing category is extended for update in S416, the recognition process is terminated (S417).

FIG. 5 is a flow diagram showing part of the specific object recognition processing and the learning processing in FIG. 4 according to another embodiment. Hereinafter, the description will be made in detail.

First, specific object recognition processing starts in S501. As data entered here, in addition to an image of a single object, design data in the same layer can be used. Moreover, design data linked to an image or the design data itself (that may be on a part as well as on an entire product) can be used.

Next, in S502, based on the feature quantity data 253 generated in the MDB in S502, feature points and feature quantities in the original image are extracted and compared with feature quantity data generated by the MDB. Here, there are the following two methods to generate by the MDB and compare feature quantity data.

In first method, based on three-dimensional information on individual minimum units constituting an object (represented by design data or the like), they are mapped to a two-dimensional plane from every angle, and from the map image, feature quantities and the like to be used for identifying the object are generated. In comparison, it is a method to extract feature quantities from an input image based on the feature quantities and compare appearance regions and frequencies (S504). The feature quantities here are generated based on a contour extraction method, a SURF method, or the like, for example.

The second one is a method (tune method) in which with a process of mapping three-dimensional shape information of a set of minimum units as components of an object (such as design data) to a two-dimensional plane, varying the projection angle, the enlargement ratio, and the like, as an evaluation function, differences from the feature points and the feature quantities of the object are determined in the degree of match (S505).

In view of the fact that conventionally, as many images to be samples as possible are collected to perform identification processing (S502) by feature quantities or an evaluation function, the method of generation by the MDB (S503) described in S504 and S505 has a more beneficial effect than a related art in increasing the probability of identification.

Next, in S506, it is determined whether the object has been able to be identified. When it is determined that the identification has been made, the process proceeds to S510, in which it is determined whether the data used for identification is more detailed than the data in the MDB and is the latest. Based on these determinations, object-specific information (such as design data) and time information (the model of the object, version information) are registered for update in the MDB, and the specific object recognition processing is terminated. That is, the registration of the information and the MDB update constitute the database learning processing.

On the other hand, when it is determined that the object has not been able to be identified in S506, information other than image information (characters or a logo in the image) is extracted for object identification processing. For example, only a logo of a very famous manufacture shown on an object in an image can facilitate identification even when the greater part of the object is out of the frame. Then, the process proceeds to S509 to determine again whether the object has been able to be identified. When the object has been able to be identified (Yes in S509), the process proceeds to S510, in which it is determined whether the data used for identification is more detailed than the data in the MDB, and is the latest. Based on the determinations, object-specific information (such as design data) and time information (the model of the object, version information) are registered for update in the MDB, and the specific object recognition processing is terminated.

On the other hand, when the object has not been able to be identified (No in S509), the object is registered as an unidentified object in the MDB for future update or generation of a new category (S511), and the specific object recognition processing is terminated (S512).

Collective wisdom can be used for identification of the object (S508) in conjunction with or in place of the identification processing with information other than image information shown in S507. The processing in S508 is implemented by searching an encyclopedia on the Internet, or automatic posting on a Q&A message board, for example. When the system itself searches an encyclopedia on the Internet, the system creates a search query using the category obtained in the generic object recognition and the feature quantities generated by the MDB to perform the search. Then, from information returned, the system extracts new feature quantities to attempt again to identify the object. When the system performs automatic posting on a Q&A message board, the system uploads the original image together with the category obtained in the generic object recognition to the message board. At that time, the system automatically edits a prepared fixed phrase, and posts a query such as "Please tell me about the model of this ○○" or "Please tell me a website on which design information on this △△△ is published." Then, the system receives advices such as "That is xx-xxxx," or "The design data on the △△△ is available from http://www.aaabbb.com/cad/data.dxf" from other users (such as persons). The system analyzes and evaluates these advices, and accesses a specified URL to attempt to download the design data or the like on the object. When identification of the object based on newly-obtained design data succeeds, the new data obtained is added to the MDB, and the database is updated.

Image Recognition System

Figure 6A:
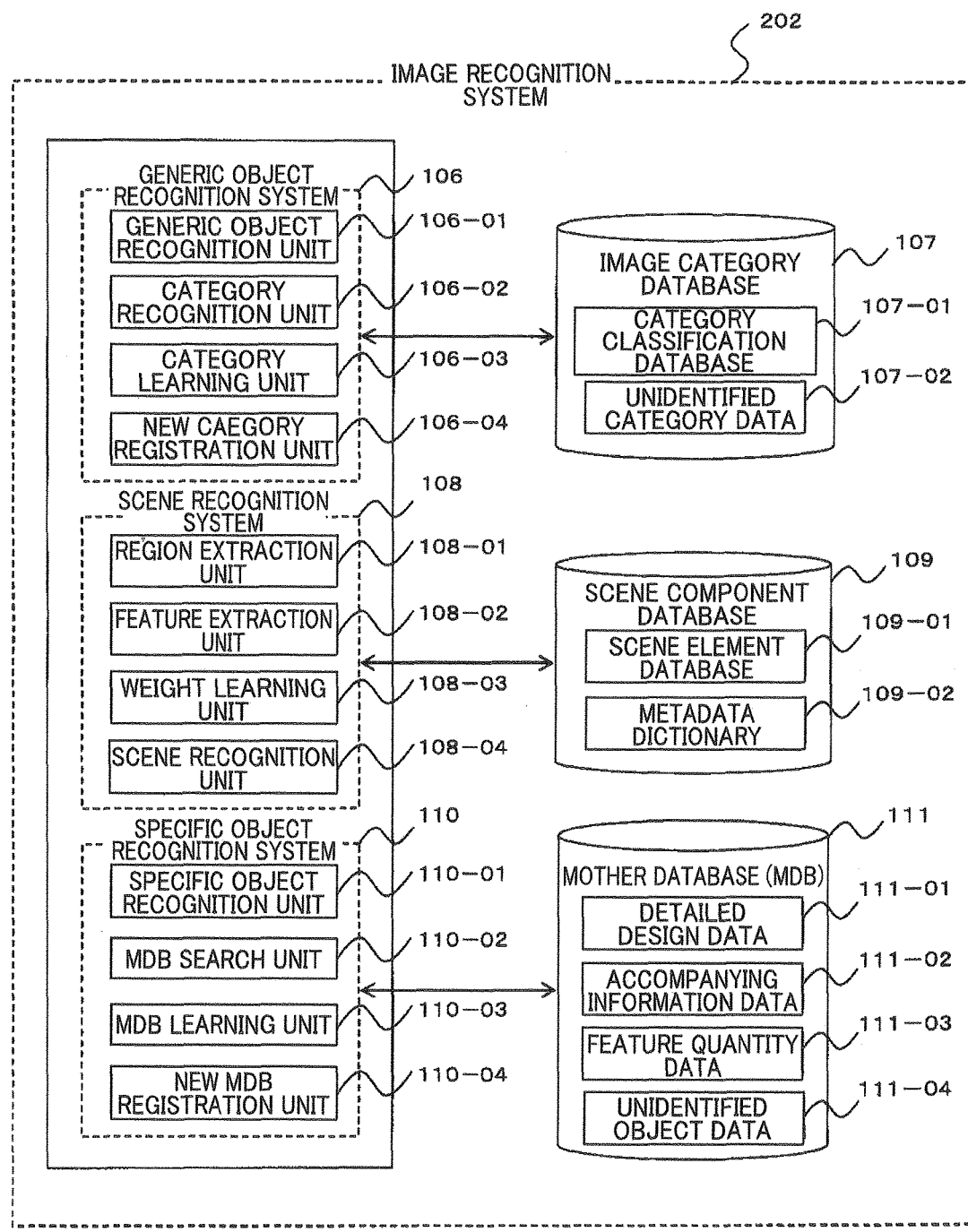
FIG. 6A is an explanatory diagram illustrating functional blocks of an image recognition system in a system according to another embodiment of the invention.

Here, FIG. 6A shows functional blocks of an image recognition system in a system according to another embodiment of the invention. An image recognition system 202 shown in FIG. 6A may be operated as a portion of the server 101, or may be operated as a server system independent of the server 101. The image recognition system 202 includes, in addition to a generic object recognition system and a specific object recognition system corresponding to the generic object recognition unit and the specific object recognition unit in the server 101, a scene recognition system for recognizing a scene. As another form or an application example of an image recognition function portion in the server 101, the system will be described in detail below.

The image recognition system 202 includes a network communication control unit 204, a region processing unit 201, a data retrieval processing unit 205, a generic object recognition system 106, a scene recognition system 108, a specific object recognition system 110, an image category database 107, a scene component database 109, and an MDB 111. The generic object recognition system 106 includes a generic object recognition unit 106-01, a category recognition unit 106-02, a category learning unit 106-03, and a new category registration unit 106-04. The scene recognition system 108 includes a region extraction unit 108-01, a feature extraction unit 108-02, a weight learning unit 108-03, and a scene recognition unit 108-04. The specific object recognition system 110 includes a specific object recognition unit 110-01, an MDB search unit 110-02, an MDB learning unit 110-03, and a new MDB registration unit 110-04. The image category database 107 includes a category classification database 107-01 and an unidentified category data 107-02. The scene component database 109 includes a scene element database 109-01 and a metadata dictionary 109-02. The MDB 111 includes detailed design data 111-01, accompanying information data 111-02, feature quantity data 111-03, and unidentified object data 111-04. Although the functional blocks of the image recognition system 202 are not necessarily limited to them, these typical functions will be briefly described.

The generic object recognition system 106 recognizes an object included in an image by a generic name or a category. The category mentioned here is hierarchical. Objects recognized as the same generic objects may be classified and recognized as subdivided categories (the same chairs include "chairs" with four legs and further include "legless chairs" with no legs), or as a broader category (chairs, desks, and chests of drawers are all largely classified as the category of "furniture"). The category recognition is a proposition of classifying an object to a known class. A category is also referred to as a class.

In generic object recognition processing, when the results of comparison of an object in an input image and a reference object image show that they have the same shape or similar shapes, or shows that they have extremely similar features and clearly have a low degree of similarity in main features to other categories, a generic name meaning a corresponding known category (class) is given to the recognized object. A database including details of essential features characterizing those categories is the category classification database 107-01. An object that cannot be classified into any of those is temporarily classified as the unidentified category data 107-02 for future new category registration or expansion of the scope of the definition of an existing category.

The generic object recognition unit 106-01 executes a process in which local feature quantities are extracted from feature points of an object in an image entered, compares those local feature quantities with the description of given feature quantities obtained from learning in advance for similarity to determine whether the object is a known generic object.

The category recognition unit 106-02 specifies or estimates to which category (class) an object on which generic object recognition is possible belongs by comparison with the category classification database 107-01. As a result, when additional feature quantities to be added or to add correction to the database in a specific category are found, the category learning unit 106-03 relearns, and updates the description about the generic object in the category classification database 107-01. When an object once classified as unidentified category data and its feature quantities are found to have extreme similarities with feature quantities of another unidentified object detected separately, it is determined that there is a high possibility that they are objects of the same unknown category newly found. In the new category registration unit 106-04, their feature quantities are newly registered and are given a new generic name in the category classification database 107-01.

The scene recognition system 108 detects characteristic components dominating the whole of or part of an input image, using a plurality of feature extraction systems with different properties, refers to the scene element database 109-01 included in the scene component database 109 and on multidimensional space for those to determine patterns in which the input elements are detected in specific scenes by statistical processing, and recognize whether the region dominating the whole of or part of the image is a specific scene. In addition, pieces of metadata accompanying an input image and components included in the metadata dictionary 109-02 which have been registered in advance in the scene component database 109 can be compared to further increase the accuracy of scene detection. The region extraction unit 108-01 divides an entire image into a plurality of regions as necessary to allow for scene determination for each region. For example, from a surveillance camera with a high resolution placed on the top of a building in an urban space, a plurality of scenes such as an intersection, entrances of a number of stores, and so on can be seen. The feature extraction unit 108-02 inputs recognition results obtained from available various feature quantities such as local feature quantities of a plurality of feature points, color information, the shape of an object, and so on detected in a specified image region, into the weight learning unit 108-03 in a subsequent stage, determines the probability of co-occurrence of the elements in a specific scene, and inputs them into the scene recognition unit 108-04 to perform final scene determination on the input image.

The specific object recognition system 110 compares features of an object detected from an input image with features of specific objects held in the MDB in advance, one by one, and finally makes identification processing on the object. The total number of specific objects existing on the earth is enormous, and it is not practical at all to make comparisons with all those specific objects. Thus, it is necessary to narrow categories and a search range of an object within a given range in advance in a previous stage in the specific object recognition system as described below. The specific object recognition unit 110-01 compares local feature quantities in feature points detected with feature parameters in the MDB obtained from learning, and determines to which specific object the object conforms by statistical processing. The MDB includes detailed data on specific objects available at that point in time. For example, when they are industrial products, basic information necessary for constructing and manufacturing an object such as the structure, shape, dimensions, arrangement plan, movable portions, movable regions, weight, rigidity, finish of the object that are extracted from the design drawing, CAD data, or the like as the design data 111-01, is held in the MDB. The accompanying information data 111-02 holds all kinds of information on an object such as the name, manufacturer, part number, time, material, composition, and processing information of the object. The feature quantity data 111-03 holds information on feature points and feature quantities of individual objects generated based on design information. The unidentified object data 111-04 is temporarily held in the MDB for future analysis as data on objects not belonging to any specific object at that time, and the like. The MDB search unit 110-02 provides a function of retrieving detailed data corresponding to a specific object. The MDB learning unit 110-03 performs addition and correction to the contents of description in the MDB through an adaptive and dynamic learning process. An object once classified as an unidentified object into the unidentified object data 111-04 is, when objects having similar features are detected frequently thereafter, newly registered as a new specific object by the new MDB registration unit 110-04.

Figure 6B:
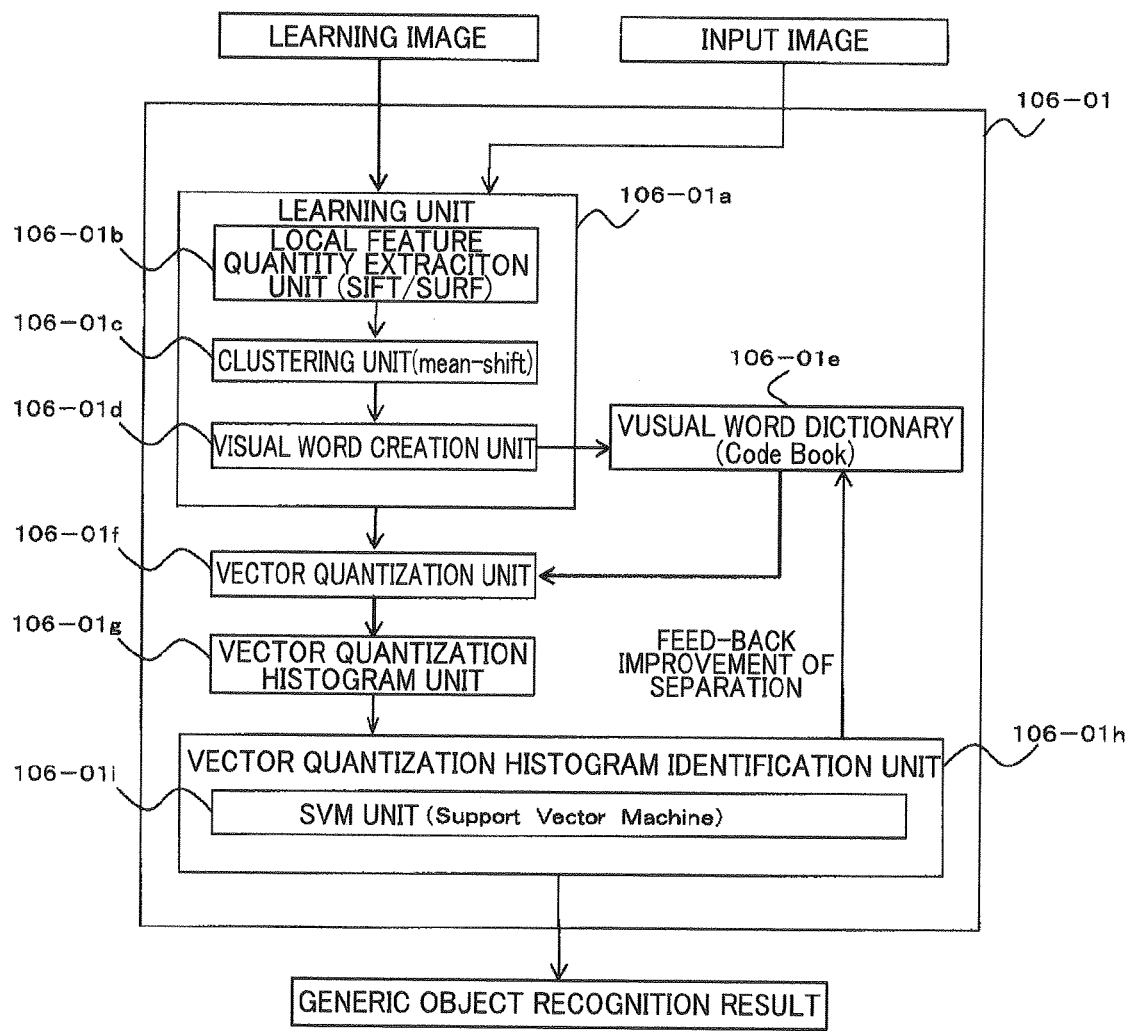
FIG. 6B is an explanatory diagram illustrating functional blocks of a generic object recognition unit in the system according to another embodiment of the invention.

FIG. 6B shows an example of the system configuration and an example of functional blocks of the generic object recognition unit 106-01. Although the functional blocks of the generic object recognition unit 106-01 are not necessarily limited to them, a generic object recognition method to which Bag-of-Features (hereinafter, referred to as BoF) is applied as a typical feature extraction method will be described briefly below. The generic object recognition unit 106-01 includes a learning unit 106-01a, a Visual Word dictionary (CodeBook) 106-01e, a vector quantization unit 106-01f, a vector quantization histogram unit 106-01g, and a vector quantization histogram identification unit 106-01h. The learning unit 106-01a includes a local feature quantity extraction unit 106-01b, a clustering unit 106-01c, and a Visual Word creation unit 106-01d. The vector quantization histogram identification unit 106-01h includes a Support Vector Machine (hereinafter, referred to as SVM) unit 106-01i.

BoF is widely known as a typical object recognition method which extracts feature points appearing in an image by various methods, represents them as a collection of a large number of local feature quantities (Visual Words) without using the relative positional relationships, and compares them with the Visual Word dictionary (CodeBook) 106-01e extracted from various objects, learned by learning, to determine to which object the frequency of occurrence of those local feature quantities is closest.

FIG. 7(A) shows an example using Scale-Invariant Feature Transform (hereinafter, referred to as SIFT) as a typical example of local feature quantity extraction. SIFT is one of feature point detection and feature quantity extraction algorithms robust to variations in size, rotation, and illumination of images, and is a method in which the distribution of a plurality of characteristic luminance gradients is detected from a single image, using the difference of different smoothed images with respect to an original image (for example, Difference-of-Gaussian, hereinafter referred to as DoG), and the extreme values (positions of the center of gravity) as the representative points are determined and extracted as feature points (keypoints). In the process of determining the DoG, from the amount of aperture of a Gaussian Window obtained, scales in the feature points are determined to calculate local feature quantities in the dominating ranges. In the keypoint detection process, since the aperture is extremely small on edges appearing frequently in an image, the edges are unlikely to be useful feature quantities, and are thus excluded from the keypoints. Likewise, points at which DoG output is small (regions with low contrast) are highly likely to be affected by noise included in the original image, and are thus excluded from the keypoints. FIG. 7(A) shows a plurality of keypoints detected using these processes and their scales in white circles.

Next, for detected feature points, representative orientations (directions of main components) are determined. For orientations, luminance gradient strength is determined every ten degrees in thirty-six directions in total. The orientation with the maximum value is adopted as an orientation representative of the keypoint. Next, in the scale regions detected around the keypoints, representative points of the main luminance gradients are determined as main orientations of the keypoints. After that, the entire peripheral region based on the scale of each keypoint is divided into the total of sixteen regions of 4×4, being rotated in accordance with the orientation determined above, and gradient direction histograms every forty-five degrees in eight directions are generated in each block. From those results, a feature vector in 16 blocks×8 directions=128 dimensions in total is determined. From these operations, SIFT feature quantities robust to rotation and scaling of an image can be obtained. Finally, the magnitude of the 128-dimensional feature vectors is normalized to obtain local feature quantities robust to variation in illumination.

In FIG. 6B, 128-dimensional feature vectors obtained by the local feature quantity extract unit 106-01b constituting the learning unit 106-01a are cluster-divided into multidimensional feature vector groups by the clustering unit 106-01c in a subsequent stage. In the Visual Word creation unit 106-01d, a Visual Word is generated for each feature vector based on its centroid vector. As methods for clustering, k-means and mean-shift are known. Generated Visual Words are held in the Visual Word dictionary (CodeBook) 106-01e. Based on those, Visual Words extracted from an input image are compared, and the vector quantization unit 106-01f performs vector quantization for each feature. Thereafter, the vector quantization histogram unit 106-01g generates a histogram for each dimension.

FIG. 7 (B) shows Visual Words (CodeBook) generated, and FIG. 7(C) shows an example of a vector quantization histogram extracted. The total number of bins (number of dimensions) in the histogram is great, from thousands to tens of thousands. While there are a large number of bins in a histogram that have no feature correspondence, there are bins that have clear feature correspondence, depending on an input image. They are collectively subjected to normalization processing so that the total sum of the values of all the bins in the histogram becomes 1. The obtained vector quantization histogram is input into the vector quantization histogram identification unit 106-01h in a subsequent stage. In a Support Vector Machine (hereinafter referred to as SVM) 106-01i as a typical classifier, a class (generic object) to which the object belongs is recognized. The results of recognition here can be used as a learning process for the Visual Word dictionary. Likewise, recognition determination including other means (metadata and collective wisdom) can be used as learning feedback to the Visual Word dictionary, allowing continuation of adaptive correction and calibration so as to describe features in the same class most appropriately and to keep the degree of separation from other classes favorably.

Figure 8:
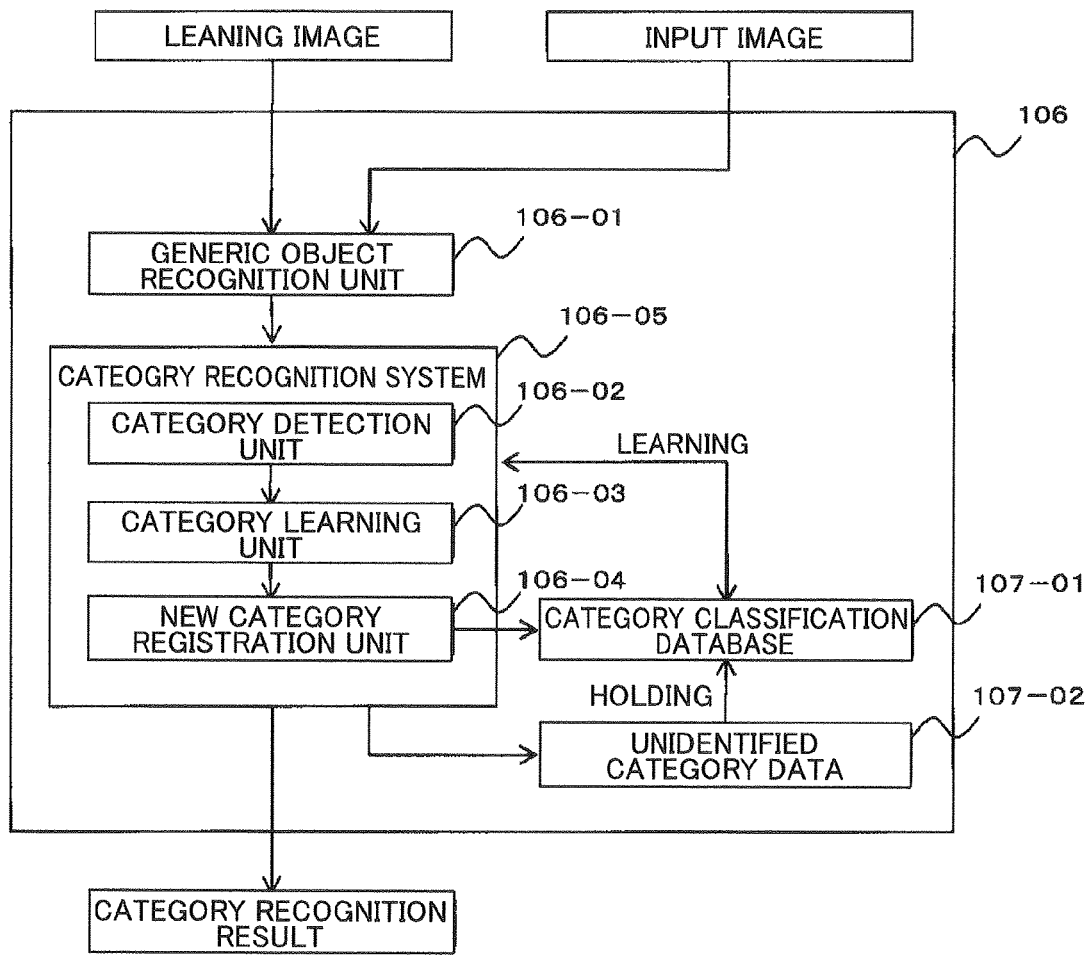
FIG. 8 is an explanatory diagram illustrating functional blocks of a category recognition unit in the system according to another embodiment of the invention.

FIG. 8 shows a schematic block diagram of the entire generic object recognition system 106 including the generic object recognition unit 106-01. Generic objects (classes) belong to various categories, and form a multiple hierarchical structure. For example, human beings belong to the high category "mammals," and mammals belong to the higher category "animals." Human beings can further be recognized in different categories such as hair color, eye color, and adult or child. To perform these recognition determinations, the category classification database 107-01 is indispensable. This is a storage of "wisdom" of human beings up to date, and will be further supplied with new "wisdom" by future leaning and detection to continuously evolve. Classes identified in the generic object recognition unit 106-01 (ultimately, the total number of all nouns identified by human beings so far) are included in the category classification database 107-01 with various multidimensional and hierarchical structures. In the learning process, a generic object recognized is compared with the category classification database 107-01. A category to which it belongs is recognized in the category detection unit 106-02. Thereafter, the result of recognition is transferred to the category learning unit 106-03, and is checked in detail for consistency with description in the category classification database 107-01. Typically, an object recognized as a generic object often includes a plurality of recognition results. For example, when it is recognized as an "insect," it can be recognized and classified in the eye structure, the number of limbs, the presence or absence of an antenna, the entire skeletal structure, the wing size, the body color, the surface texture, and so on, which are compared with detailed description of the corresponding generic object in the category classification database 107-01. Based on these results of comparison, the category learning unit 106-03 adaptively performs addition to and correction of the category classification database 107-01 as necessary. As a result, when it is not classified into any existing category and is presumed to be a "new insect," the new category registration unit 106-04 registers these pieces of information in the category classification database 107-01. On the other hand, an object that is unknown at that point in time is temporarily held as the unidentified category data 107-02 in the category classification database 107-01 for future analysis and comparison.

Figure 9:
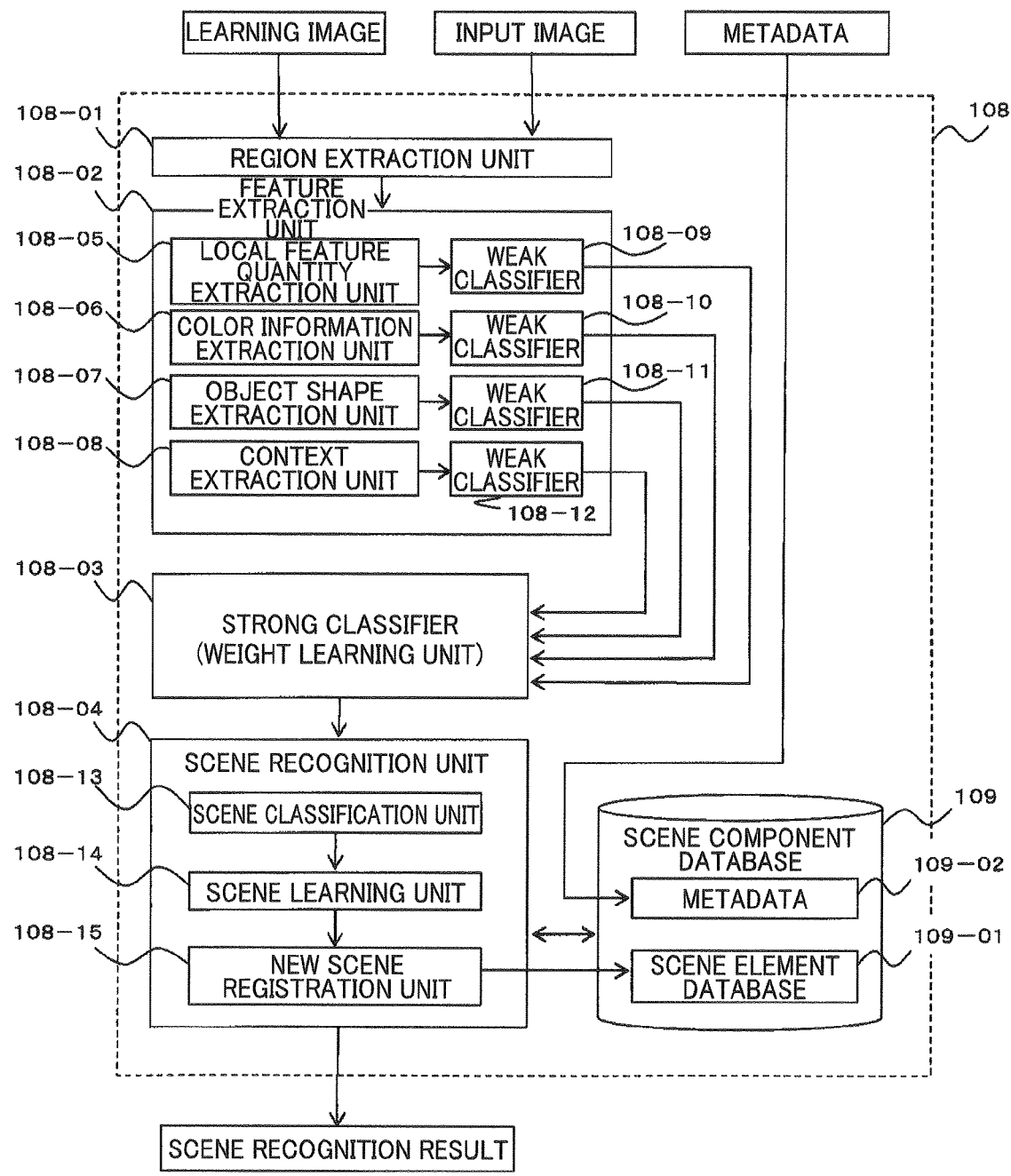
FIG. 9 is an explanatory diagram illustrating functional blocks of a scene recognition unit in the system according to another embodiment of the invention.

FIG. 9 shows, in a block diagram, a typical example of the scene recognition system 108 for recognizing and determining a scene included in an input image in the invention. In many cases, a plurality of objects can generally be recognized from a learning image and an input image. For example, when objects such as "trees," "grass," and "animals" can be recognized together with regions such as the "sky," the "sun," and the "ground," whether they are in a "zoo" or in "Africa" is inferred from the entire scenery, the co-occurrence relations with other objects found, and the like. For example, when fences, bulletin boards, and the like are found at the same time and it is crowded with visitors, the possibility that it is a "zoo" increases. When the entire scale is large, a big mountain such as "Kilimanjaro" is seen in the distance, and various animals coexist on the grass, the possibility that the place is "Africa" increases sharply. In such cases, it may become necessary to further compare a recognizable object, situation, co-occurrence relation, and the like with the scene component database 109 as a knowledge database to make a determination more comprehensively. For example, even when ninety percent of the entire screen is presumed to indicate "Africa," if it is cut out in a rectangular frame and is stuck to a wall, the probability that it is actually a poster or a photogram increases extremely.

The scene recognition system 108 includes a region extraction unit 108-01, a feature extraction unit 108-02, a strong classifier 108-03, a scene recognition unit 108-04, and a scene component database 109. The feature extraction unit 108-02 includes a generic object recognition unit 108-05, a color information extraction nit 108-06, an object shape extraction unit, a context extraction unit, and weak classifiers 108-09 to 12. The scene recognition unit 108-04 includes a scene classification unit 108-13, a scene learning unit 108-14, and a new scene registration unit 108-15. The scene component database 109 includes a scene element database 109-01 and metadata 109-02.

The region extraction unit 108-01 performs extraction of regions of a target image so as to effectively extract features of a target object without being affected by a background or other objects. As an example of a region extraction method, Graph-Based Image Segmentation or the like is known. An object image extracted is input individually to the local feature quantity extraction unit 108-05, the color information extraction unit 108-06, the object shape extraction unit 108-07, and the context extraction unit 108-08. Feature quantities obtained from those extraction units are subjected to identification processing in the weak classifiers 108-09 to 12, and are integrally modeled as multidimensional feature quantities. The modeled feature quantities are input to the strong classifier 108-03 having a weighting learning function to obtain a final recognition determination result on the object image. SVM may be an example of the weak classifiers, and Adaboost or the like, an example of the strong classifier.

Generally, an input image often includes a plurality of objects and a plurality of categories that are broader concepts of the objects. A person can imagine a specific scene or situation (context) from there at first sight. On the other hand, when only a single object or a single category is presented, it is difficult to directly determine only by that what scene an input image shows. Usually, a situation in which those objects are present, the positional relationships between them, and the probabilities (co-occurrence relations) with which the objects and the categories appear at the same time have important meaning to scene determination thereafter. The objects and categories on which image recognition was possible in the preceding section are subjected to comparison processing based on the probabilities of frequent appearance of the elements of each scene included in the scene element database 109-01. In the scene recognition unit 108-04 in a subsequent stage, it is determined what scene the input image represents using a statistical method. As other information for making a determination, metadata 109-02 accompanying the image can be useful information. However, metadata attached by a person itself may sometimes be an assumption or a definite mistake, or indirectly capture the image as a metaphor, and may not necessarily represent the objects and the categories in the input image correctly. In such a case also, it is desirable that recognition processing on objects and categories be performed finally in view of results obtained in an image recognition system or results obtained based on co-occurrence relations or the like in a knowledge information system. In many cases, a plurality of scenes is obtained from a single image (it may be a "sea" and a "beach" at the same time). In those cases, the names of the plurality of scenes are attached together. Further, it is difficult to determined only from an image which of "sea" and "beach," for example, is more appropriate as the scene name to be attached to the image, and it may become necessary to make a final determination with the assistance of a knowledge database, based on the context, the correlation with the whole, and their respective appearance co-occurrence relations.

FIG. 10(A) shows an example of description in the scene element database 109-01. A scene (A) includes a plurality of categories, a category m and a category n. As components in the category m, a generic object α and a generic object β are included, and as components in the category n, an generic object γ, a specific object δ, and a specific object ε, with their respective probabilities of appearance.

FIG. 10(B) shows an example of components in a scene 'intersection.' When a 'road' is considered as a category constituting part of the 'intersection,' there are various roads such as "main roads" including a plurality of lanes, an "ordinary road" with one lane on each side, or a "footway." When a 'road marking' such as a "lane separator sign," a "crosswalk sign," or a "travel direction sign" is found together on a 'road,' it can be presumed with a high probability that that is an 'intersection' or a place near an 'intersection'. Besides that, when a plurality of roads intersects, 'traffic lights' are on the roads, and a "travel sign," a "pedestrian sign," or the like is also found there, it can be identified as an 'intersection' without doubt. In addition, when a signal has an "intersection name sign" and the characters can be recognized, even the location of the 'intersection' is identified. On roads, there may be another 'road sign' category such as a "speed limit sign," a "parking and stopping regulation sign," or a "stop sign." When 'persons' are on a footway or a crosswalk, there is a possibility that their "faces" as well as their "body types" and their "clothes" can be identified. On a road, there are various types of 'vehicles' such as "passenger cars" and "large-size vehicles," and their "license plates" may be recognizable. On a footway and a road, 'two-wheeled vehicles' such as "bicycles" and "motorcycles" often run. When "license plates" are attached, they can be recognized as "motorized two-wheeled vehicles" or "motorcycles." In some cases, an 'animal' such as a "dog" or a "cat" is found on a footway. When it is tied to a "person" with a leash, the probability that it is a "dog" increases. When it is a small animal prowling around alone, it may be a "cat." When it is flying in the air, it can be inferred that it is a "bird." There is a high possibility that in view, a category 'sign' such as "store signs," "signs on utility poles," or "sings on vehicles" put on vehicle bodies or glass windows can be found. Around the 'intersection,' there are "buildings," and a 'structure' such as a "footbridge" or a "bridge" can sometimes be seen. On a road, in addition to generic objects such as "utility poles," "streetlights," and "roadside trees," 'constructions on the road' such as a temporary crash barrier and a sign during "road repairs" may be found. During that, when an object is "incomplete" because of "indistinctness," occlusion, or the like, for example, it is left to future recognition processing as an "indistinct" category.

Figure 11:
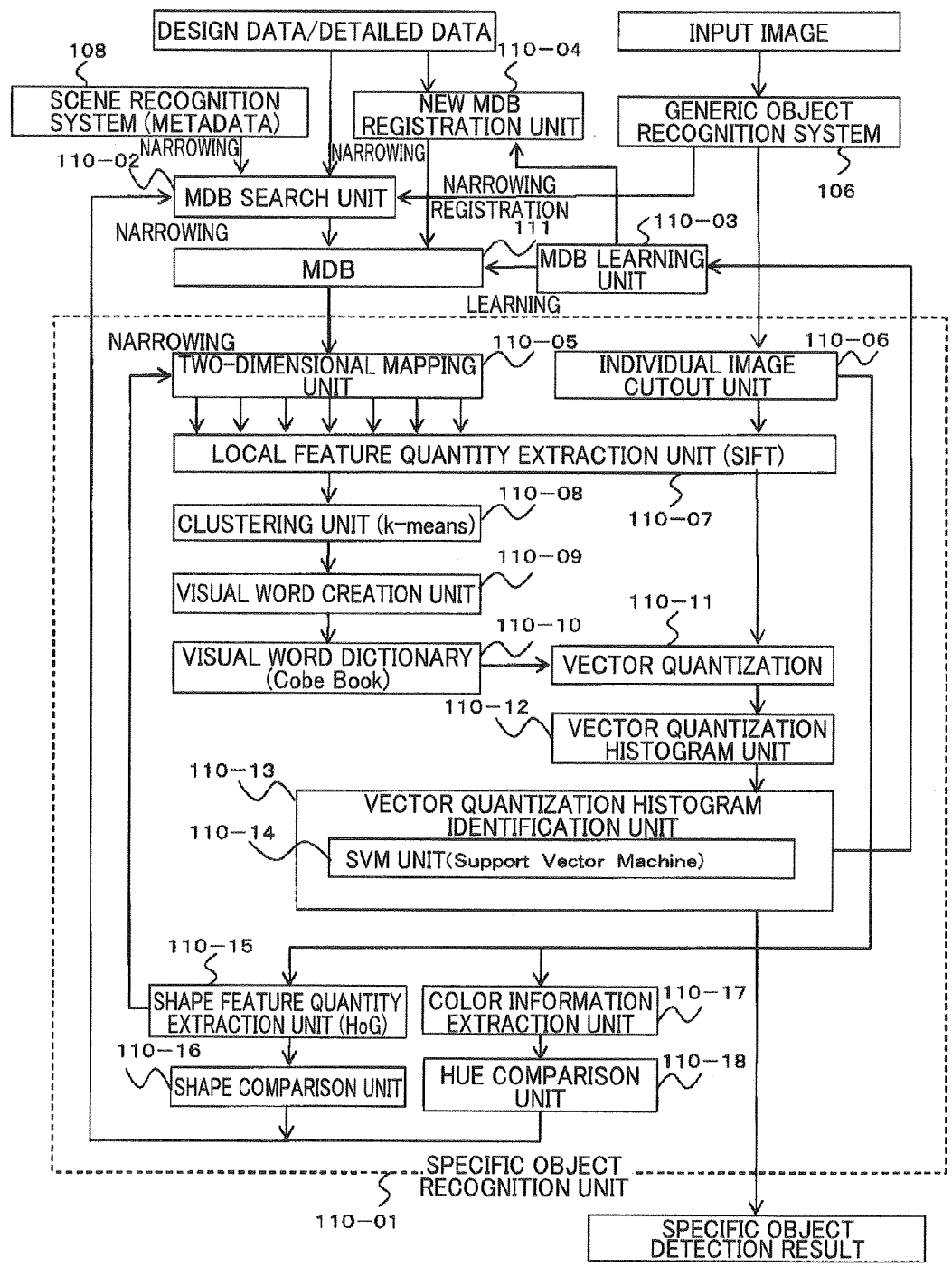
FIG. 11 is an explanatory diagram illustrating functional blocks of a specific object recognition unit in the system according to another embodiment of the invention.

FIG. 11 shows an example of the configuration of an entire system of the specific object recognition system 110, and functional blocks thereof. The specific object recognition system 110 includes a generic object recognition system 106, a scene recognition system 108, an MDB 111, a specific object recognition unit 110-01, an MDB search unit 110-02, an MDB learning unit 110-03, and a new MDB registration unit 110-04. The specific object recognition unit 110-01 includes a two-dimensional mapping unit 110-05, an individual image cutout unit 110-06, a local feature quantity extraction unit 110-07, a clustering unit 110-08, a Visual Word creation unit 110-09, a Visual Word dictionary (Code-Book) 110-10, vector quantization 110-11, a vector quantization histogram unit 110-12, a vector quantization histogram identification unit 110-13, an SVM unit 110-14, a shape feature quantity extraction unit 110-15, a shape comparison unit 110-16, a color information extraction unit 110-17, and a color comparison unit 110-18.

At the time when a class (category) to which a target object belongs can be recognized by the generic object recognition system 106, it can move to a narrowing process in which it is determined whether the object can further be recognized as a specific object. Unless the class is specified to some extent, it is necessary to search an infinite number of specific objects, which cannot be practical at all in time and cost. In the narrowing process, in addition to the narrowing of classes by the generic object recognition system 106, narrowing of targets can proceed based on results of recognition by the scene recognition system 108. Moreover, in addition to that further narrowing becomes possible using useful feature quantities obtained from the specific object recognition system, when unique identification information (such as a brand name or a specific trademark or logo) or the like can be recognized on part of an object, or in a case where useful metadata or the like is attached, further pinpoint narrowing becomes possible.

From some possibilities resulting from the narrowing, detailed data and design data on a plurality of object candidates is sequentially extracted by the MDB search unit 110-02 from within the MDB 111. Based on them, it moves to a process of matching with an input image. Even when an object is not an artificial object or when detailed design data itself does not exist, features can be compared in detail with a photograph or the like, if available, to recognize a specific object to some extent. However, it is a rare case that an input image and a comparison image look almost the same way, and in some cases, they are recognized as different objects. On the other hand, when an object is an artificial object, and there is a detailed database such as CAD, the two-dimensional mapping unit 110-05 renders three-dimensional data in the MDB according to the way the input image looks to allow extremely high-precision feature-quantity matching. In this case, since omnidirectional detailed rendering in the two-dimensional mapping unit 110-05 causes unnecessary increases in calculation time and cost, narrowing according to the way an input image looks is necessary. On the other hand, various feature quantities of objects obtained from high-precision rendering images using the MDB can be determined in advance by taking enough time in the learning process, which is more effective in constructing a practical system.

The specific object recognition unit 110-01 detects local feature quantities of an object in the local feature quantity extraction unit 110-07, divides the feature quantities into a plurality of similar feature groups in the clustering unit 110-08, and then converts them into multidimensional feature quantity sets in the Visual Word creation unit 110-09 to register them in the Visual Word dictionary 110-10. These are performed continuously for a large number of learning images until sufficient recognition accuracy is obtained. When learning images are photographs, insufficient resolutions of images, the influence of noise, the influence of occlusion, the influence from objects other than a target object image, and the like cannot be avoided. However, with the MDB as the base, extraction of a target image can be performed ideally, thus allowing the construction of a specific object recognition system with a greatly increased resolution compared with a conventional method. On an input image, the individual image cutout unit 110-06 cuts out an approximate region of a specific object as a target, and then the local feature quantity extraction unit 110-07 determines feature points and feature quantities. Using the Visual Word dictionary 110-10 prepared in advance by learning, each individual feature quantity is vector quantized, and then expanded in multidimensional feature quantities in the vector quantization histogram unit 110-12. The vector quantization histogram identification unit 110-13 determines whether the object is identical to a reference object. Although the Support Vector Machine (SVM) 110-14 is known as an example of a classifier, AdaBoost or the like that allows weight in determination upon learning is often used as an effective identifier also. These identification results are also usable for a feedback loop of correction of and addition of items to the MDB itself through the MDB learning unit 110-03. When the object is still unidentified, it is held in the new MDB registration unit 110-04 for future appearance of a similar object, or registration of a new MDB.

Moreover, in addition to local feature quantities, shape features of an object can be used in order to further increase detection accuracy. An object cut out from an input image is input to the shape comparison unit 110-16 via the shape feature quantity extraction unit 110-15, so that identification using features in shape of the object is performed. The result is fed back to the MDB search unit 110-02 to perform narrowing to the MDB corresponding to possible specific objects. As an example of shape feature quantity extraction means, Histograms of Oriented Gradients (HoG) are known. Shape feature quantities are also useful for reducing unnecessary rendering processing for obtaining a two-dimensional map using the MDB.

Further, the color feature and the texture of an object are also useful for increasing image recognition accuracy. A cutout input image is input to the color information extraction unit 110-17. The color comparison unit 110-18 extracts information on the color, the texture, or the like of the object, and feeds the results back to the MDB search unit 110-02. This allows for further narrowing of the MDB to be compared. Through the process, specific object recognition is effectively performed.

B. Processing of Interest Graph Collection

Next, with reference to FIGS. 12 to 35, processing of interest graph collection in the system according to an embodiment of the invention will be described.

Figure 12C:
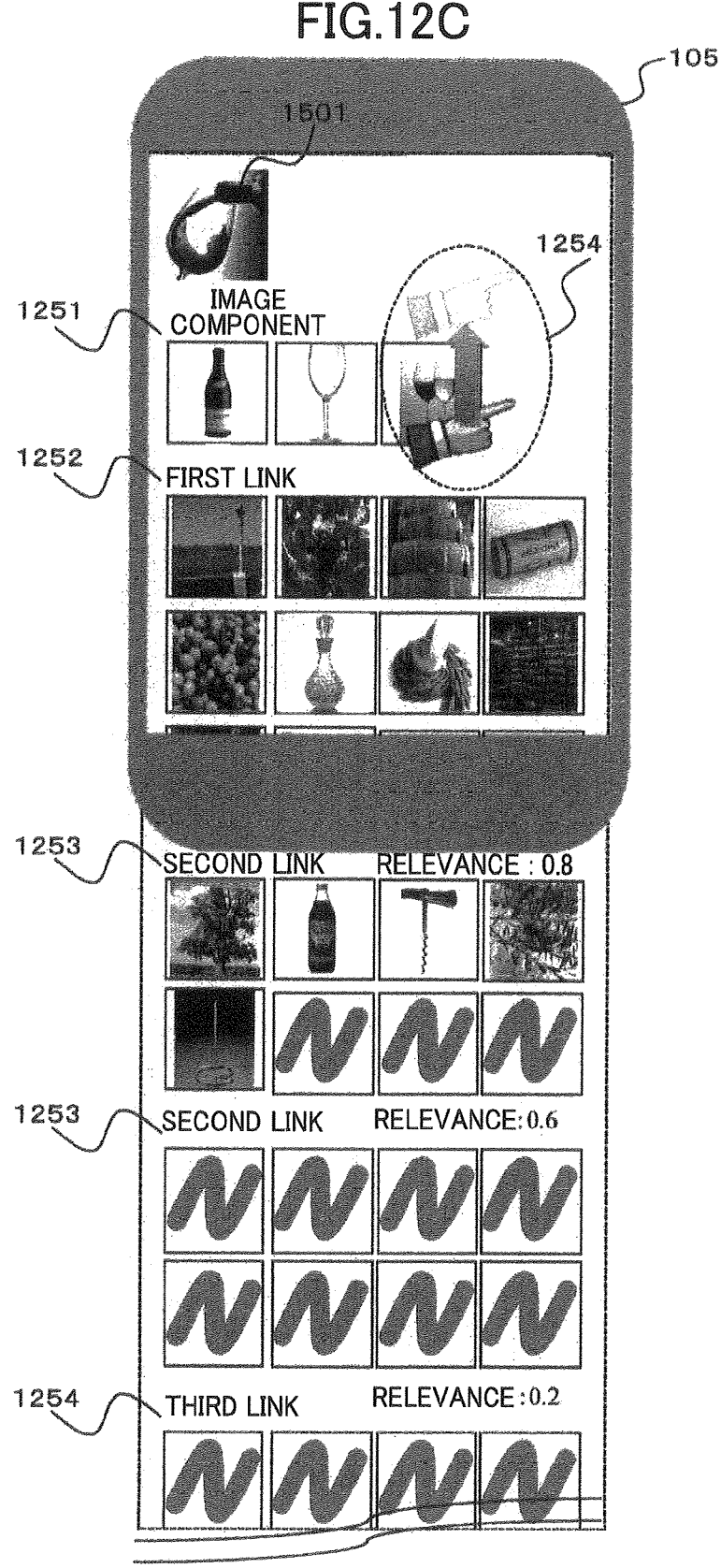
FIG. 12C is an explanatory diagram illustrating a user interface in the system according to another embodiment of the invention.
Figure 12D:
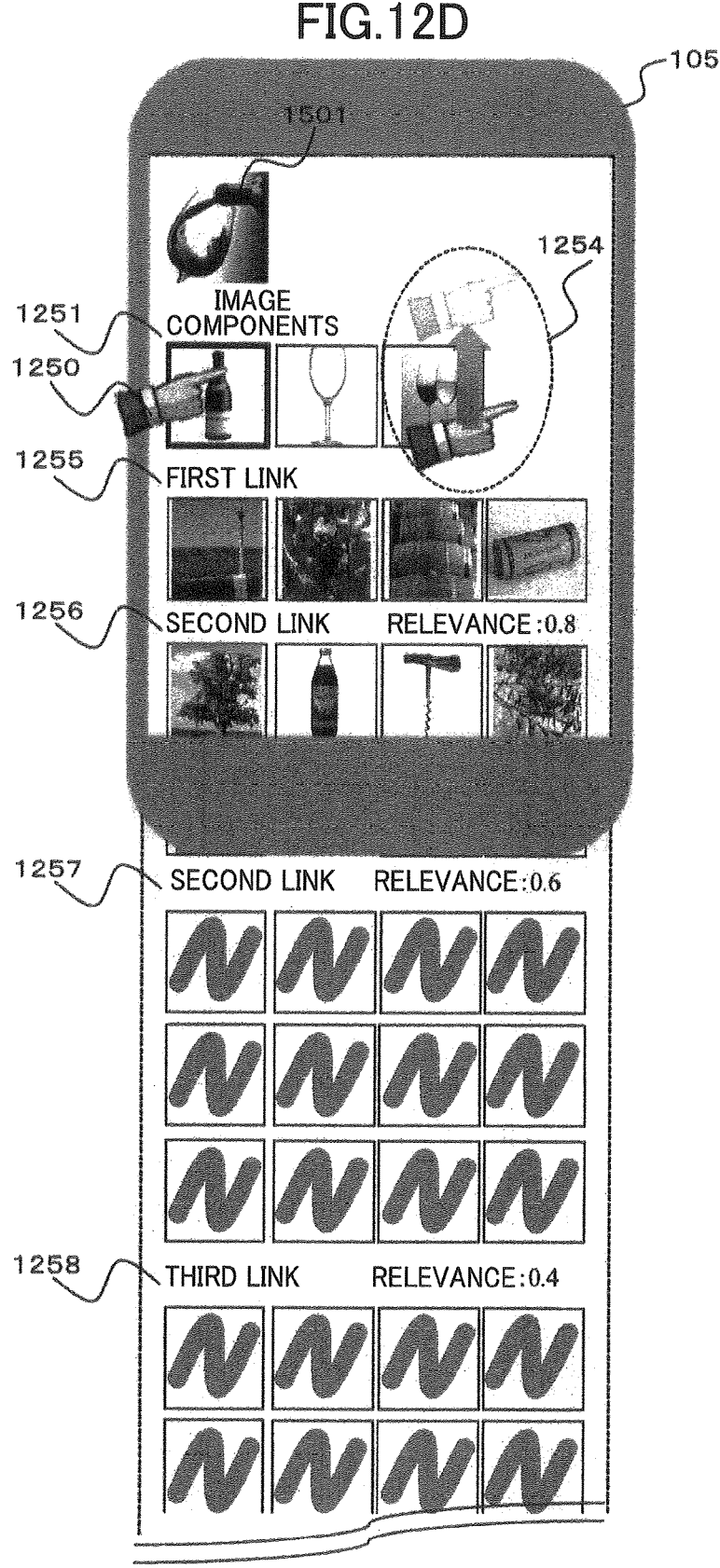
FIG. 12D is an explanatory diagram illustrating a user interface in the system according to another embodiment of the invention.
Figure 12E:
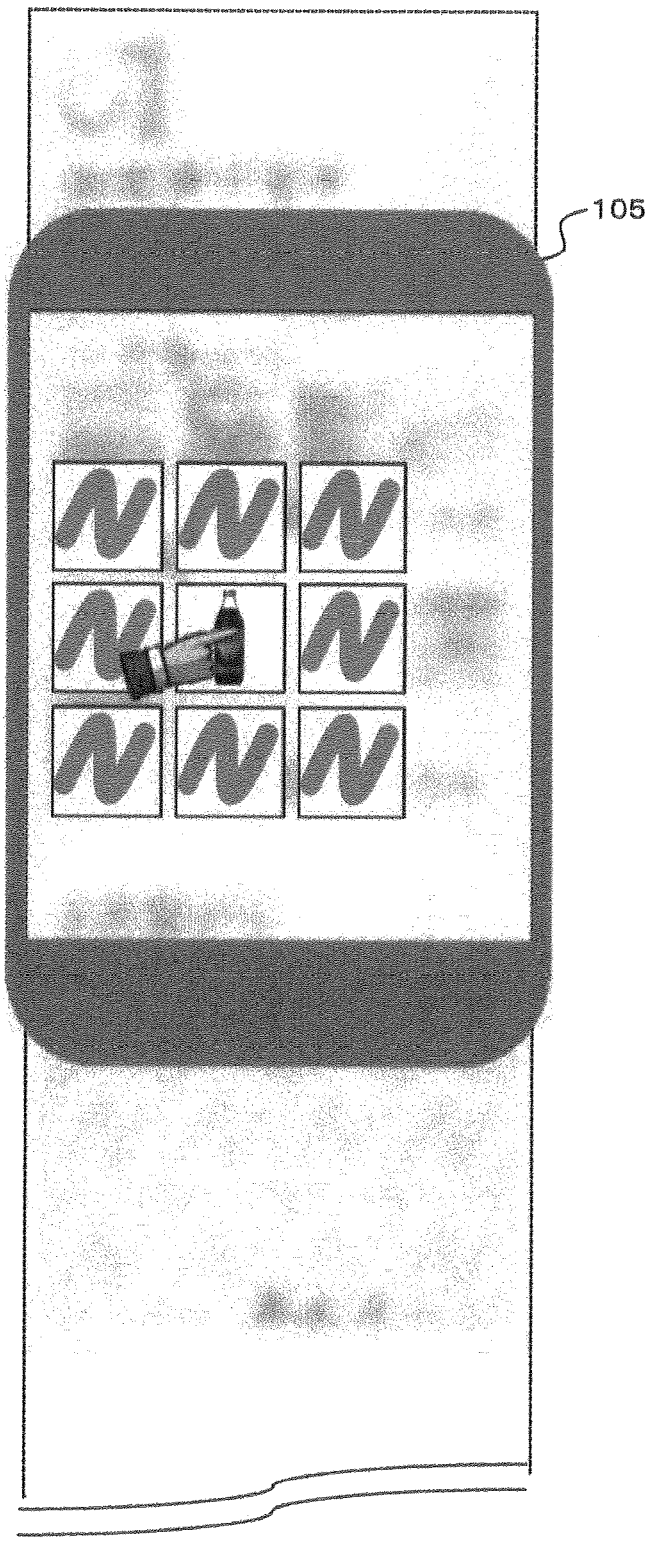
FIG. 12E is an explanatory diagram illustrating a user interface in the system according to another embodiment of the invention.

FIGS. 12A to 12E illustrate a user interface in the system according to an embodiment of the invention. In FIG. 12A(A), on a display of the network terminal device 105, besides images 1201 and 1202, several images, a relevance search window 1203, and an output window (OUTPUT) 1205 are displayed.

The images 1201 and 1202 are image tiles of image thumbnails transmitted by the relevance search engine to the network terminal in place of an original image, which are generated on image components that can be recognized by the image recognition engine 200 and related elements associated with the image components, from photographs, illustrations, characters, signs, logos, favicons, or the like representing them. They can be dragged to any point on the screen by the user operating it with a finger (1206).

Moreover, the relevance search window 1203 can be arranged on any screen such as the home screen of the network terminal device 105, or a screen managed by a specific application running thereon. In a typical embodiment, the relevance search window 1203 can be configured to be continuously present on the home screen after the activation of the network terminal device 105 to allow the user to select an entire image or a specific region of an image to be a target of search and then drag and drop it into the relevance search window 1203 to start image recognition and the subsequent relevance search process at any time. As an example, FIG. 12A(A) shows the user performing an operation of dragging and dropping the image 1201 to the relevance search window 1203.

Alternatively, without preparing the relevance search window 1203, any interface configured to allow the user to select an entire image or a specific region of an image of interest on the network terminal 105 and query the image recognition engine 200 on the server side via the network about the selected image may be adopted.

For example, in place of the operation of dropping a search target image in a relevance search window, an operation such as double tapping an entire image or a specific image region to be a target of search explicitly on the display screen of the network terminal 105 also allows for querying the image recognition engine 200 on the server side for recognition processing on the selected image.

On PCs or the like, as shown in FIG. 12A(B), it is possible to use a pointing device 1204 such as a mouse in place of an input operation by a touch panel, move a cursor 1207 onto the image 1201, and directly drag and drop the target image 1201 into the relevance search window 1203*a* (or an icon 1203*b* associated with relevance search) or place the cursor of the mouse on the image 1201 and double-click it, to query the image recognition engine 200 on the server side for recognition processing on the selected image.

FIG. 12B(A) shows a situation in which a relevance graph with image components and other related elements having much higher relevance to them as nodes transmitted as the results of relevance search on the selected image 1201 from the server 101 to the network terminal 105 is displayed on the entire screen of the network terminal 105, and the user flicks (1210) the nodes on the touch screen, seamlessly tracing the nodes on the relevance graph from left to right. Alternatively, it is also possible that by the user selectively tapping or touching an image as a node, the entire display is automatically scrolled on the network terminal 105 so that the relevance graph centered on the node is displayed. A region 1209 in FIG. 12B(A) shows an example of the relevance graph, and shows a part thereof cut out and shown on the network terminal 105. The actual size of a relevance graph often becomes much larger than that in this example. Nodes belonging to the region 1209 and link information as their mutual relationships that cannot be displayed on the network terminal 105 can be transmitted additionally by the relevance search engine 220 to the network terminal 105 with the scroll operation by the user, so that nodes or regions of interest to the user can be seamlessly traced on the relevance graph, visually presented to the user as broad relationships over a plurality of nodes.

In FIG. 12B(A), as a result of flicking, orange juice 1221 and grapes 1222 are displayed as elements related to grape juice 1220, and further, fruits 1223 to 1226 as elements related to the grapes 122 are displayed.

In FIG. 12B(B), by explicitly selecting (tapping or touching two times or more, for example) the grape juice 1220 in FIG. 12B(A) and querying the image recognition engine 200 on the server side via the network for this, a bottle cap 1231, a bottle 1232, and a logo 1233 of a manufacturer as image components recognized in the image recognition engine 200 are displayed.

For the scroll operation, input operation producing a similar effect by the user using a gesture, a line of sight, voice, a brain wave, or the like may be used (although not shown in the figure, for the detection of gestures including pinching in/pinching out, the detection of a line of sight or a brain wave, and the like, many sensing technologies already used can be introduced). Moreover, not limited to two-dimensional scroll operation, the relevance graph can be arranged in a three-dimensional space or a more multi-dimensional space.

As shown in FIG. 12C as an example, the relevance graph can be represented not only in a geometric graph visually showing a plurality of nodes, their mutual relationships, and the strengths of the relationships, but also in a useful way of representing it as a set of image tiles of an equivalent size arranged like tiles for a portable terminal or the like inevitably having a limited image display size. In this case, a method of displaying (1) an original input image (1501), (2) a plurality of image component candidates (1251) detected and recognized by the image recognition engine, and (3) other related elements (1252 or 1253) related to the individual image components, in their respective different element groups side by side in areas assigned on the display screen of the network terminal 105 is useful. The related elements in (3) (1252 or 1253) are displayed in layers according to the degree of relevance, a first link, a second link, a third link . . . , so that a flick operation on the touch panel by the user allows scrolling (1254) the screen at high speed, thus allowing the entire relevance to be effectively browsed. When nodes in a tile shape are arranged in a matrix like this, the strengths of the relationships between the nodes can be added as data such as a numerical value or a symbol in the vicinity of the nodes.

By querying the image recognition engine 200 on the server side via the network again for an arbitrary node image of the nodes represented in a tile shape in the relevance graph, and performing an operation to obtain new image components from the input image, a new relevance graph with those as the starting points can be obtained through the relevance search engine 220. In an example of implementation of the user interface, the user explicitly double taps an arbitrary node image, thus making a request to the server 101 from the network terminal 105 for the detection of new image components with respect to the image and image recognition. The image recognition engine 200 detects and recognizes new image components on the server side, and returns the results to the network terminal 105, so that they can be newly presented on the display screen on the network terminal 105 side as the corresponding image recognition elements (FIG. 12B(B)). These new image components may be displayed in place of an existing relevance graph, or may be superimposed on an existing relevance graph for display using a translucent display function or the like. When the user does not show an interest in these image component candidates, the screen is returned to the original relevance graph. When the user shows an interest in a newly detected image component, by double tapping a node representing the image component, new related nodes in a new relevance graph centered on the image component are transmitted from the server side to the network terminal 105, and the user can obtain the new relevance graph.

To the collection of interest graphs, the image recognition engine 200, the relevance search engine 220, the statistical information processing unit 209, and the specific user filtering processing unit 210 are related. These may all be operated as a portion of the server 101, or may be operated as server systems independent of the server 101.

Figure 13:
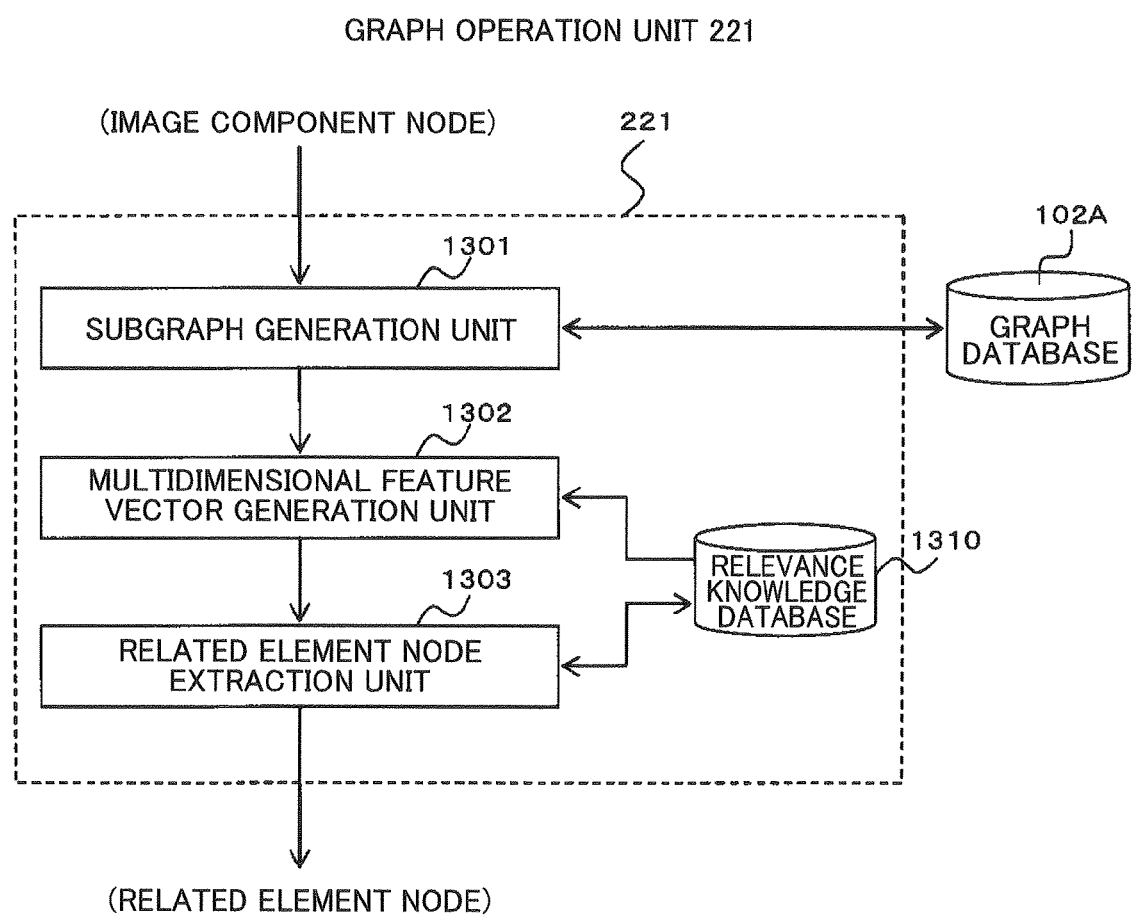
FIG. 13 is an explanatory diagram illustrating functional blocks of a graph operation unit in the system according to the embodiment of the invention.

FIG. 13 shows a configuration example of detailed functional blocks of the graph operation unit 221 in the relevance search engine 220. The graph operation unit 221 includes a subgraph generation unit 1301, a multidimensional feature vector generation unit 1302, and a related element node extraction unit 1303, and transmits and receives data to and from the graph database 102A and a relevance knowledge database 1310, as necessary.

The subgraph generation unit 1301 has nodes corresponding to image components extracted by the image recognition engine 200 as input, and generates a subgraph of the nodes, accessing the GDB 102A.

The multidimensional feature vector generation unit 1302 generates multidimensional feature vectors from the subgraph by calculation in the relevance operation unit 224 (FIG. 18 described below).

The related element node extraction unit 1303 determines the distance among the obtained multidimensional feature vectors by measuring Euclidean distance or measuring Mahalanobis distance, for example, to extract related element nodes.

FIG. 14A shows the basic data structure for representing a graph in the system according to the embodiment of the invention.

Basic Graph Operation

As shown in FIG. 14A(A), a hash operation 1404 is performed on a generation time and a value (1402) to obtain a key (1401). For example, when the hash operation 1404 uses the hash algorithm SHA-1, the key is 160 bits in length. The key (1401) obtains the value (1402) by a locate operation 1403. For example, for the locate operation 1403, a Distributed Hash Table method can be used. In the example, the relationship between the key and the value is represented by "(key, {value})" (FIG. 14A(B)), a unit stored in the GDB 102A as node data and link data.

For example, when two nodes in FIG. 14A(C) are linked together, a node n1 (1410) is represented by "(n1, {node n1})," and a node n2 (1411), by "(n2, {node n2})." The n1 and n2 are keys of the node n1 (1410) and the node n2 (1411). The node instance node n1 (1410) and node n2 (1411) are hash-operated to obtain their respective keys. A link l1 (1412) is represented by "(l1, {n1, n2})" like nodes. {n1, n2} is hash-operated to obtain a key (l1) 1412 thereof.

FIG. 14A(D) shows the structure of data held by a node. In a type section, the type of data that the node holds is stored. The type has four definitions, "USER," "OBJECT," "META," "URI," and "EXT." "USER" shows that the node represents a user, and "OBJECT" shows that the node represents an object. "META" shows that the node represents metadata on a user or an object, "SUBJECT" (Subjectivity) shows that the node represents the subjectivity of a user, and "URI" shows that the node represents a URI to a user or an object. "EXT" is prepared for the extension of the type, and extended data is stored in a data section.

FIG. 14A(E) shows the structure of data that a link holds. In a type section, the type of the link is stored. The type has two definitions, "UNDIRECTED" and "DIRECTED." "UNDIRECTED" shows that the link is an undirected link, and "DIRECTED" shows that the link is a directed link. In a data section, a key of a left node, a key of a right node, a weight (w), and a function (f) are stored. For a weight, a value representing the thickness of a link may be used, or a value resulting from compressing a multidimensional feature vector to be described below may be used.

Data represented by "(key, {value})" of a node or a link has immutable characteristics, that is, has write-once-read-many semantics (writing can be performed only once, but reading can be performed more than once), but is not limited to the semantics. For example, it may have write-many-read-many (both writing and reading can be performed more than once) semantics. In that case, a section for correction time is added both for a node and a link.

Figures 14B, 14C:
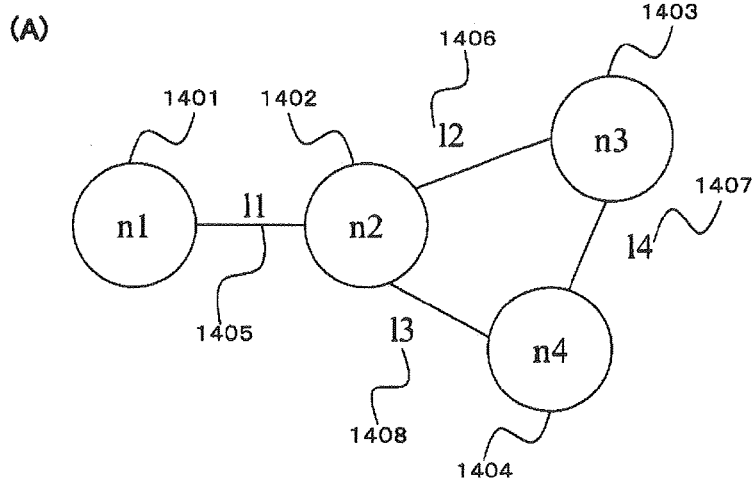
FIG. 14B is an explanatory diagram illustrating operation for operating node data and link data in the system according to the embodiment of the invention.
FIGS. 14C(A) to 14C(C) are explanatory diagrams illustrating a graph structure and link representations in the system according to the embodiment of the invention.

The node data and the link data shown in FIG. 14A are stored in the GDB 102A. FIG. 14B shows operation of the GDB 102A for operating the data. In the figure, as a typical operation set, five operations, "CREATE," "CONNECT," "NODE," "LINK," and "SUBGRAPH" are defined, but the operation may be extended. For example, when the semantics of data is "write-many-read-many," operations "DESTROY" and "UPDATE" may be included.

"CREATE" generates a node of a specified type. "CONNECT" generates a link connecting specified two nodes in a specified type. "NODE" acquires node data corresponding to a key. "LINK" acquires link data corresponding to a key. "SUBGRAPH" acquires a subgraph of a specified node.

FIGS. 14C(A) to 14C(C) show a graph structure and link representations in the system according to the embodiment of the invention.

First, FIG. 14C(A) shows a simple graph structure. There are four nodes 1401, 1402, 1403, and 1404 and their links l1 (1405), l2 (1406), l4 (1407), and l3 (1408). Their representations are shown in FIG. 14C(B). The links are undirected links unless otherwise specified. "(l1, {n1, n2})" is a link between the node n1 (1501) and the node n2 (1502). When a directed link from the node n1 (1501) to the node n2 (1502) is represented, it is represented by "(l1, {n1, n2}')."

FIG. 14C(C) shows links that are not static and are represented by dynamic functions. For "(n1, {f(n1, n2)})," a link between the node n1 (1401) and the node n2 (1402) is calculated with the function "f(n1, n2)." For example, when the node n1 (1401) is a multidimensional feature quantity vector of an image, and the node n2 (1402) is a multidimensional feature quantity vector of a different image, "f(n1, n2)" is an operation comparing the information distance. Alternatively, it may be the probability of a link between nodes.

Figure 15:
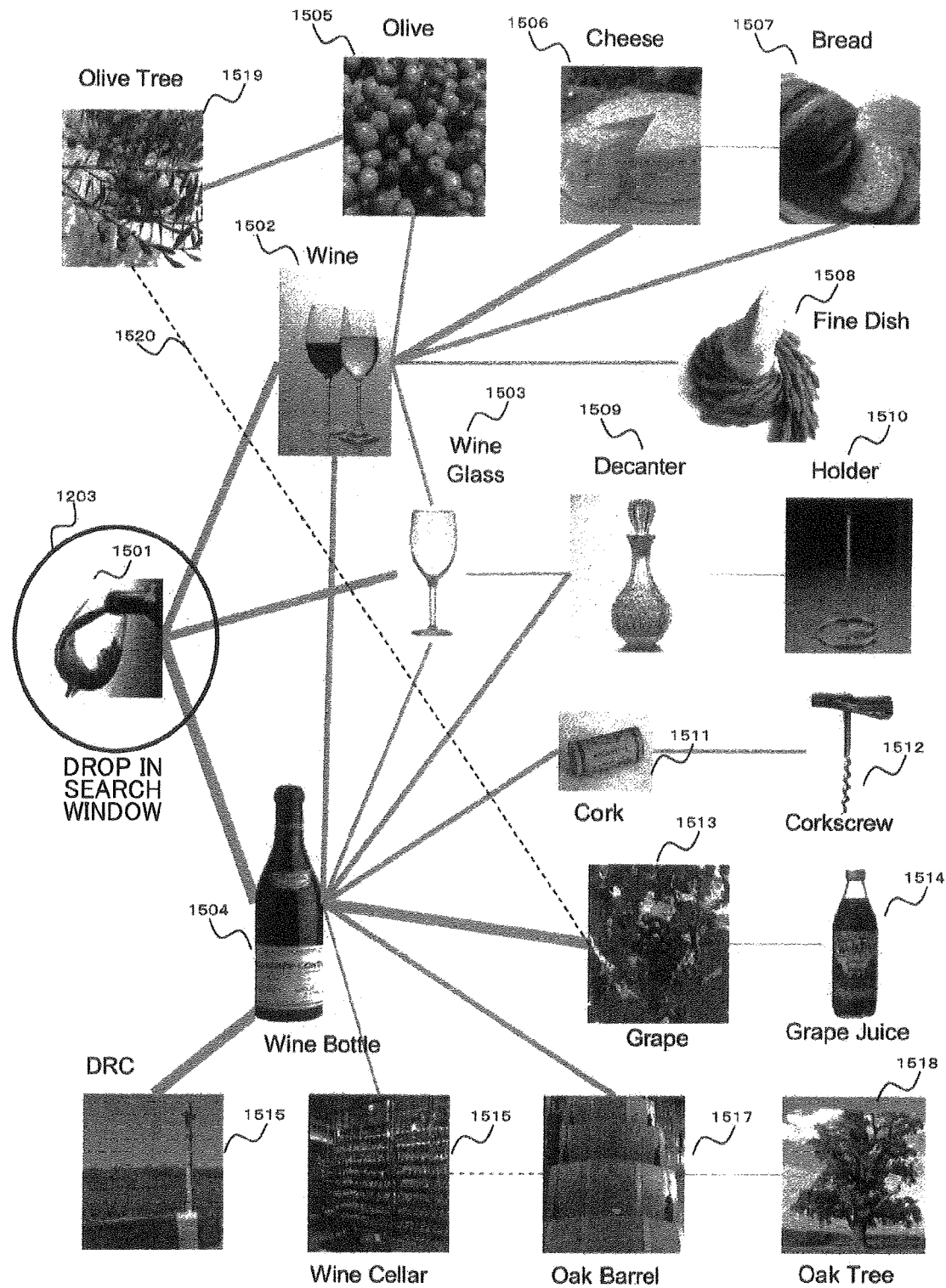
FIG. 15 is an explanatory diagram illustrating an example of the structure of links to related images and an example of operation in the system according to the embodiment of the invention.

FIG. 15 shows an example of a visual link structure of a search related image, image components, and related element images, and an example of operation in the system according to the an embodiment of the invention.

Visual Graph Representation

FIG. 15 shows a relevance graph after an image 1501 is dragged and dropped into the relevance search window 1203. The image 1501 is processed in the image recognition engine 200 or the image recognition system 202, and three image components are extracted. That is, Wine (1502), Wine Glass (1503), and Wine Bottle (1504) are the three image components. In the figure, although they are labeled with Wine, Wine Glass, and Wine Bottle, these are not output on the screen and are only for facilitating the explanation of the invention. These image components are processed in the relevance search engine 220, and their related elements 1505 to 1518 are extracted. For example, the image 1502 is related to five related element images. They are five images, Olive (1505), Cheese (1506), Bread (1507), Fine Dish (1508), and the Wine Glass (1503). The Wine Glass (1503) is related to Decanter (1509) as a related element. The Wine Bottle (1504) is related to eight related element images. They are eight images, the Wine (1502), the Wine Glass (1503), the Decanter (1509), Cork (1511), Grape (1513), DRC (1515), Wine Cellar (1516), and Oak Barrel (1517).

Moreover, the thickness of a link line between images has meaning. A thick link line indicates a greater degree of relevance than a thin link line. For example, the Wine (1502) is linked to the Olive (1505) and the Cheese (1506). The link to the Cheese (1506) is thicker than the link to the Olive (1505) in this example. That is, it shows the relationship in which the relationship between the Wine (1502) and the Cheese (1506) is stronger.

Although such relationships broadly expand beyond the region shown in FIG. 15, FIG. 15 shows a part thereof for illustration by example. The broad relevance graph can selectively show nodes with relevance of a certain degree or more to one another, based on the degree of relevance between nodes.

Next, for example, the Decanter (1509) is newly dropped in the relevance search window. In this case, the image recognition engine 200 processes the image Decanter (1509) to extract new image components. New related elements related to them are extracted from the relevance search engine 220 and displayed, so that a relevance graph different from that in FIG. 15 is expanded.

FIG. 16(A) shows a relationship with a graph structure according to a scenario in FIG. 15. Here, a graph structure associated with the image 1501 and images of its image components 1502 to 1504 is shown. Four nodes 1601, 1602, 1603, and 1604 correspond to their respective image components.

To represent these relationships, a data set 1605 is stored in the GDB 102A.

Various nodes are linked to the image components. As an example, FIG. 16(B) shows part of metadata on the image components. The node 1602 has two pieces of metadata, a node 1610 (red) and a node 1611 (white). The node 1603 has three pieces of metadata, a node 1612 (crystal), a node 1613 (company name), and a node 1614 (creator name). The node 1604 has three pieces of metadata, a node 1615 (name), a node 1616 (vintage), and a node 1617 (winery). These pieces of metadata are further linked to other related nodes (not shown).

FIG. 17(A) shows a graph structure related to related elements according to the scenario in FIG. 15. Here, a graph structure for the image 1502 and the images of its related elements 1501, 1503, 1504, and 1505 to 1508 is shown. Seven nodes 1601 to 1604 and 1701 to 1704 correspond to their related elements.

To represent these relationships, a data set 1705 is stored in the GDB 102A.

FIG. 17(B) shows graph structures for the respective related elements. In the figure, the graph structure is partly shown because of space limitations. For example, the node 1604 is linked to a node group 1710 corresponding to metadata and further to a related link group 1711. Similar links are present at the other related element nodes 1601 to 1603.

Relevance Derivation Operation

FIG. 18 shows an example of a relevance derivation operation according to the invention, showing processing in the relevance operation unit 224 in the relevance search engine 220. As seen in FIG. 17, there is a complicated graph structure between images of image components and nodes constituting related elements. For example, suppose that a graph in FIG. 18(A) is given. This is a subgraph extracted from a graph structure between two nodes. Here, f of a link between nodes is calculated (a function f in FIG. 14(E) is calculated). A function f is a probability or a vector, depending on the type of a node and a link. For example, f of a link 1801 is calculated, and the obtained value is an element in a row. When this is repeated on every link, a matrix (v1) in FIG. 18(B) is obtained. FIG. 18(C) shows a histogram in which each row in the matrix (v1) corresponds to a bin. The matrix (v) is used as a multidimensional feature vector for calculating relevance between nodes. That is, the multidimensional feature vector shows the strength of the direct relationships between nodes. In FIG. 18, the relevance between the node 1801 (n1) and the node 1809 (n2) is represented by the multidimensional feature vector, and is recorded in the relevance knowledge database 1310. A link is generated between the node n1 and the node n2 in the GDB 102A, that is, link data "$(l_{n1\text{-}n2}, \{f(v1)\})$" (here f(v1) is an access function/method to the relevance knowledge database) is stored in the GDB 102A. Thus, the relevance between nodes is learned.

Further, a value resulting from dimensionally compressing the multidimensional feature vector with f(v1) may be assigned to the thickness of a link line. In this case, as the value of a dimensionally-compressed multidimensional feature vector becomes larger, a thicker link line can be shown on a graph. For dimensional compression, a known operation method can be used.

Basic Interest Graph Acquisition

FIGS. 19(A) and 19(B) show an example of interest graph acquisition according to the invention. FIG. 19(A) shows a simplified relevance graph centered on a node 1903 corresponding to a user (the type of the node is "USER"). The node 1903 is linked to nodes 1904, 1905, and 1906 corresponding to three objects (the type of the nodes is "OBJECT"). The result of calculating and summing up multidimensional feature vectors between the node 1903 and the node 1904, the node 1905, and the node 1906 by the procedure illustrated in FIG. 18 is a multidimensional feature vector 1901 in FIG. 19(A).

Here, suppose that two objects are added to the node 1903 (FIG. 19(B)). The objects are a node 1913 and a node 1914. Likewise, as a result of calculating and summing up multidimensional feature vectors between the node 1903 and the node 1913 and the node 1914, a multidimensional feature vector 1911 in FIG. 19(B) is obtained. Note the difference between the feature vectors in a dotted-line circle 1902 and a dotted-line circle 1912. Thus, the multidimensional feature vector is adaptively strengthened to acquire an interest graph with the user 1903 as the center node.

By adapting the above operation to nodes whose type stored in the GDB 102A is "USER," interest graphs corresponding to individual users can be acquired.

Further, when calculation by the relevance operation unit 224 is adapted to a specific group of users, the results show features related to the users in the group (so-called user cluster). The adaptation of the calculation to all users results in features related to all the users. Then, by the statistical information processing unit 209, the multidimensional feature vectors centered on the users represent a statistical interest graph, which will be described in detail below.

Display Example of Graph Structure

Figure 20A:
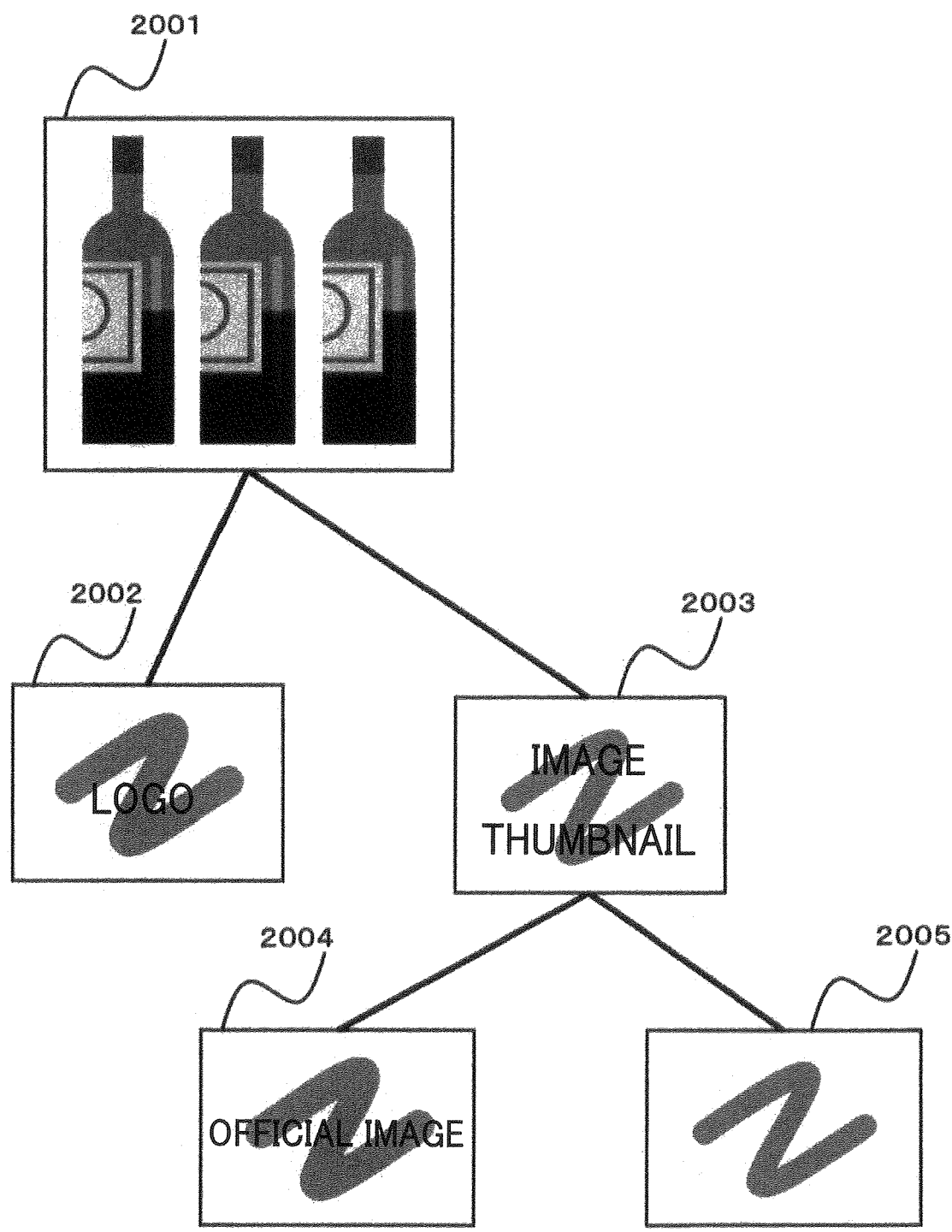
FIG. 20A is an explanatory diagram illustrating an example of display of a graph structure in the system according to the embodiment of the invention.

FIGS. 20A to 20C(B) show display examples of a graph structure in the system according to the embodiment of the invention.

In FIG. 20A, for images corresponding to nodes in a graph structure, an image 2001 (for example, an illustration) may be used, and a logo 2002 and an image thumbnail 2003 may be used. Further, an official image (2004) may be used from the MDB 102B.

Here, note that a logo of a company includes a plurality of meanings, as an example. Specifically, it can represent the company itself and also a commodity of the company.

FIGS. 20B(A) and 20B(B) show an example of visually displaying a relevance graph together with a time axis variable as observation time.

FIG. 20B(A) shows an example of a relevance graph in which a time axis as a horizontal axis is displayed in such a manner that the left is the past and the right is the future. The user may flip the display screen (1210). In this case, the display of the time axis becomes a past time axis, such as yesterday or three days ago, or a future time axis such as the day after tomorrow or three days after, and the graph display changes correspondingly. FIG. 20B(B) shows an example in which a scroll bar 2011 is prepared for changing the time axis, the relevance graph at a certain time is displayed (2012), and a scroll bar is moved to display the relevance graph at a different time axis (2013).

Further, in addition to the time axis in FIG. 20B, a relevance graph attached on a map or on a globe based on location information may be displayed.

FIGS. 20C(A) and 20C(B) show an example in which a more detailed relevance graph centered on a certain node is displayed. In a display 2021, by double tapping (2023) or pinching out (not shown in the figure) a node 2022 (FIG. 20C(A)), a more detailed relevance graph (2031) centered on the node 2022 is displayed.

For example, in FIG. 20C(B), a node 2032 further linked to the node 2024 and a new node 2033 are additionally displayed.

Operators for Interest Graph Growth

FIGS. 21(A) and 21(B) show an example of operation in a system according to another embodiment of the invention. In FIG. 21(A), logical operators (AND 2101 and OR 2102) are introduced as input search conditions to the relevance search window 1203. Here, when AND (2101) is specified, nodes commonly and directly related between nodes starting from an image 2104 and an image 2105 are selected. That is, nodes directly linked from the node 2104 and the node 2105 are selected. On the other hand, when OR (2102) is specified, nodes directly related to at least one of the nodes are selected. That is, nodes directly linked from the node 2104 and nodes directly linked from the node 2105 are selected.

FIG. 21(B) shows an example of operation of the AND operator 2101. By searching for a relevance graph on the graph database 102A, a node 2108 and a node 2109 commonly and directly related to a node 2106 corresponding to the image 2104 and a node 2107 corresponding to the image 2105 are selected. In FIG. 21(B), the node 2108 represents a node related to Tuscany in Italy, and the node 2109 represents a node related to a winery.

FIGS. 22(A) and 22(B) show an example of operation in a system according to another embodiment of the invention.

FIG. 22(A) shows an operation when CONNECTION SEARCH (2103) is selected as a search condition of the relevance search window. The figure shows that two images (2201 and 2203) are dragged and dropped into the relevance search window. In FIG. 22(B), a node 2206 (something 1) can be reached from a node 2202 corresponding to the image 2201, and also a node 2209 (something 2) can be reached from a node 2204 corresponding to the image 2203. Here, the GDB 102A is searched to search for a link in a graph structure between the node 2206 and the node 2209. When there is a direct or indirect link between the nodes, the nodes are displayed.

When there is a direct link, a plurality of appropriate links are retrieved from the GDB 102A. Every time a node holding a URI to an image is reached, the image is displayed.

When there is an indirect link, using the statistical information processing unit 209 described below, a subgraph with the node 2202 in a route is extracted from the GDB 102A, and with respect to the multidimensional feature vector generated in the multidimensional feature vector generation unit 1302, nodes having multidimensional feature vectors having probabilities greater than the co-occurrence probability of the multidimensional vector are selected, for example, to indirectly link the node 2201 and the node 2203. In this method, there may be a plurality of paths linking the nodes. At that time, a relevance graph including, as the shortest path, a path with a minimum number of nodes on the path, or a path with a minimum weight between nodes on the path may be displayed.

In a modification of CONNECTION SEARCH (2103), a single image, for example, only the image 2201 may be dragged and dropped into the relevance search window to connect links selected by the above method.

Further, thereafter, a direct link (2210) may be generated between the node 2202 and the node 2204.

Figure 23:
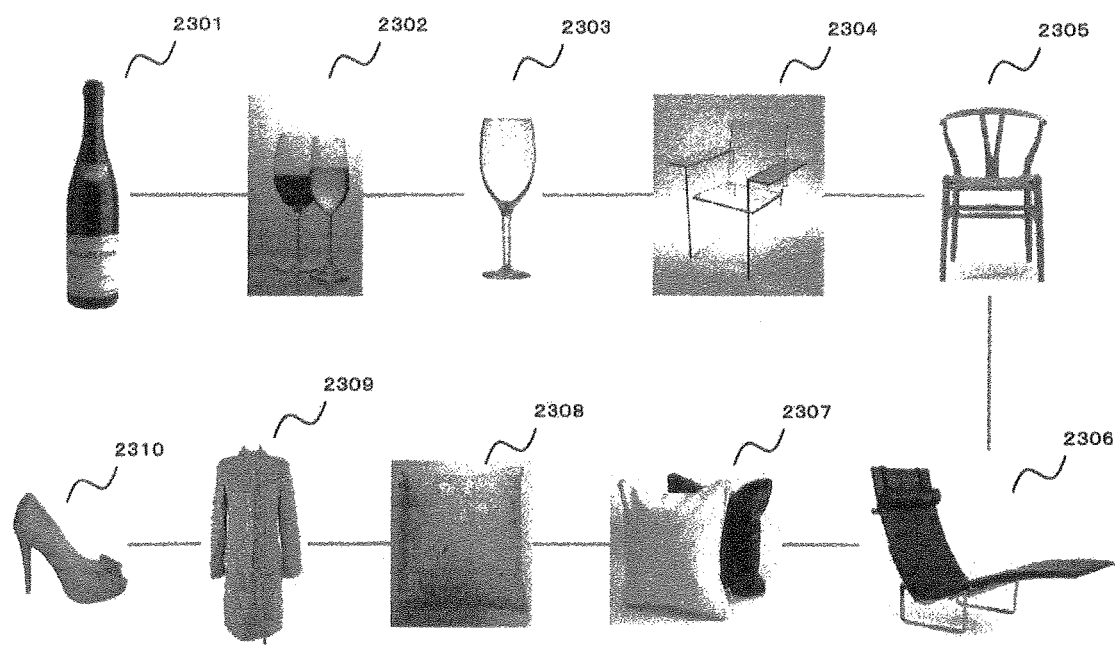
FIG. 23 is an explanatory diagram illustrating specific associative relations in the system according to another embodiment of the invention.

When there is the indirect link, specific associative relations shown in FIG. 23 can be derived by the CONNECTION SEARCH operator 2103. Specifically, from a wine bottle in an image 2301, a link to a wine glass in an image 2302 is extracted through the material, wine. Further, through an article of the kind, glasses, a link to an image 2303 of a wine glass made by a high-grade wine glass manufacturer is extracted. Further, a link to an image 2304 of a chair of the same material is extracted. Further, through an article of the same kind, chairs, a link to an image 2305 is extracted. Further, through the fact that the creator is the same, a link to an image 2306 is extracted. Further, through the fact that the material is the same, a link to an image 2307 is extracted. Further, through the fact that the shape is the same, a link to an image 2308 is extracted. Further, through the fact that the color is the same, a link to an image 2309 is extracted. Further, through the fact that the apparel company is the same, a link to an image 2310 is extracted.

When a plurality of non-direct paths is found like this, it is possible to extract an indirect link in which the number of relay nodes is the smallest, or the weight between nodes on the path is a minimum as described above.

Moreover, by tracing the plurality of non-direct paths, an unexpected link between nodes can be found.

FIGS. 24A(A) to 24A(C) show an example of operation in the system according to another embodiment of the invention.

In FIG. 24A, to a node 2402 corresponding to a user 2401, two objects 2403 and 2404 are linked. For example, when a new object 2410 is found by the operation shown in FIGS. 22(A) and 22(B), application of a connection operator LIKE (2420) to that (FIG. 24A(A)) results in generation of a link 2411 between the node 2402 of the user and the node 2410 of the object, directly linking them. (FIG. 24A(B)). As a result, link data "(2411, {user A, object C})" is newly registered in the GDB 102A.

Further, it may be configured so that when the update is performed, the user 2402 and a user 2405 directly related to the user 2402 are notified of the existence of a new direct relationship due to the update (the existence of the link 2411). That is, as shown in FIG. 24A(C), notification of the existence of the new direct relationship (existence of the link 2411) is provided on a network terminal (not shown) of the user 2402 and the network terminal 105 of the user 2405.

Figure 24B:
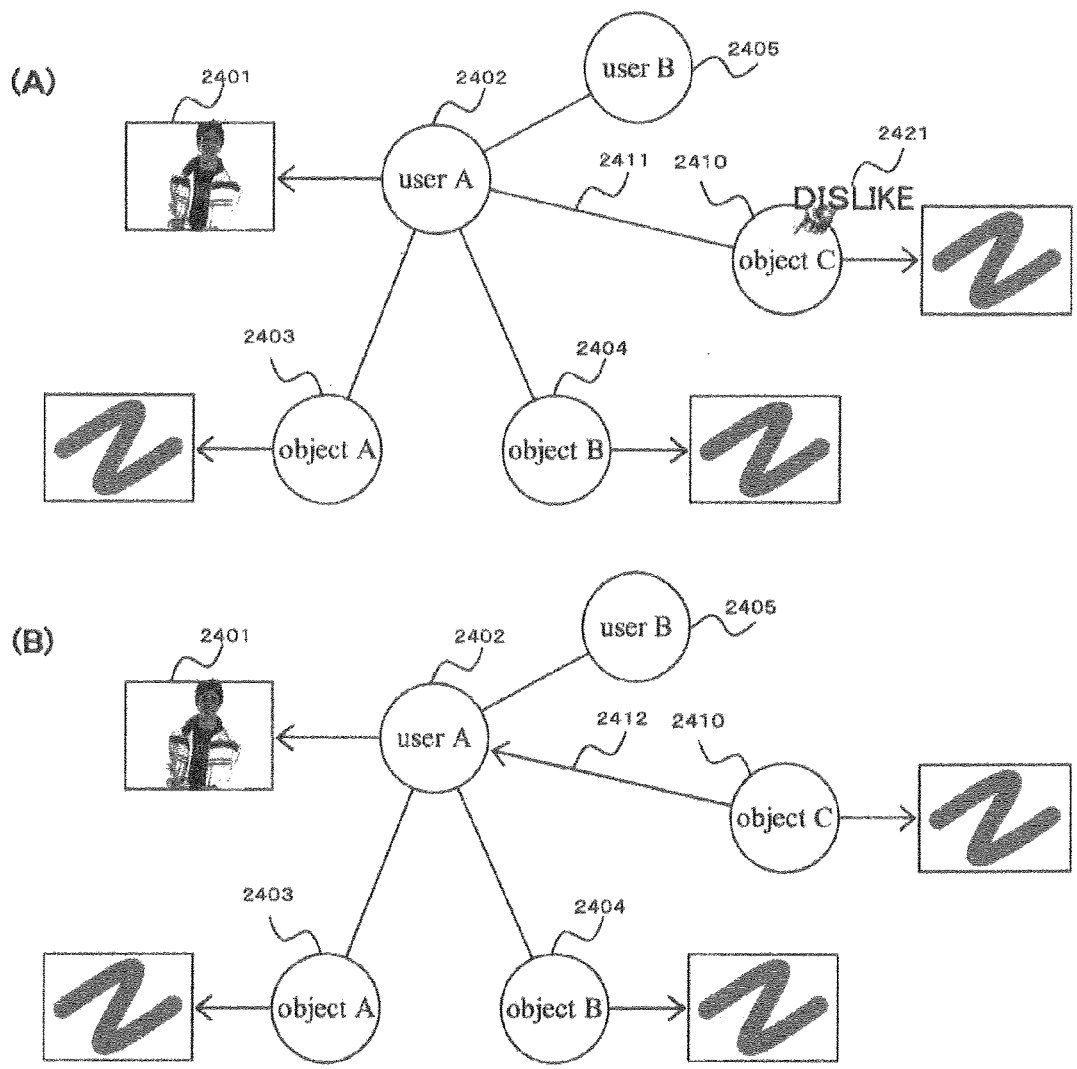
FIGS. 24B(A) and 24B(B) are explanatory diagrams illustrating an example of operation in the system according to another embodiment of the invention.
Figure 25:
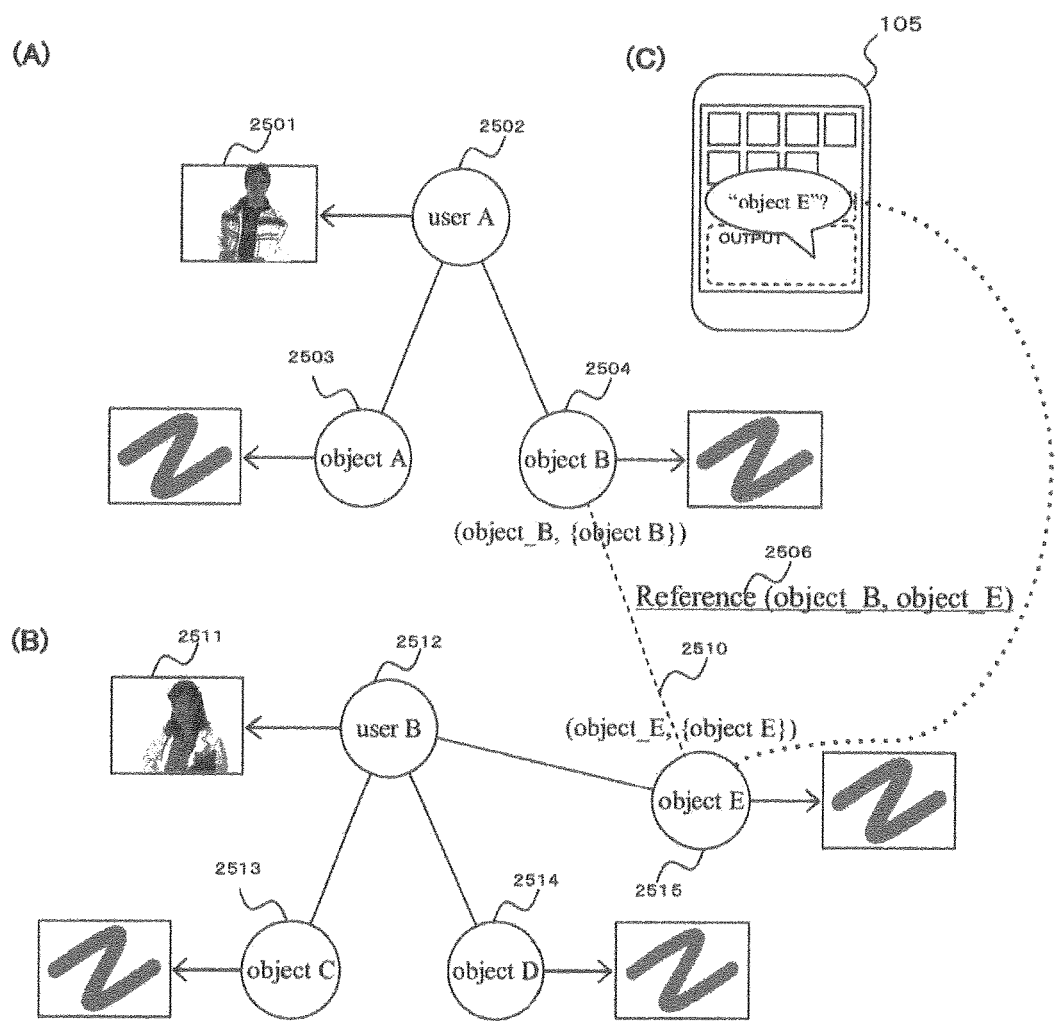
FIGS. 25(A) and 25(B) are explanatory diagrams illustrating an example of operation in the system according to another embodiment of the invention.
Figure 26:
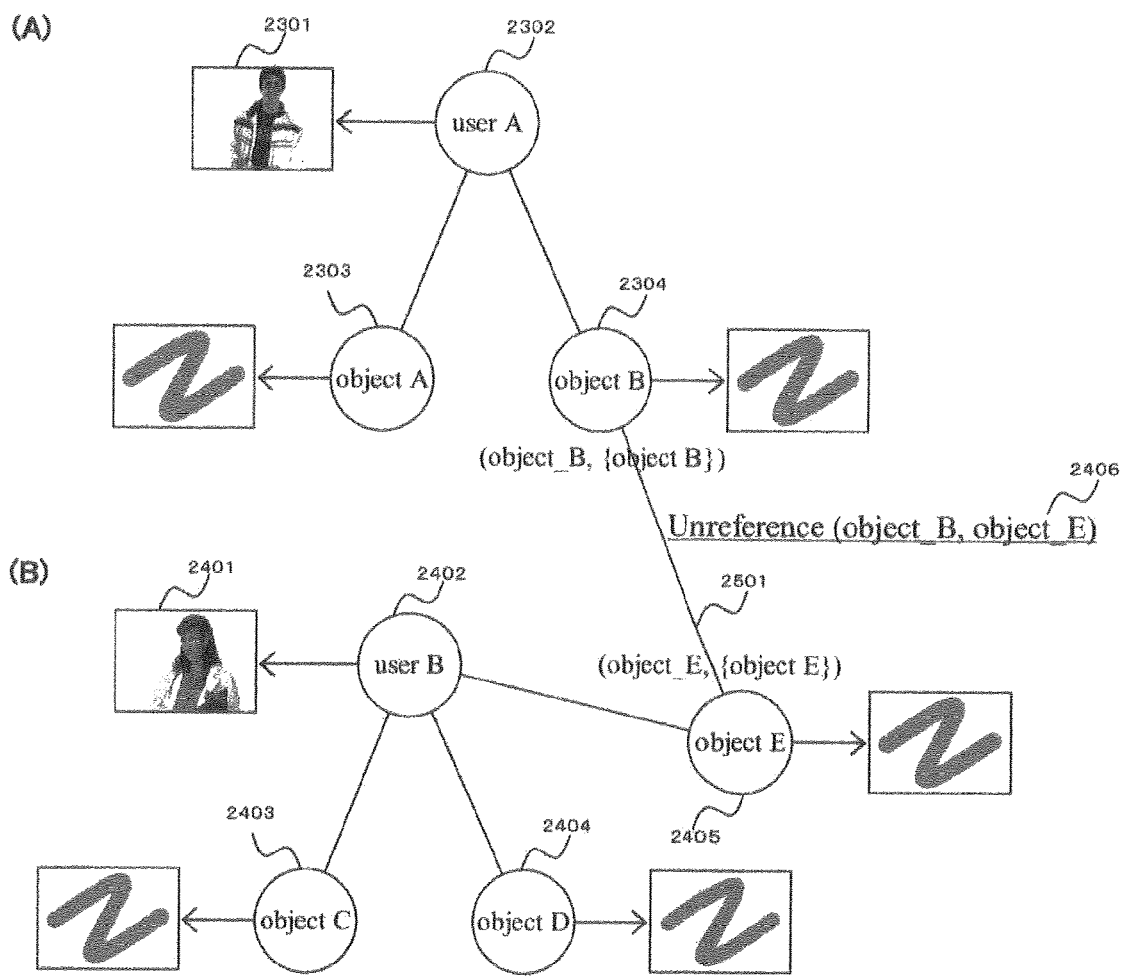
FIGS. 26(A) and 26(B) are explanatory diagrams illustrating an example of operation in the system according to another embodiment of the invention.

When a disconnection operator DISLIKE (2421) is applied to the object 2401 in FIG. 24B(A), the link 2411 is cut. A directed link with link data "(2412, {object C, user A}')" is generated and registered in the GDB 102A (FIG. 24B(B)).

The connection operator LIKE and the disconnection operator DISLIKE vary the direct relationship between a node corresponding to a user and another node, thus varying a corresponding graph structure also. Here, a multidimensional feature vector obtained by calculating a link between a certain node at the center and a user node linked thereto by means similar to those in FIGS. 18, 19(A), and 19(B) in the relevance operation unit 224 represents the depth of the user's interest in the node.

FIGS. 25(A) and 25(B) show an example of operation in the system according to another embodiment of the invention.

In FIGS. 25(A) and 25(B), two objects 2503 and 2504 are linked to a node 2502 corresponding to a user 2501 (FIG. 25(A)). On the other hand, three objects 2513, 2415, and 2515 are linked to a node 2512 corresponding to a user 2511 (FIG. 25(B)).

Here, first, a direct link 2510 does not exist between the object 2504 and the object 2515. However, the relevance search engine 220 in the invention may find out an indirect link as seen in FIG. 23. Thus, when the user 2501 is notified of the possibility of existence of the object 2515 on the network terminal (FIG. 25(C)), the user can execute an operator Reference (2506) for connecting them directly. With this, a link between the object 2504 and the object 2515 is presented, and a new multidimensional feature vector is generated by processing of the relevance difference unit 224. When a plurality of requests for this link generation occurs and exceeds a predetermined threshold, or by a supervisor having specific authority, a link directly associating the object 2504 with the object 2515 is generated by the "CONNECT" operation in FIG. 14B.

Alternatively, a user may be given specific authority. In that case, a request for link generation by the operator Reference is immediately executed, and a link directly associating the object 2504 with the object 2515 is generated by the "CONNECT" operation in FIG. 14B.

Like the above, a dotted provisional link (1520) is drawn between the Olive Tree (1519) and the Grape (1513) (FIG. 15). When viewed in the original relevance graph, the distance of them is large. However, the operator Reference can propose the user to link them directly. At that time, communication between users may be induced by the proposition about the presence or absence of the relationship. As a result, when the proposition is reasonable, the link 1520 can be updated as a solid link (established as a direct relationship).

FIGS. 26(A) and 26(B) show an example of operation in the system according to another embodiment of the invention.

In FIGS. 26(A) and 26(B), as in FIGS. 24A(A) to 24B(B), two objects 2303 and 2304 are linked to a node 2302 corresponding to a user 2301 (FIG. 26(A)). On the other hand, three objects 2403, 2404, and 2405 are linked to a node 2402 corresponding to a user 2401 (FIG. 26(B)). It is shown that a direct association link 2501 exists between the object 2304 and the object 2405. The user 2301 doubts the association, and executes an operator Unreference (2406). When a plurality of requests presenting non-existence of this direct relationship occurs, exceeding a predetermined threshold, that is, when more than a fixed number of users execute Unreference operations, for example, the direct link between the object 2304 and the object 2405 is subjected to cutting processing as false recognition. Alternatively, when the request is established by the authority of a supervisor, the direct link between the object 2304 and the object 2405 can be cut likewise.

Statistical Information Processing Unit

Using FIG. 27, a functional block configuration in the statistical information processing unit 209 in the embodiment will be described.

The statistical information processing unit 209 includes three elements. The three elements are a graph-vector construction unit 2701, an inference engine unit 2702, and a graph mining processing unit 2703. Further, the inference engine 2703 includes a decision tree processing unit 2710 and a Bayesian network construction unit 2711. The graph mining processing unit 2703 includes a pattern mining processing unit 2712 and a Random Walk with Restarts (RWR) processing unit 2713. The procedure of graph mining is not limited to them.

Figure 27:
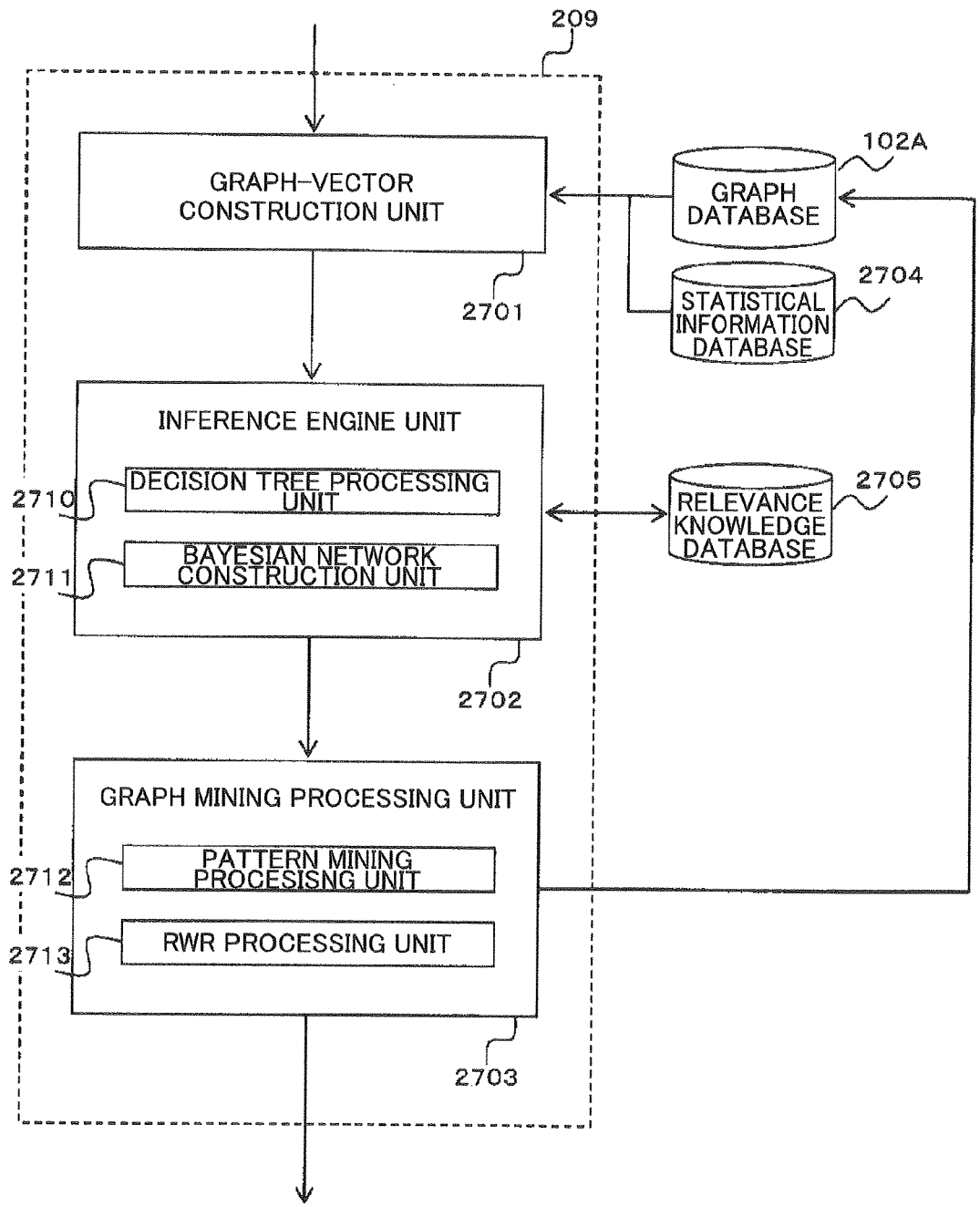
FIG. 27 is an explanatory diagram illustrating functional blocks of a statistical information processing unit in the system according to the embodiment of the invention.
Figure 31:
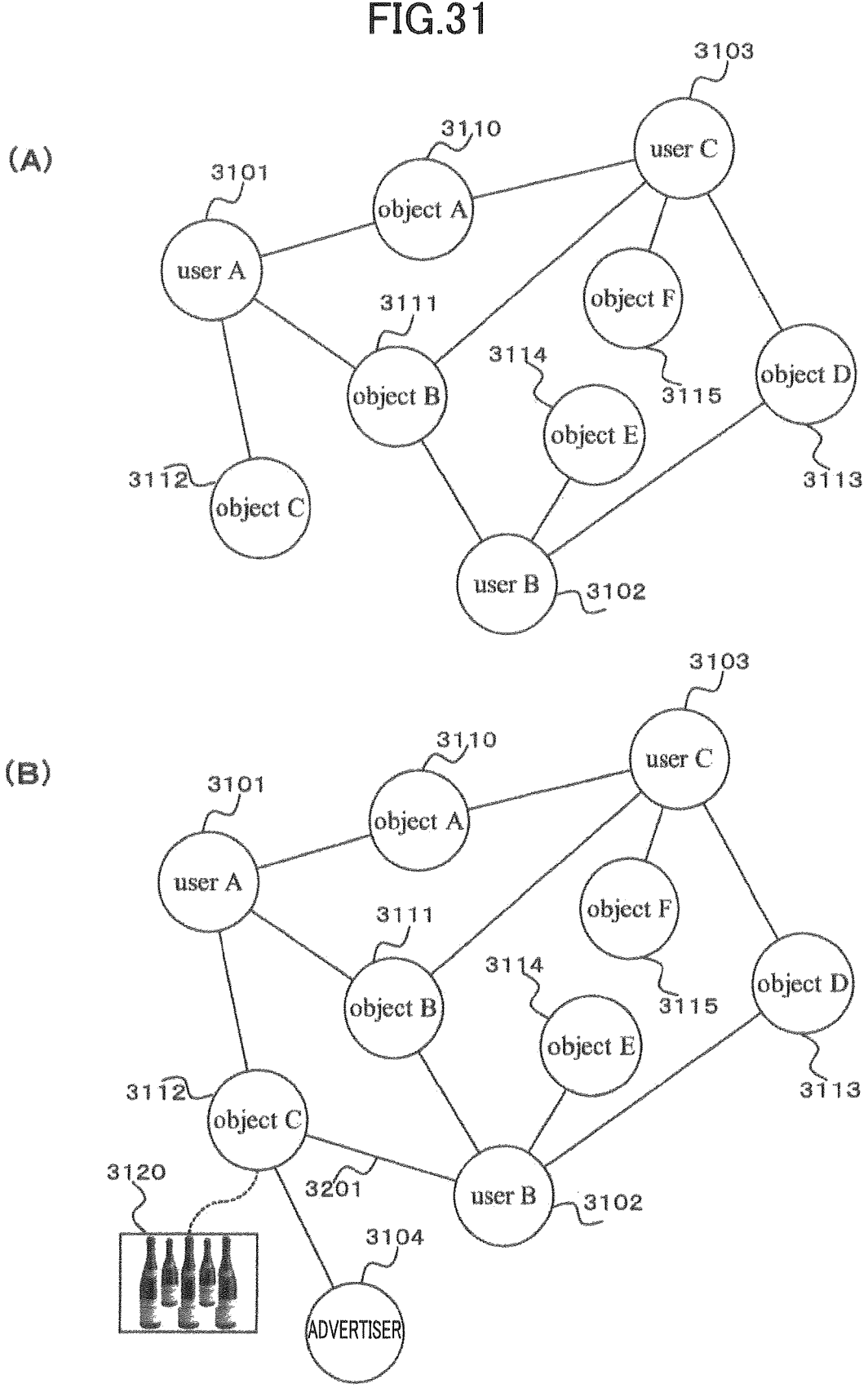
FIGS. 31(A) and 31(B) are explanatory diagrams illustrating a configuration example of an interest graph in the system according to the embodiment of the invention.

The graph-vector construction unit 2701 in FIG. 27 extracts a subgraph related to an input node, using data from the GDB 102A and/or data from the statistical information database 2704, and obtains, from processing in the relevance operation unit 224, a multidimensional feature vector for input to the inference engine 2702. In the inference engine 2702, using information in a knowledge database 2705 as a reference, it is processed by the decision tree processing unit 2710 executing processing by a decision tree method that is one of probabilistic inference models, or is processed by the Bayesian network construction unit 2711, to be sent to the graph mining processing unit 2703 for extracting a frequently appearing main part. The graph mining processing unit 2703 generates a subgraph (FIG. 28(C)) that is the result of performing graph mining processing using a pattern mining method or an RWR method.

Filtering Processing by User's Subjectivity

FIGS. 28(A) to 28(C) show the configuration of the specific user filtering processing unit 210 in the system according to the embodiment of the invention. The processing unit includes three elements, a multidimensional vector construction unit 2801, a subjectivity filter construction unit 2802, and a multidimensional vector processing unit 2803. A subgraph as a result of being extracted from the GDB 102A and processed by the statistical information processing unit 209, for example, is reconstructed as a multidimensional vector in the multidimensional vector construction unit 2801. For user information, the user's subjective evaluation filter is generated as a multidimensional feature vector (FIG. 28(B)) in the subjectivity filtering processing unit 2802, using information in a user database 2804. The multidimensional feature vectors output from the two construction units (2801 and 2802) are processed by the multidimensional feature vector processing unit 2803, and reconstructed as a multidimensional feature vector representing the depths of connections between nodes reflecting the user's subjective evaluation in FIG. 28(C).

From the user database 2804, evaluations of nodes linked to users are quantified. The quantification may be specified through a process by learning or directly by the users, or may be determined using the number of links between the users and the nodes. The operation of the values of the corresponding bins of the multidimensional feature vectors and the evaluations allows weighting processing in accordance with the likes of users.

As a method for generalizing the process as preferences covering a wide range of users, the preferences can be expressed as the following elements as common subjective views of the wide range of users.

| | |
|---|---|
| Looks/Appearance | handsome, worn-out, clean, beautiful, lovable, . . . |
| Evaluation Expression | satisfying, splendid, . . . |
| Labeling | great, respect, arrogant, . . . |
| Taste | like, delicious, mild, sweet, . . . |
| Psychological State | a sense of crisis, anger, lonely, sad, energy, . . . |

These can be registered in the user database 2804, and at the same time, these subjective views can be generally applied as "SUBJECT." The subjectivity filter construction unit 2802 generates a multidimensional feature vector (FIG. 28(B)) from a subgraph constituting the subjective elements. The values of the bins of the multidimensional feature vector can be used as numerical values reflecting the subjective elements.

FIG. 29 shows an example of visually representing subjectivity varying from user to user as a relevance graph. FIG. 29(A) shows a state where a user 2901 is directly or indirectly linked to six objects including an object 2902. The depths of the relationships are represented to the second degree. The thicknesses of link lines show the strengths of the relationships. When it is found that the user 2901 has a special interest in an object 2906 through the processing related to the above, the object may be displayed with emphasis (2908).

On the other hand, in FIG. 29(B), a user 2911 shares a similar relevance graph with the user 2901. However, when a target of her interest is the object 2902, the object may be displayed with visual effects such as highlights or special decorative effects (2912).

For input to the subjective filter construction unit 2802 in FIG. 28(A), a multidimensional vector constituting an environmental filter reflecting a time axis and location information such as the time zone, the date, the season, the period, and the location at which the user is going to conduct search, may be used instead.

FIGS. 30(A) and 30(B) show an example of operation in the system according to another embodiment of the invention.

When a node 3002 corresponding to an image 3001 and metadata on a graph structure 3003 shown in FIG. 30(A) already exist, the image recognition engine 200 performs comparison processing on the correctness of the metadata on a priority basis as shown in FIG. 30(B), so that the matching between the graph structure in the metadata shown in FIG. 30(A) and a graph structure of metadata shown in FIG. 30(B) can be recognized. This enables substantial shortening of processing time.

FIG. 31(A) shows an example of an interest graph. Although only users and objects are shown as nodes in the interest of simplicity in the figure, in actuality, information other than objects such as contexts and scenes are extracted by the image recognition system 202 from images, thus being elements of the interest graph.

In the figure, the links between three users 3101 to 3103 and six objects 3110 to 3115 are shown. It is shown that the user 3101 is interested in the objects 3110, 3111, and 3112, the user 3102 is interested in the objects 3111, 3113, and 3114, and the user 3103 is interested in the objects 3110, 3111, 3113, and 3115.

The interest graph includes nodes related to users extracted from data in the GDB 102A by the graph operation unit 221, and exists in the graph storage unit 222 in the relevance search engine 220.

Information in the GDB 102A is varied by the hour by the connection operator LIKE, the disconnection operator DISLIKE, the reference operator Reference, and the unreference operator Unreference, and thus the interest graph in FIG. 31(A) can also be acquired as a dynamic interest graph.

In FIG. 31(B), the user 3102 establishes a new relationship (link 3201) with the object 3112 by the connection operator LIKE, for example. Operations like this are performed by many users, and the number of links to the object 3112 in the server changes (in FIG. 31(B), changed from 1 to 2). At that time, a predetermined threshold is set for the number of links, and exceeding it is construed as a significant change in interest points to the node, and a node (3104) related to the node (3112) is notified of the change. For example, in the figure, the node 3104 represents an advertiser, for example, and it is possible to notify the advertiser of the change in the number of links to the object 3112 exceeding the threshold.

Further, the notification may be provided to the users 3101 and 3102 directly related to the object 3112. Moreover, the notification may allow the advertiser to present an advertisement or a recommendation to arouse buying motivation for the target object. For example, in FIG. 31(B), the node 3104 is illustrated as an advertiser, for example, and can provide an advertisement for the object 3112 (the corresponding image is 3120) to the user 3101 and the user 3102.

Figure 32:
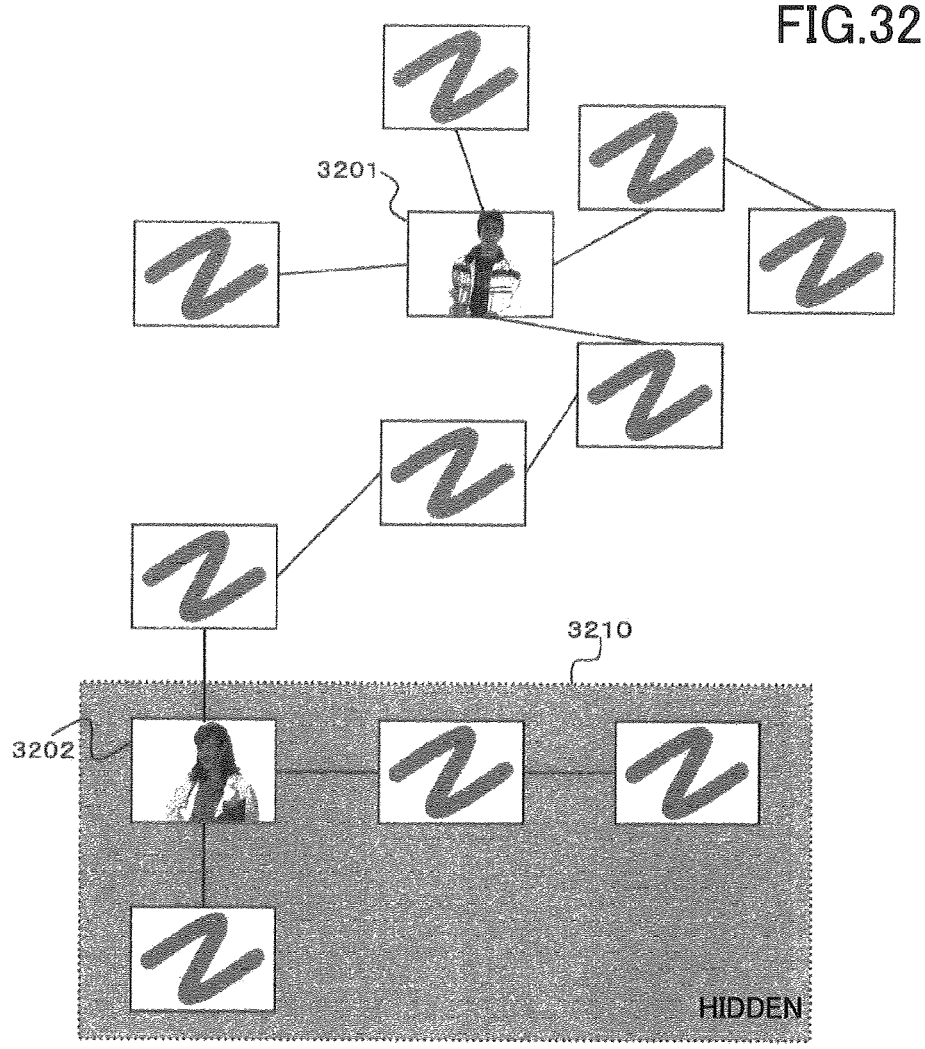
FIG. 32 is an explanatory diagram illustrating an example of display of an interest graph in the system according to another embodiment of the invention.

FIG. 32 shows an example in which when an interest graph is displayed with a user herself/himself as a center node, an interest graph limited only to the user is displayed in terms of privacy protection. In FIG. 32, an interest graph centered on a user 3201 is displayed, and an interest graph (a gray box 3210) centered on a user 3202 relates to the privacy of the user 3202, and thus it is required that the interest graph 3210 be not displayed from the view of the user 3201. Display and non-display thereof can be controlled by distinguishing the node type "USER" on the server side.

Figure 33:
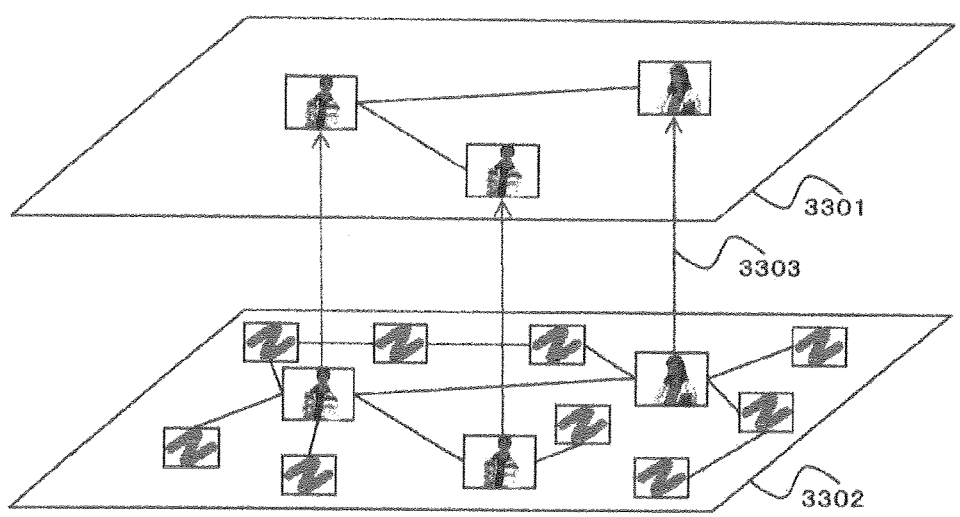
FIG. 33 is an explanatory diagram illustrating social graph acquisition processing in the system according to the embodiment of the invention.

FIG. 33 shows an example of acquiring a social graph. From a comprehensive interest graph acquired through the process of visual relevance search using the image recognition engine 200 or a series of relevance search engines 220 incorporating the image recognition system 202 in the invention, nodes representing persons whose node type is "USER" are extracted and mapped into a plane 3301 for a specific user, to be able to acquire a social graph including person to person relationships.

Figure 34:
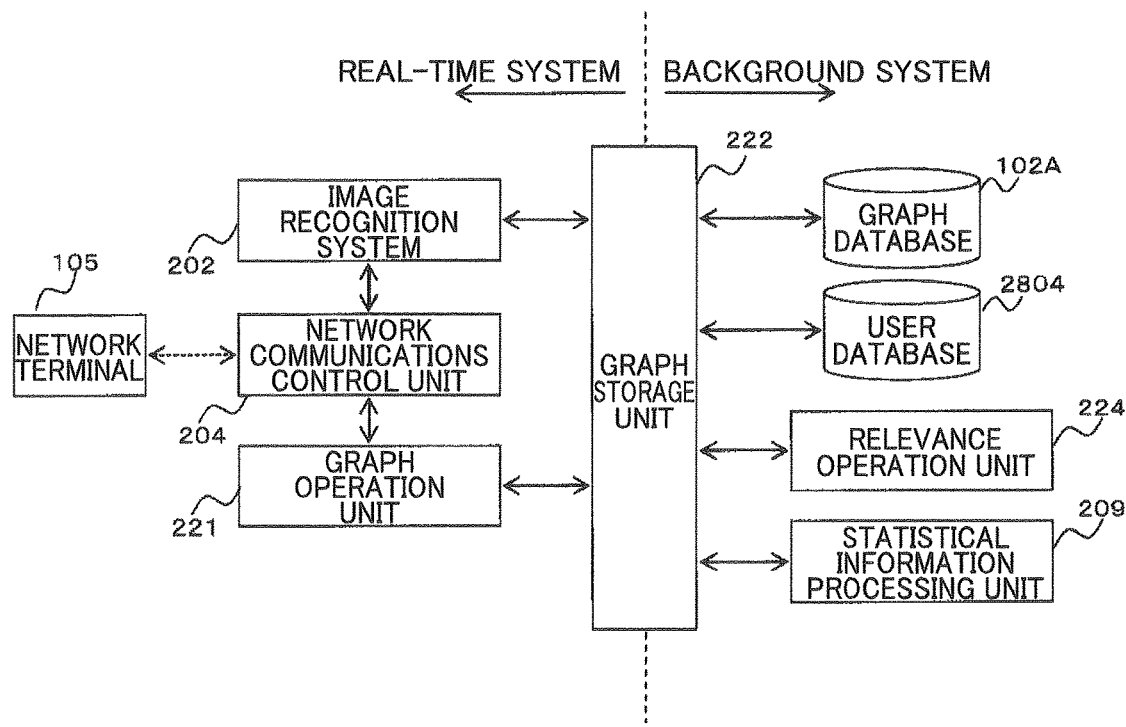
FIG. 34 is an explanatory diagram illustrating an interest graph collection process in the system according to the embodiment of the invention.

FIG. 34 shows a schematic process diagram concerning interest graph collection. A system of the whole process is divided into a real-time system and a background system, which are connected by the graph storage unit 222. In the background system, the GDB 102A, the relevance operation unit 224, and the statistical information processing unit 209 are arranged. In the real-time system, the image recognition system 202 (or the image recognition engine 200 (not shown)), the graph operation unit 221, and the network communication control unit 204 are arranged. The network communication control unit 204 is connected to the network terminal 105 via a network such as the Internet.

An interest graph is obtained by selectively extracting multidimensional vectors of a predetermined number of elements in decreasing order of relevance to a user from a group of nodes having first links to the user, as a multidimensional feature vector of a finite length unique to the user.

FIGS. 35(A) and 35(B) show images of multidimensional feature vectors corresponding to interest graphs for users. Since the number of dimensions of the total candidates for interest graphs corresponding to all nodes reaches the order of the comprehensive number of nodes registered in the GDB 102A, a fixed number of them are extracted from the candidates in decreasing order of relevance to the users, and held in the user database 2804 as multidimensional feature vectors of a finite length as shown in FIGS. 35(A) and 35(B). In FIG. 35(A), a multidimensional feature vector of A is shown, and in FIG. 35(B), that of B, for example. By comparing the two multidimensional feature vectors with each other, a target in which A and B show an interest in common can be detected. For example, in a dotted circle 3601 and a dotted circle 3602, vector values of interest in the same target object are represented. When these are found to be great in common, it can be found that their interests in the target object resemble each other.

DESCRIPTION OF REFERENCE SIGNS

100 Interest graph collection system
101 Server
102A Graph database (GDB)
102B Mother database (MDB)
103 Connection
104 Network (or the Internet)
105a to 105d Network terminal device
106 Generic object recognition system
107 Image category database
108 Scene recognition system
109 Scene component database
110 Specific object recognition system
200 Image recognition engine
209 Statistical information processing unit
210 Specific user filtering processing unit
220 Relevance search engine
221 Graph operation unit
222 Graph storage unit
223 Graph management unit
224 Relevance operation unit

The invention claimed is:
1. An interest graph collection system that is a search system using image information containing at least one of various objects and subjects as input, the system comprising:
   one or more central processing units operable to execute one or more programs;
   memory that stores the one or more programs to be executed by the one or more central processing units;
   the one or more programs comprising instructions for:
      selecting from among a large number of images existing on the Internet or on a dedicated network or images uploaded on the Internet by a number of users via a number of network terminals, an entire image or a specific region of an image in which the users have an interest;
      extracting and recognizing in real time various objects, the objects comprising at least one of a generic object, a specific object, a person, a face, a scene, characters, a sign, an illustration, a logo, and a favicon contained in the selected entire image or the specific image region by an image recognition engine on a server side, when queried by the users about the selected image via the network; and
      determining other related elements directly or indirectly related to one or more individual image components to a certain degree or more by a relevance search engine on the server side, when notified of image components contained in a recognized input image via the image recognition engine,
      extracting the related elements based on multidimensional feature vectors describing direct relationships between elements held on a relevance knowledge database in the relevance search engine in a learnable manner, and
      visually representing the image components recognized by the image recognition engine and the related elements extracted by the relevance search engine as nodes in a relevance graph together with one or more depths of relationships between the nodes on the respective network terminal of the users as a two-dimensional image, or a three-dimensional image with depth, or a four-dimensional spatiotemporal image to which a time axis variable as observation time of the relevance graph is added,
      wherein, in a respective relevance search operation, by respective ones of the users tapping or touching on a touch screen an arbitrary node on the relevance graph displayed on the network terminal for selection, or moving a cursor of a pointer onto an arbitrary node for selection, or
      by the respective user flicking on the touch screen toward an arbitrary region on the relevance graph, or moving a cursor of a pointer to an arbitrary region on the relevance graph and dragging and scrolling an entire image, or using a cursor key or the like for a similar operation, or using an input operation having a similar effect using a gesture, a line of sight, voice, or a brain wave,
      the relevance search engine additionally transmits a new relevance graph centered on the selected node or the region after the move, including a course thereto, so that the respective user can visually recognize broad relationships between a plurality of nodes on the relevance graph, seamlessly tracing a node or a region of interest to the respective user, wherein, in the relevance search operation, a more detailed relevance graph centered on a specific image component selected by the respective user from among a plurality of image components presented by the image recognition engine, or a specific node on the relevance graph displayed on the network terminal selected by the respective user double tapping or pinching out the node on the touchscreen, or operating a pointer or the like, enlarging a region centered on the node, or by the respective user using an input operation having a similar effect using a gesture, a line of sight, voice, or a brainwave, can be visually represented on the network terminal of the user; the series of operations being considered to show a certain degree of interest of the respective user to the node, a feature vector value representing the depth of interest of the respective user in the node is adaptively increased on a multidimensional feature vector describing direct relationships between elements with the respective user as the center node to allow an interest graph corresponding to an individual user of the one of the one or more users, with the individual user as the center node to be acquired; and the interest graph can be expanded to a wide range of the one or more users for acquisition to be collected as a statistical broad interest graph over a specific user cluster or all of the users, wherein, in the relevance search operation, allowing reflection of a subjective evaluation of the individual user is enabled with respect to a multidimensional feature vector that describes direct relationships between elements held as the relevance knowledge database in the relevance search engine; and wherein, based on the modified multidimensional feature vector, causes the respective network terminal of each of at least two of the users to represent the same one or two nodes and visually represents the mutual relationships between the nodes and the depths of the relationships as a relevance graph reflecting a factor of a difference in perception wherein each of said at least two of the users has the difference in the perception.

2. The interest graph collection system according to claim 1, wherein, in the relevance search operation, by the user, not tracing a selected node of interest on the relevance graph, querying again the image recognition engine on the server side about the images of the node via the network, new image components related to the node are acquired with the assistance of the image recognition engine, and new related elements starting from the image components are transmitted from the relevance search engine to the network terminal, so that the user can visually recognize new relationships to the node together with the depths of the mutual relationships on a relevance graph; and the relevance search engine presumes that the user recognizes and uses the existence of relationships between a series of nodes leading to the node from the image component as the starting point to the node in the last similar operation, and adaptively increases feature vector values representing the depths of direct relationships between nodes constituting the series of relationships on the multidimensional feature vector describing direct relationships between elements to allow the relevance knowledge database in the relevance search engine to learn additionally.

3. The interest graph collection system according to claim 1, wherein, in the relevance search operation, for the image components that can be recognized by the image recognition engine and the related elements associated with the image components, reduced image thumbnails generated from a photograph, an illustration, characters, a sign, a logo, a favicon, and the like representing the image components and the related elements are transmitted to the network terminal in place of the original image by the relevance search engine, so that nodes on a relevance graph can be displayed and selected in units of image thumbnails.

4. The interest graph collection system according to claim 1, wherein, in the relevance search operation, it is made possible to query the image recognition engine on the server side about a plurality of nodes; and as input condition selection functions included in an image recognition process, logical operators (AND and OR) are introduced, so that when AND is selected, a node commonly and directly related to the nodes, and when OR is selected, a node directly related to at least one of the nodes can be visually represented on the network terminal together with the depth of the mutual relationship.

5. The interest graph collection system according to claim 1, wherein, in the relevance search operation, it is made possible to query the image recognition engine on the server side about a plurality of nodes;

as an input condition selection function included in an image recognition process, a connection search operator (Connection Search) is introduced, so that a connection between the plurality of nodes that seems to have no connection at all is searched for as a series of connections via other nodes directly and indirectly related to their respective input nodes, to detect an indirect relationship between the node across different layers (classes); and the nodes can be displayed on the network terminal in a relevance graph including the shortest path between the nodes, and at the same time, in the connection search process, the detected indirect relationship between the plurality of nodes is learned and acquired in the relevance knowledge database in the relevance search engine to be prepared for the same or a similar connection search request afterward.

6. The interest graph collection system according to claim 1, wherein, in the relevance search operation, a connection operator (LIKE) for connecting a node indirectly related to the user or a node regarded as having no relevance to the user and the user as a direct relationship, and a disconnection operator (DISLIKE) for cutting the direct relationship between the node already connected and the user are introduced, so that a value representing the depth of interest of the user in the node is increased, reduced, or erased on a multidimensional feature vector describing the direct relationships between the elements with the user as the center node to update the interest graph corresponding to the individual user with the user as the center node.

7. The interest graph collection system according to claim 1, wherein, in the relevance search operation, for the possibility of existence and non-existence of a new direct relationship for a node other than the user, a reference operator (REFERENCE) for presenting that the nodes should be directly connected, and an unreference operator (UNREFERENCE) for presenting non-existence of a direct relationship as the existence of the direct relationship of the node already directly connected is doubtful are introduced to allow the relevance search engine to draw attention of the user to the possibility of existence or non-existence of the new direct relationship between the nodes; and the relevance search engine can update the value of a feature vector on a relationship between nodes judged to be related or unrelated by a supervisor having specific authority or more than a fixed number of users; and the update can be reflected as an updated relevance graph for the nodes on the network terminal, and all users can be notified of update information on the existence or non-existence of the new direct relationship.

8. The interest graph collection system according to claim 1, wherein, the network terminal of each of at least two of the users to represent at least the same two nodes and reflecting a factor of difference in perception that the individual user has on the network terminal of the user in a relevance graph includes rendering a visual effect for a first one of the two nodes for a first individual user and rendering a visual effect for a second one of the two nodes for a second individual user, the second one of the two nodes different from the first one of the two nodes.

9. The interest graph collection system according to claim 1, wherein, in the relevance search operation, an environmental filter comprising at least one of the time zone, the date, the season, the period, and the location at which the user is going to conduct search can be applied to the multidimensional feature vector describing direct relationships between elements held as the relevance knowledge database in the relevance search engine; and based on the modified multidimensional feature vector, the mutual relationships between the nodes and the depths of the relationships can be represented as a relevance graph reflecting a spatiotemporal factor comprising at least one of observation time and location characteristics on the network terminal of the user.

10. The interest graph collection system according to claim 1, wherein, in the relevance search operation, when metadata is attached to the image itself corresponding to the node selected by the user, in order to verify the suitability of the metadata to the image or the correctness of the metadata itself, the image recognition engine compares various features extractable from the image and their feature quantities with specific features that an object or a subject represented by metadata has and their feature quantities on a priority basis, so that processing time for image recognition by the image recognition engine can be shortened, and metadata that is unrelated to or does not show relevance to a certain degree or more to the image can be excluded.

11. The interest graph collection system according to claim 1, wherein, through the relevance search process by the user, when a visual interest or a transition of interest over a specific user cluster or a group of all users to a node other than a person changes to a certain degree or more, a significant change in the degree of interest in the node is made into statistical information, and a user, a user cluster, all users, or a specific third person directly related to the nodes can be promptly notified of the information on the relevance graph.

12. The interest graph collection system according to claim 1, wherein, as for the display of the relevance graph, the display of an interest graph with the user himself or herself as the center node is limited to the user in terms of privacy protection.

13. The interest graph collection system according to claim 1, wherein, utilizing the interest graph, to a specific user or a specific user group who shows an interest to a certain degree or more in a product or service represented by a specific node, direct presentation of an advertisement or a recommendation arousing consumer demand for the product or service, and linking to a third party supplying the product or service are enabled, and at the same time, utilizing the relevance graph to which the attribute of the user or a factor of the space and time to which the user belongs is added, direct presentation of an additional advertisement or a recommendation for other products or services directly or indirectly related to the attribute or the space and time, and linking to third parties supplying the other products or services are enabled.

14. The interest graph collection system according to claim 1, wherein visual information showing an advertisement, a service, or a recommendation and/or link information that can be presented by utilizing the interest graph can be presented on the relevance graph displayed on a network terminal of a user as a target in a manner that display/non-display is selectable.

15. The interest graph collection system according to claim 1, wherein utilizing an interest graph acquired through a visual relevance search process incorporating the image recognition engine, communications between a wide range of user having similar interests are aroused through the relevance search, so that, in addition to the interest graph, a broad dynamic social graph including relationships between people and people between people and objects other than people can be acquired via the network.

* * * * *